(12) United States Patent
Okabe

(10) Patent No.: US 11,541,731 B2
(45) Date of Patent: Jan. 3, 2023

(54) LIGHT CONTROL FILM, LIGHT CONTROL MEMBER, VEHICLE, AND ELECTRICITY SUPPLY METHOD FOR LIGHT CONTROL FILM

(71) Applicant: DAI NIPPON PRINTING CO., LTD., Tokyo (JP)

(72) Inventor: Masato Okabe, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 122 days.

(21) Appl. No.: 16/320,411

(22) PCT Filed: Jul. 28, 2017

(86) PCT No.: PCT/JP2017/027569
§ 371 (c)(1),
(2) Date: Jan. 24, 2019

(87) PCT Pub. No.: WO2018/021571
PCT Pub. Date: Feb. 1, 2018

(65) Prior Publication Data
US 2019/0241050 A1    Aug. 8, 2019

(30) Foreign Application Priority Data

Jul. 29, 2016  (JP) .............................. JP2016-150260
Sep. 20, 2016  (JP) .............................. JP2016-182853

(51) Int. Cl.
*G02F 1/1345* (2006.01)
*B60J 3/04* (2006.01)
(Continued)

(52) U.S. Cl.
CPC ................ *B60J 3/04* (2013.01); *G02F 1/137* (2013.01); *G02F 1/13306* (2013.01);
(Continued)

(58) Field of Classification Search
CPC ........... G02F 1/13306; G02F 1/133368; G02F 1/13439; G02F 1/137; B60J 3/04
See application file for complete search history.

(56) References Cited

U.S. PATENT DOCUMENTS 5,781,264 A * 7/1998 Noda .................. G02F 1/13452
349/150
5,841,501 A   11/1998 Eiraku et al.
(Continued)

FOREIGN PATENT DOCUMENTS

EP    0 238 164 A1    9/1987
JP    S60-213929 A    10/1985
(Continued)

OTHER PUBLICATIONS

Oct. 17, 2017 International Search Report issued in International Patent Application No. PCT/JP2017/027569.
(Continued)

*Primary Examiner* — Paisley L Wilson
(74) *Attorney, Agent, or Firm* — Oliff PLC

(57) ABSTRACT

Provided are a light control film whereby flickering is hard to recognize when observing external light via the light control film, a light control member comprising same, a vehicle, and an electricity supply method for the light control film. In the vehicle 130, the light control film 1 having a vertically-aligned liquid crystal layer is attached to a sunroof 132. The light control film 1 is attached to the sunroof 132 of the vehicle 130 such that the liquid crystal molecules fall to the rear of the vehicle 130 when an electric field is applied to the liquid crystal layer. As a result, passengers in the vehicle do not sense any flickering inside the car and have no discomfort.

16 Claims, 37 Drawing Sheets

(51) Int. Cl.
*G02F 1/133* (2006.01)
*G02F 1/1343* (2006.01)
*G02F 1/137* (2006.01)
G02F 1/1333 (2006.01)
G02F 1/1337 (2006.01)
G02F 1/1339 (2006.01)

(52) U.S. Cl.
CPC ...... *G02F 1/13439* (2013.01); *G02F 1/13452* (2013.01); *G02F 1/1339* (2013.01); *G02F 1/133368* (2021.01); *G02F 1/133742* (2021.01)

(56) References Cited

U.S. PATENT DOCUMENTS

| | | | |
|---|---|---|---|
| 6,039,390 | A | 3/2000 | Agrawal et al. |
| 2006/0072061 | A1* | 4/2006 | Hector ............... G02F 1/13452 349/152 |
| 2007/0058114 | A1 | 3/2007 | Niiyama et al. |
| 2013/0265511 | A1 | 10/2013 | Poix et al. |
| 2014/0376075 | A1 | 12/2014 | Dubrenat et al. |
| 2015/0116638 | A1 | 4/2015 | Zhang |
| 2015/0118869 | A1 | 4/2015 | Brown et al. |
| 2015/0277200 | A1 | 10/2015 | Baek et al. |
| 2016/0033841 | A1 | 2/2016 | Gauthier et al. |
| 2016/0052446 | A1 | 2/2016 | Frey et al. |
| 2016/0054631 | A1 | 2/2016 | Lee et al. |

FOREIGN PATENT DOCUMENTS

| | | |
|---|---|---|
| JP | S62-229116 A | 10/1987 |
| JP | H02-047627 A | 2/1990 |
| JP | H02-062518 U | 5/1990 |
| JP | H05-341262 A | 12/1993 |
| JP | H06-018856 A | 1/1994 |
| JP | H06-160804 A | 6/1994 |
| JP | H08-327987 A | 12/1996 |
| JP | H09-054297 A | 2/1997 |
| JP | 2007-102210 A | 4/2007 |
| JP | 2015-503773 A | 2/2015 |
| JP | 2016-509264 A | 3/2016 |
| JP | 2016-080867 A | 5/2016 |
| JP | 2016-126288 A | 7/2016 |
| JP | 2016-126289 A | 7/2016 |
| KR | 10-2014-0107613 A | 9/2014 |
| KR | 10-2015-0114123 A | 10/2015 |

OTHER PUBLICATIONS

Apr. 24, 2020 Extended European Search Report issued in European Patent Application No. 17834573.2.
Jun. 1, 2021 Office Action issued in Japanese Patent Application No. 2017-147202.
Aug. 5, 2021 Office Action issued in Korean Patent Application No. 10-2019-07002088.

* cited by examiner

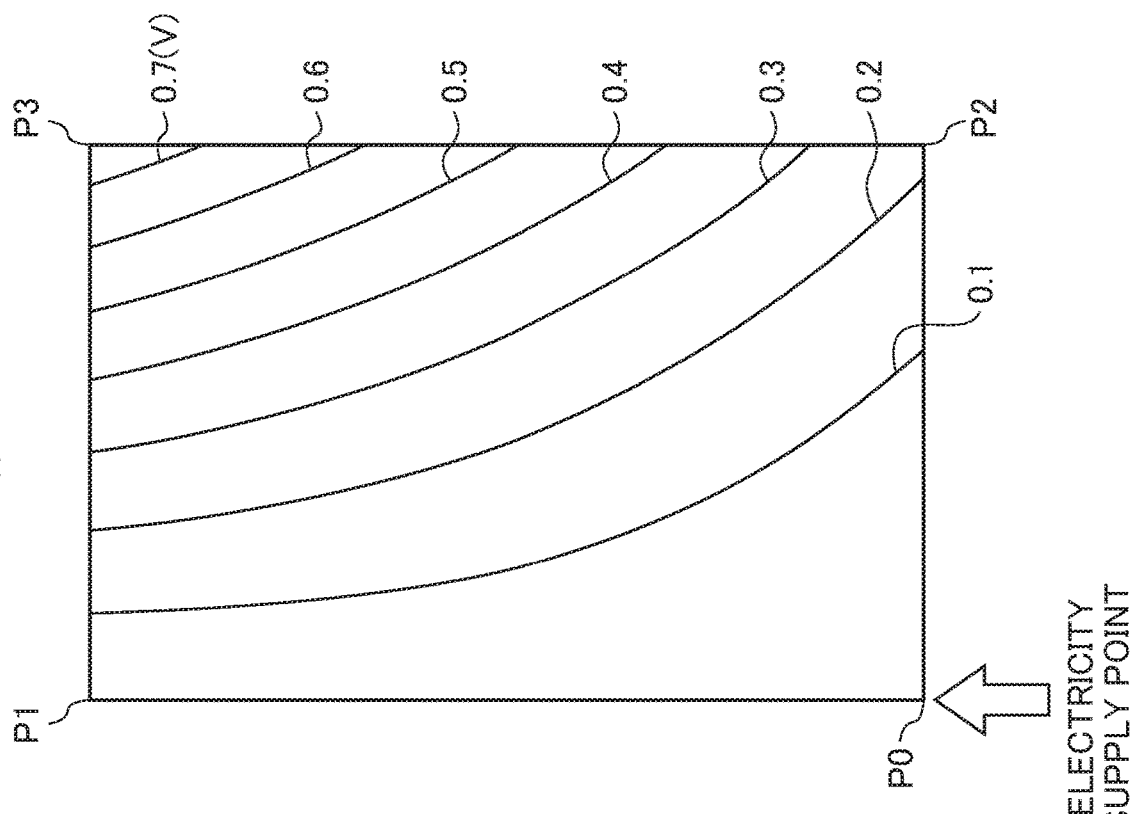
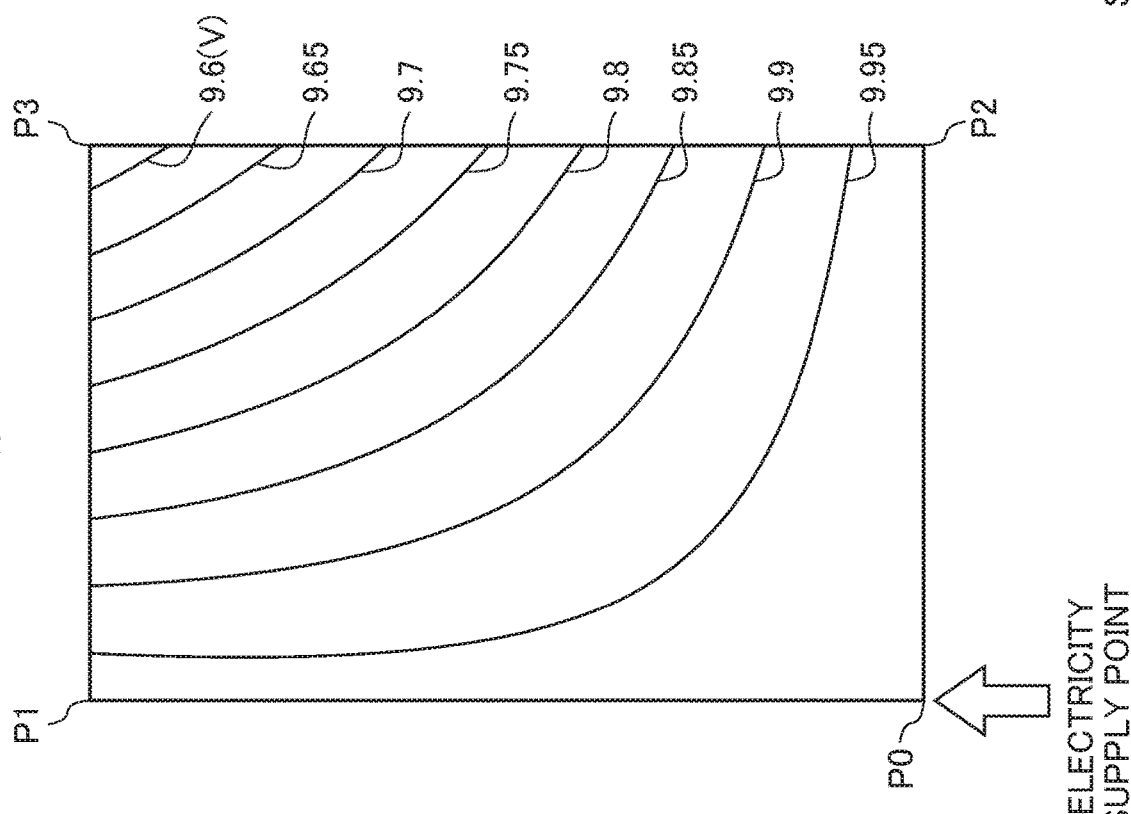

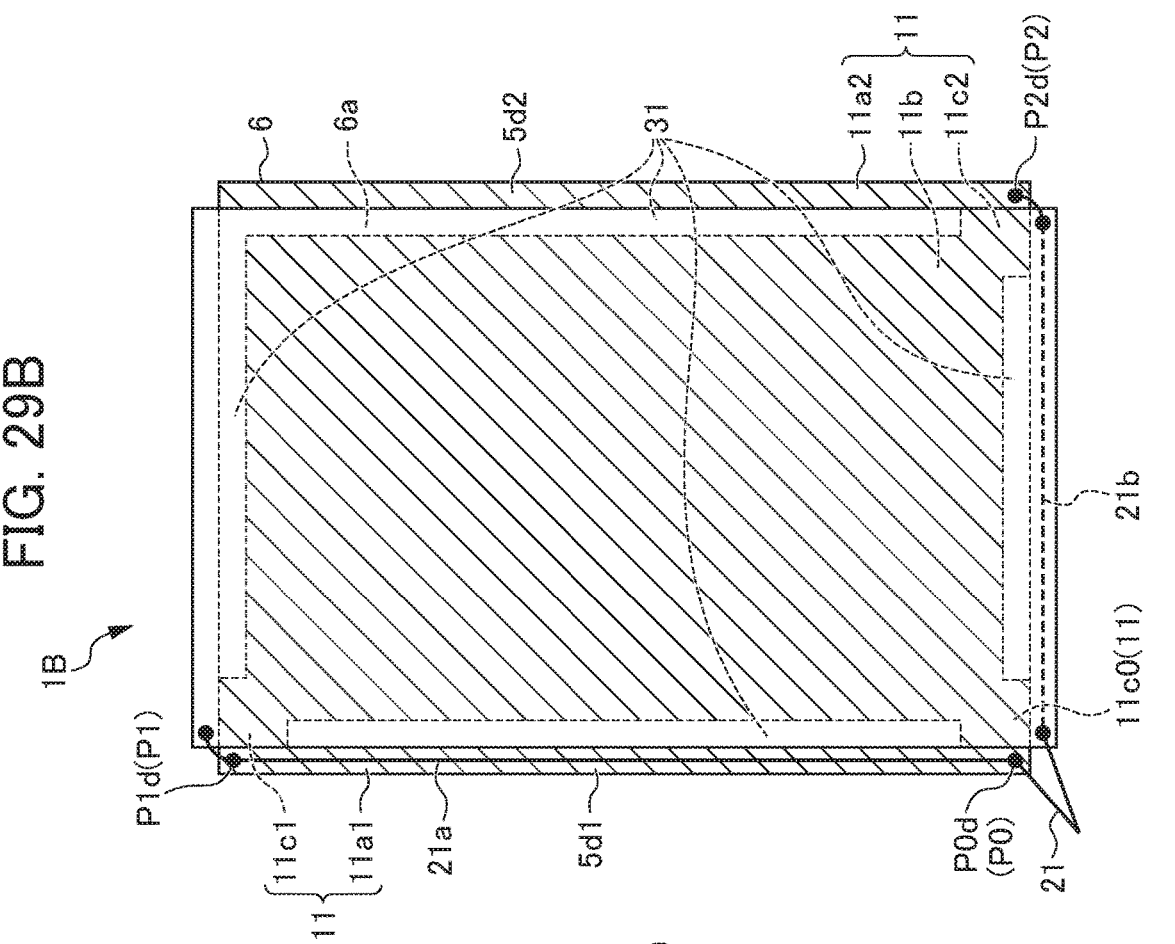
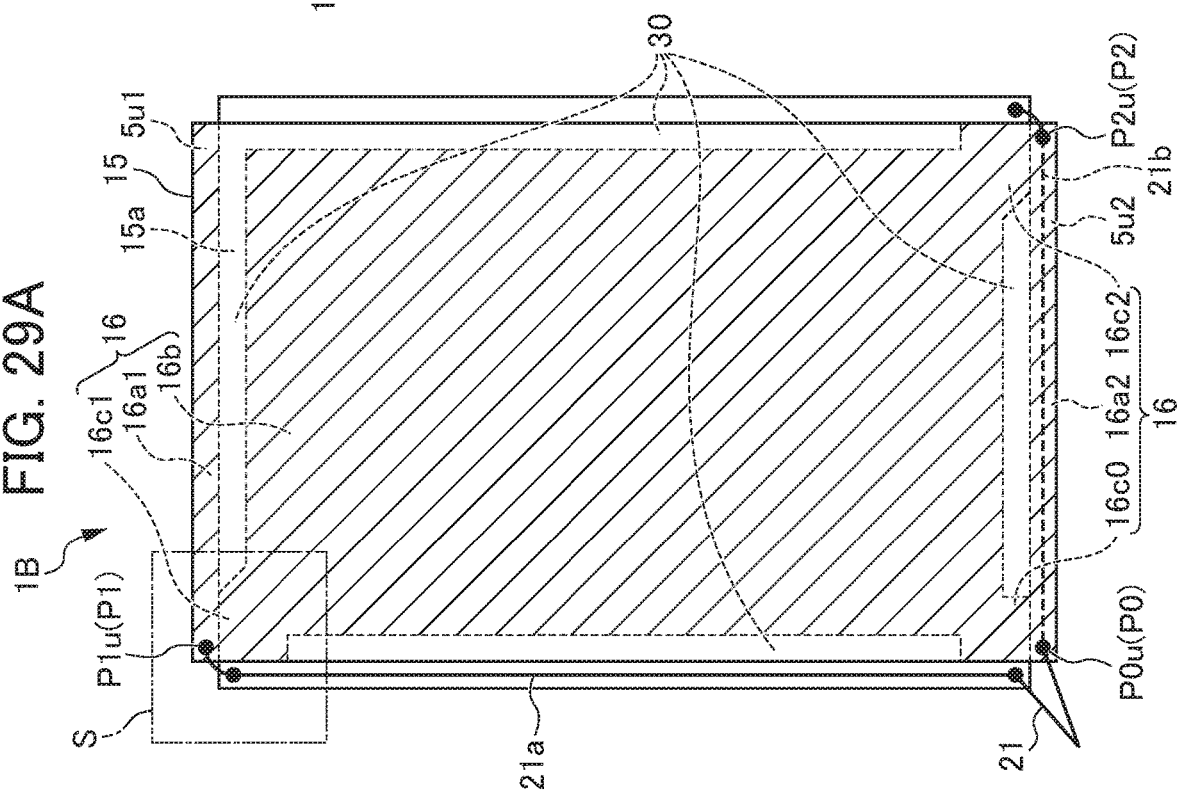

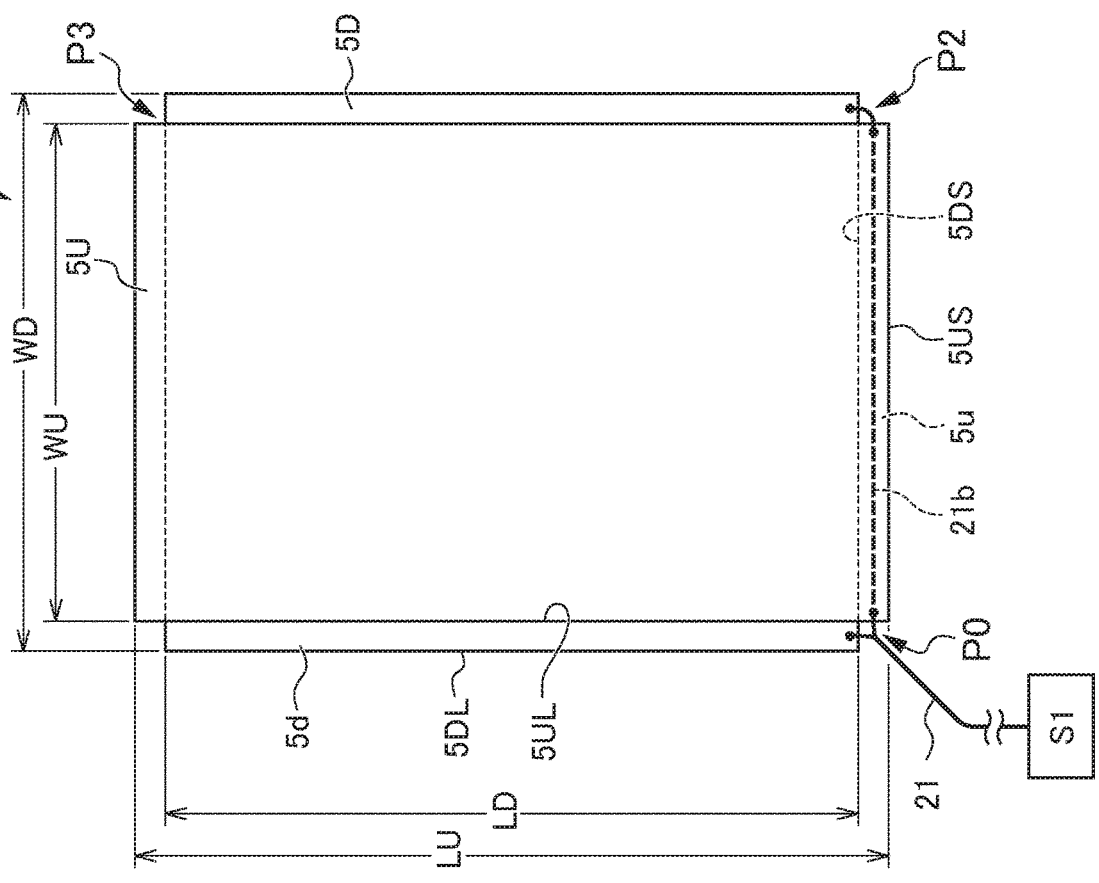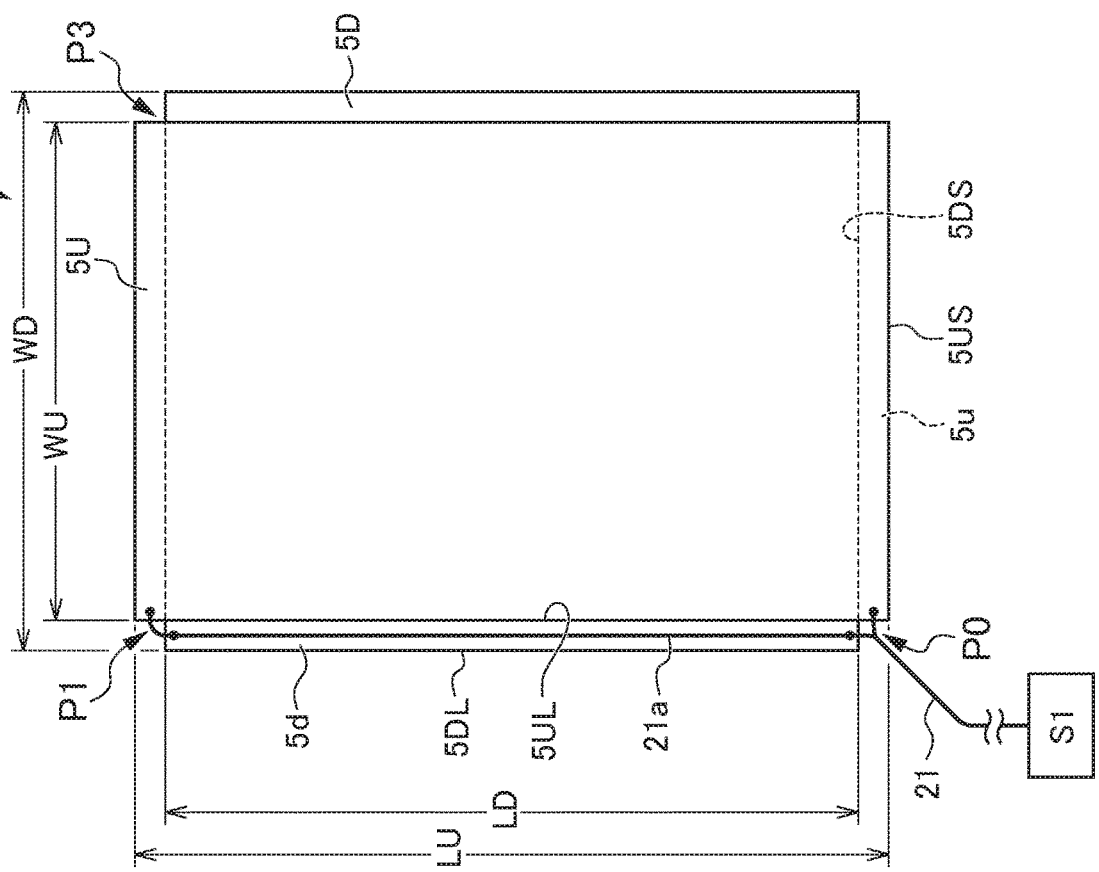

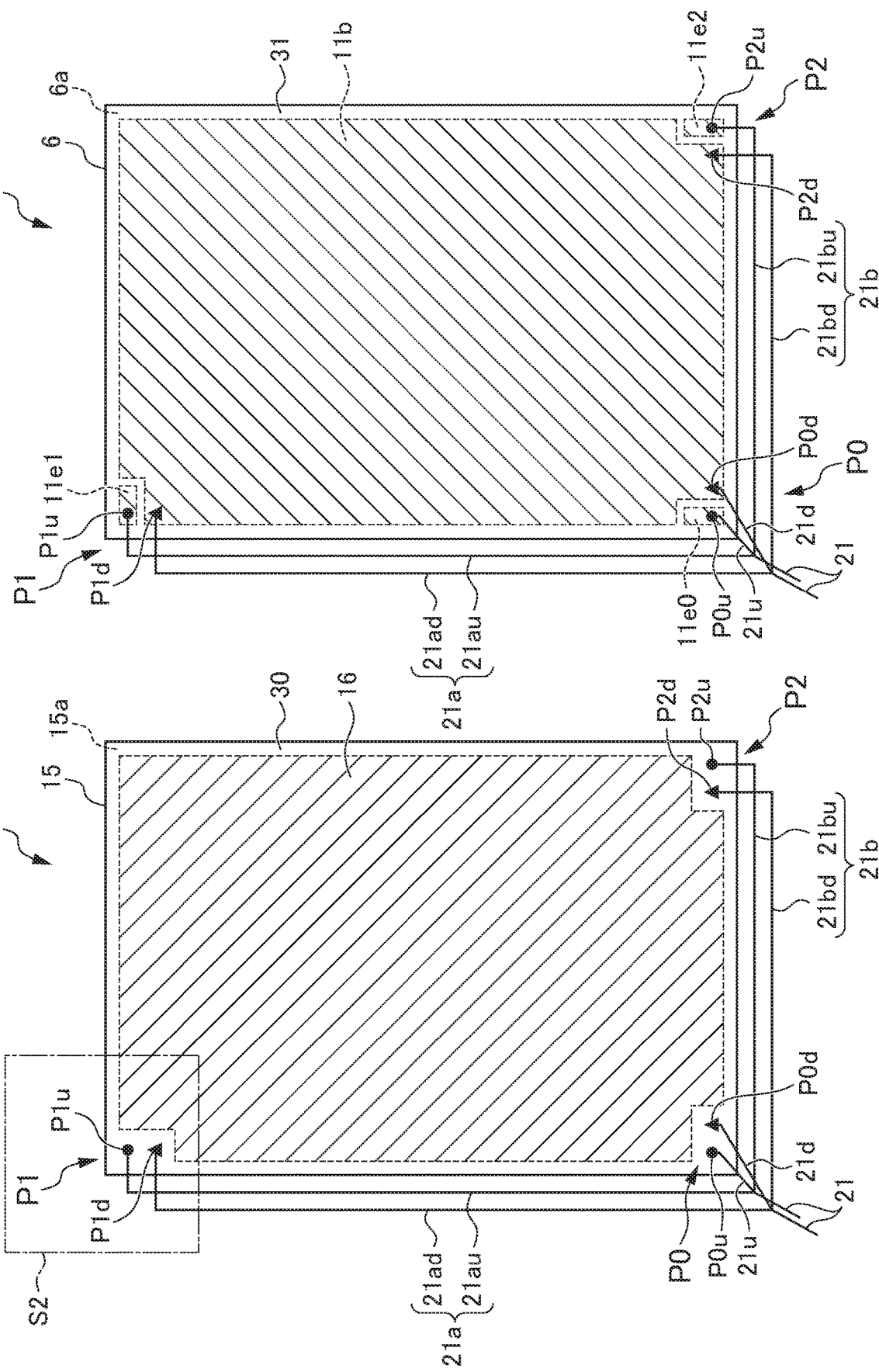

LIGHT CONTROL FILM, LIGHT CONTROL MEMBER, VEHICLE, AND ELECTRICITY SUPPLY METHOD FOR LIGHT CONTROL FILM

TECHNICAL FIELD

The present invention relates to a light control film, a light control member, a vehicle, and a method for supplying electricity to a light control film.

BACKGROUND ART

A liquid crystal display device used in a liquid crystal TV or the like is known, in which a fluorescent lamp is used as a backlight. In such a liquid crystal display device, there is a case where a lighting period of the fluorescent lamp performed by an inverter, and a data scanning period for driving liquid crystals interfere with each other, and "Moire (interference fringe)" occurs, accordingly. In the related art, in order to solve the "Moire", there is a technology of synchronizing the lighting period performed by the inverter with the data scanning period (refer to Patent Documents 1 and 2).

Similarly, there is a light control film attached to a sunroof of a vehicle, the film using liquid crystals to control the transmission of the external light. The light control film changes a voltage applied to the liquid crystals, such that the alignment of the liquid crystals is changed and an amount of transmitted external light is changed, accordingly.

Patent Document 1: Japanese Unexamined Patent Application, Publication No. H05-341262
Patent Document 2: Japanese Unexamined Patent Application, Publication No. H06-160804

DISCLOSURE OF THE INVENTION

Problems to be Solved by the Invention

In a case where an amount of external light incident on the light control film of the sunroof of the vehicle changes periodically as emitted light of a fluorescent lamp, there is a case where "flickering" is observed in the transmitted light of the light control film.

An object of the present invention includes providing a light control film which causes flickering to be less recognizable when observing external light via the light control film, a light control member including the same, a vehicle, and a method for supplying electricity to a light control film.

Means for Solving the Problems

In order to attain the object described above, the present invention provides the followings.

(1) A vehicle in which a light control film having a vertically-aligned liquid crystal layer is attached to a sunroof, in which the light control film is attached to the sunroof of the vehicle such that liquid crystal molecules fall to a rear of the vehicle when an electric field is applied to the liquid crystal layer.

(2) In (1), an electricity supply position of the light control film is located at an edge portion of the light control film and rearward from a center of the light control film in a front-rear direction of the vehicle.

(3) In (1), the light control film is attached to the sunroof of the vehicle such that the liquid crystal molecules fall diagonally rearward with respect to the vehicle when an electric field is applied to the liquid crystal layer.

(4) In (1), a direction in which the liquid crystal molecules fall when an electric field is applied to the liquid crystal layer is configured to be in a direction of ±135° and in a vicinity thereof when a travelling direction of the vehicle is set to 0° in an in-plane direction of the light control film.

(5) In (1), an electricity supply position of the light control film is an edge portion of the light control film and is a diagonal rear of the vehicle.

(6) A light control film including: a planar transparent electrode which is arranged on a base material and provided with an electricity supply point connected to a driving power source; and an electrical wire electrically connected to the transparent electrode, in which the electricity supply point is provided in an outer edge portion of the transparent electrode, and the electrical wire extends along the outer edge portion of the base material from the electricity supply point, and is electrically connected to the transparent electrode at a connection point provided at a position different from the electricity supply point.

(7) In (6), the base material includes a first base material and a second base material, the transparent electrode includes a first transparent electrode arranged on the first base material and a second transparent electrode arranged on the second base material, the first base material and the second base material are arranged such that the first transparent electrode and the second transparent electrode face each other with liquid crystals interposed therebetween, a first exposure surface not overlapping with the second base material is formed on a surface of the first base material on a second base material side, a second exposure surface not overlapping with the first base material is formed on a surface of the second base material on a first base material side, and the electrical wire is arranged on the first exposure surface and the second exposure surface.

(8) In (6), the base material includes a first base material and a second base material, the transparent electrode includes a first transparent electrode arranged on the first base material and a second transparent electrode arranged on the second base material, the first base material and the second base material are arranged such that the first transparent electrode and the second transparent electrode face each other with liquid crystals interposed therebetween, the first base material and the second base material are laminated such that a laminated region in which the first base material and the second base material overlap with each other is generated, and an exposure surface in which the first base material and the second base material do not overlap with each other is generated, the liquid crystals and a seal material arranged to surround the liquid crystals are arranged in the laminated region, a first exposure region not including the first transparent electrode exists in a portion of the first base material in which the seal material is arranged, and a second exposure region not including the second transparent electrode exists in a portion of the second base material in which the seal material is arranged.

(9) In (8), it may be preferable that one portion of the second transparent electrode is insulated from the other portion, and the one portion is electrically connected to the first transparent electrode.

(10) In (6), it may be preferable that the electrical wire is a flexible printed board in which a thickness of a copper foil is greater than or equal to 9 micrometers.

(11) In (10), it may be preferable that two layers of copper foils are laminated each other with an insulating layer interposed therebetween in the flexible printed board.

(12) In (6), it may be preferable that the electrical wire extends originating from the electricity supply point along two sides extending in different directions.

(13) A light control member including: a transparent member; and the light control film according to (6) arranged on the transparent member.

(14) A vehicle including: the light control film according to (6) arranged in a portion on which external light is incident is provided.

(15) A method for supplying electricity to a light control film including a planar transparent electrode for which an electricity supply point connected to a driving power source is provided; and electrical wire electrically connected to the transparent electrode, the method including: supplying electricity to the transparent electrode from the electricity supply point, and a connection point provided in a position different from the electricity supply point, both of which are provided in an outer edge portion of the transparent electrode.

Effects of the Invention

According to the present invention, it is possible to provide a light control film which causes flickering to be less recognizable when observing external light via the light control film, a light control member including the same, a vehicle, and a method for supplying electricity to a light control film.

BRIEF DESCRIPTION OF THE DRAWINGS

FIGS. 18A and 18B are simulation results illustrating a potential distribution of a transparent electrode in the case of applying a driving voltage of 10 V, having a frequency of 60 Hz, in a comparative embodiment, in which FIG. 18A illustrates a potential distribution of a lower transparent electrode, and FIG. 18B illustrates a potential distribution of an upper transparent electrode.

FIGS. 24A and 24B illustrate voltages for both transparent electrodes in a case where a thickness of a copper foil of an FPC is 35 μm and a frequency of a driving voltage is 240 Hz: FIG. 24A illustrates a potential of an electrode of a lower laminate; and FIG. 24B illustrates a potential of an electrode of an upper laminate.

FIGS. 29A and 29B are plan views of a light control film of a fifth embodiment, in which FIG. 29A is a diagram illustrating a patterning shape of an upper transparent electrode, and FIG. 29B is a diagram illustrating a patterning shape of a lower transparent electrode.

FIGS. 32A and 32B are plan views of a light control film of a sixth embodiment, in which FIG. 32A is a diagram illustrating a patterning shape of an upper transparent electrode, and FIG. 32B is a diagram illustrating a patterning shape of a lower transparent electrode.

FIGS. 35A and 35B are plan views of a light control film of Modification Embodiment 2.

FIGS. 36A and 36B are plan views of a light control film of a seventh embodiment.

PREFERRED MODE FOR CARRYING OUT THE INVENTION

First Embodiment (Vehicle)

Figure 1:
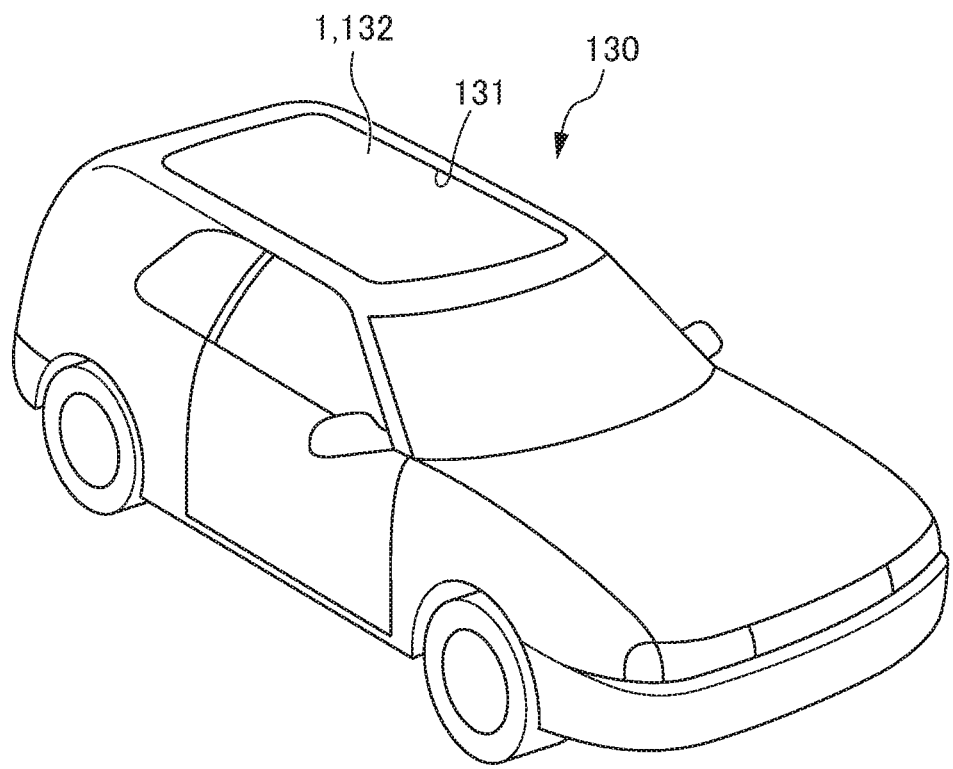
FIG. 1 is a diagram illustrating a vehicle of a first embodiment.

FIG. 1 is a diagram illustrating a vehicle 130 including a sunroof 132 to which a light control film 1 of a first embodiment is attached. The vehicle 130 is provided with an opening 131 to which the sunroof 132 is attached to cover the head of a passenger. A laminate of the light control film 1 is arranged at the opening 131 to form the sunroof 132. Here, an attachment method of the light control film 1 is not limited to a case where the light control film 1 is attached to the sunroof, and may also be applied to a case where the light control film 1 is attached to a portion of controlling light, such as a show window, other windows that is a portion of the vehicle on which external light is incident (for example, a front window, a side window, a rear window, a roof window, a sun visor, and the like), window glass of a building, a showcase, and an indoor transparent partition.

In the vehicle 130 of the this embodiment, a driver's seat is arranged at a right and front portion of the vehicle 130, and as illustrated in FIG. 1, the sunroof 132 is provided to cover from a front seat including the driver's seat to a rear seat. In addition, the light control film 1 is used as a laminate that is laminated on a transparent member forming the sunroof 132 by using a pressure-sensitive adhesive, an adhesive, or the like. The light control film 1 is not limited to the above description, and may be interposed between laminated glasses (transparent members). In addition, glass, a transparent resin substrate, or the like may be adopted for the transparent member.

(Basic Configuration of Light Control Film)

Figure 2:
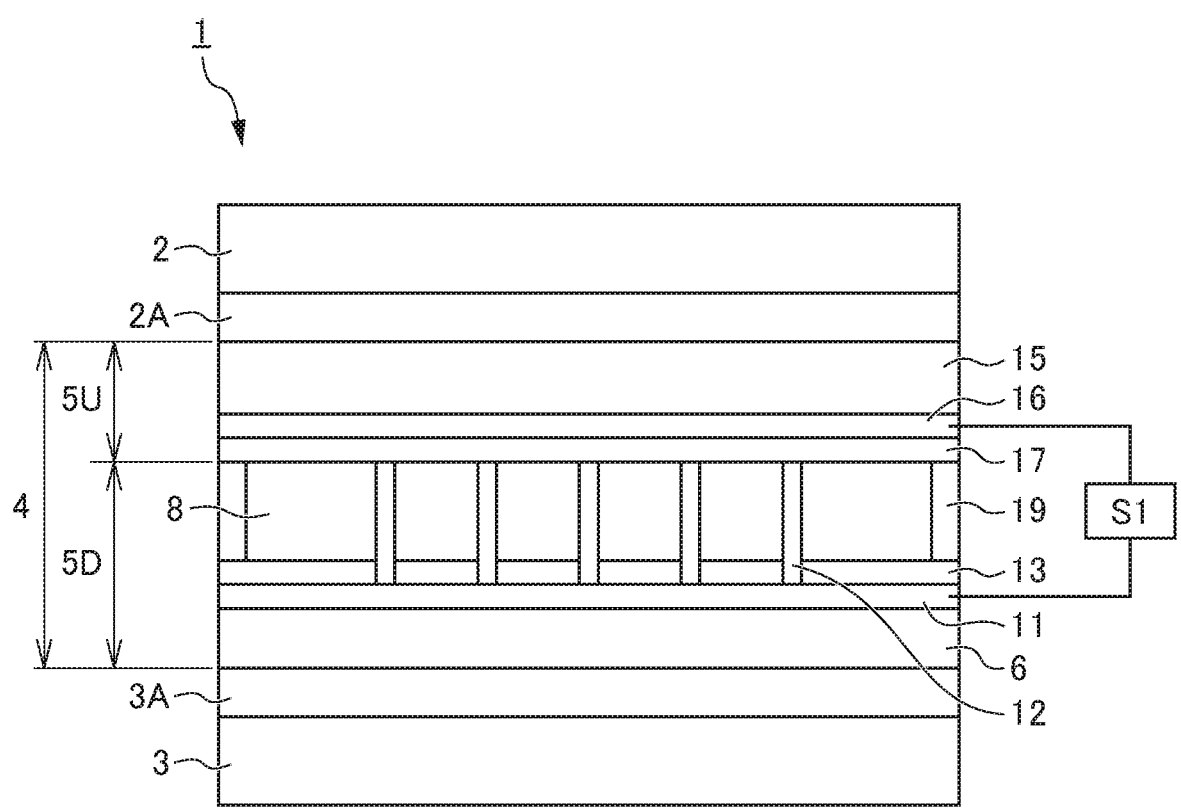
FIG. 2 is a sectional view illustrating a basic configuration of a light control film used in the vehicle of the first embodiment.

FIG. 2 is a sectional view illustrating a basic configuration of the light control film 1 used in the vehicle of the first embodiment. The light control film 1 is a film-like member that controls transmitted light with liquid crystals and is configured to interpose a liquid crystal cell 4 for a light control film between linear polarization plates 2 and 3.

(Linear Polarization Plate)

The linear polarization plates 2 and 3 are produced by interposing an optical functional layer between base materials of a transparent film material such as triacetyl cellulose (TAC). The optical functional layer has an optical function as a linear polarization plate, which is formed by the impregnation of iodine or the like in polyvinyl alcohol (PVA) and subsequent stretching. The linear polarization plates 2 and 3 are arranged in cross-nicol arrangement on the liquid crystal cell 4 with an adhesive layer such as an acrylic transparent pressure-sensitive adhesion resin. The linear polarization plates 2 and 3 are provided with phase difference films 2A and 3A for optical compensation on sides of the liquid crystal cell 4, respectively, but the phase difference films 2A and 3A may be omitted, as necessary.

(Liquid Crystal Cell)

The liquid crystal cell 4 is configured to interpose a liquid crystal layer 8 between a film-like lower laminate 5D and a film-like upper laminate 5U.

(Lower Side Laminate and Upper Side Laminate)

The lower laminate 5D is formed by laminating a transparent electrode (a lower transparent electrode and a second transparent electrode) 11, a spacer 12, and an alignment layer (a lower alignment layer) 13 on a base material (a lower base material) 6 of a transparent film material. The upper laminate 5U is formed by laminating a transparent electrode (an upper transparent electrode and a first transparent electrode) 16, and an alignment layer (an upper alignment layer) 17 on a base material (an upper base material) 15 of a transparent film material.

(Base Material)

Various transparent film materials may be applied as the base materials 6 and 15, and it may be desirable that a film material having small optical anisotropy is applied. In this embodiment, a polycarbonate film having a thickness of 100 µm is applied as the base materials 6 and 15, but film materials having various thicknesses may be applied, and a cycloolefin polymer (COP) film or the like may be applied.

(Transparent Electrode)

The transparent electrodes 11 and 16 in the shape of a plane, to which various electrode materials may be applicable, are formed of a transparent electrode material of indium tin oxide (ITO) in this embodiment.

(Spacer)

The spacer 12 is provided in order to define the thickness of the liquid crystal layer 8, and various resin materials may be applied to the spacer 12. In this embodiment, the spacer 12 is a photo-spacer made of a photoresist, which is produced by applying the photoresist onto the base material 6 which has been provided with the transparent electrode 11, and by exposing and developing the photoresist. The spacer 12 may be provided on the upper laminate 5U, or may be provided on both of the upper laminate 5U and the lower laminate 5D. In addition, the spacer 12 may be provided on the alignment layer 13. Further, a so-called bead spacer may alternatively be applied to the spacer.

(Alignment Layer)

The alignment layers 13 and 17 are formed of an optical alignment layer. Various materials to which an optical alignment method is applicable may be adopted widely as an optical alignment material applicable to the optical alignment layer. A photodimerization type material is used in this embodiment, for example. The photodimerization type material is disclosed in "M. Schadt, K. Schmitt, V. Kozinkov and V. Chigrinov: Jpn. J. Appl. Phys., 31, 2155 (1992)", "M. Schadt, H. Seiberle and A. Schuster: Nature, 381, 212(1996)", and the like. Furthermore, an alignment layer may be produced according to a rubbing treatment, and an alignment layer may be produced by performing a molding treatment with respect to a fine line-like concave-convex shape, instead of the optical alignment layer.

(Liquid Crystal Layer)

Various liquid crystal layer materials applicable to such a type of light control film 1 may be adopted for the liquid crystal layer 8. Specifically, for example, a liquid crystal material such as MLC2166 manufactured by Merck & Co. may be adopted for the liquid crystal layer 8. In this connection, a seal material 19 is arranged to surround the liquid crystal layer 8 in the liquid crystal cell 4, and the upper laminate 5U and the lower laminate 5D are integrally retained by the seal material 19. Accordingly, the leakage of the liquid crystal material is prevented. Here, for example, an epoxy resin, an ultraviolet curable resin, and the like may be as adopted for the seal material 19.

(Driving Power Source)

A driving power source S1 applies a driving voltage of a rectangular wave, of which the polarity is switched at regular intervals, between the transparent electrodes 11 and 16 of the light control film 1. When the driving voltage is applied to the transparent electrodes 11 and 16 provided in the upper laminate 5U and the lower laminate 5D, respectively, an electric field is generated in the liquid crystal layer 8. According to the electric field generated in the liquid crystal layer 8, the alignment of the liquid crystal layer material provided in the liquid crystal layer 8 is controlled. Accordingly, it is possible to control the transmitted light of the light control film 1 and to perform the control of light.

In the alignment control of the liquid crystal layer 8 of the light control film 1 of the present embodiment, a vertical alignment mode (VA, vertically-aligned) is applied. As for the VA mode, liquid crystal molecules of the liquid crystal layer 8 are vertically aligned in the absence of an electric field, in which the amplitude of the driving power source S1 is 0 V (when the driving voltage is 0 V), and the light control film 1 is in a light shielding state where incident light is shielded, accordingly. In addition, the liquid crystal layers of the liquid crystal layer 8 are horizontally aligned when the amplitude of the driving power source S1 increases to raise the driving voltage and the light control film 1 allows the incident light to transmit through, accordingly. In this connection, the liquid crystal cell 4 of this embodiment is driven by a so-called single domain.

(Fluctuation in Transmittance)

Figure 3:
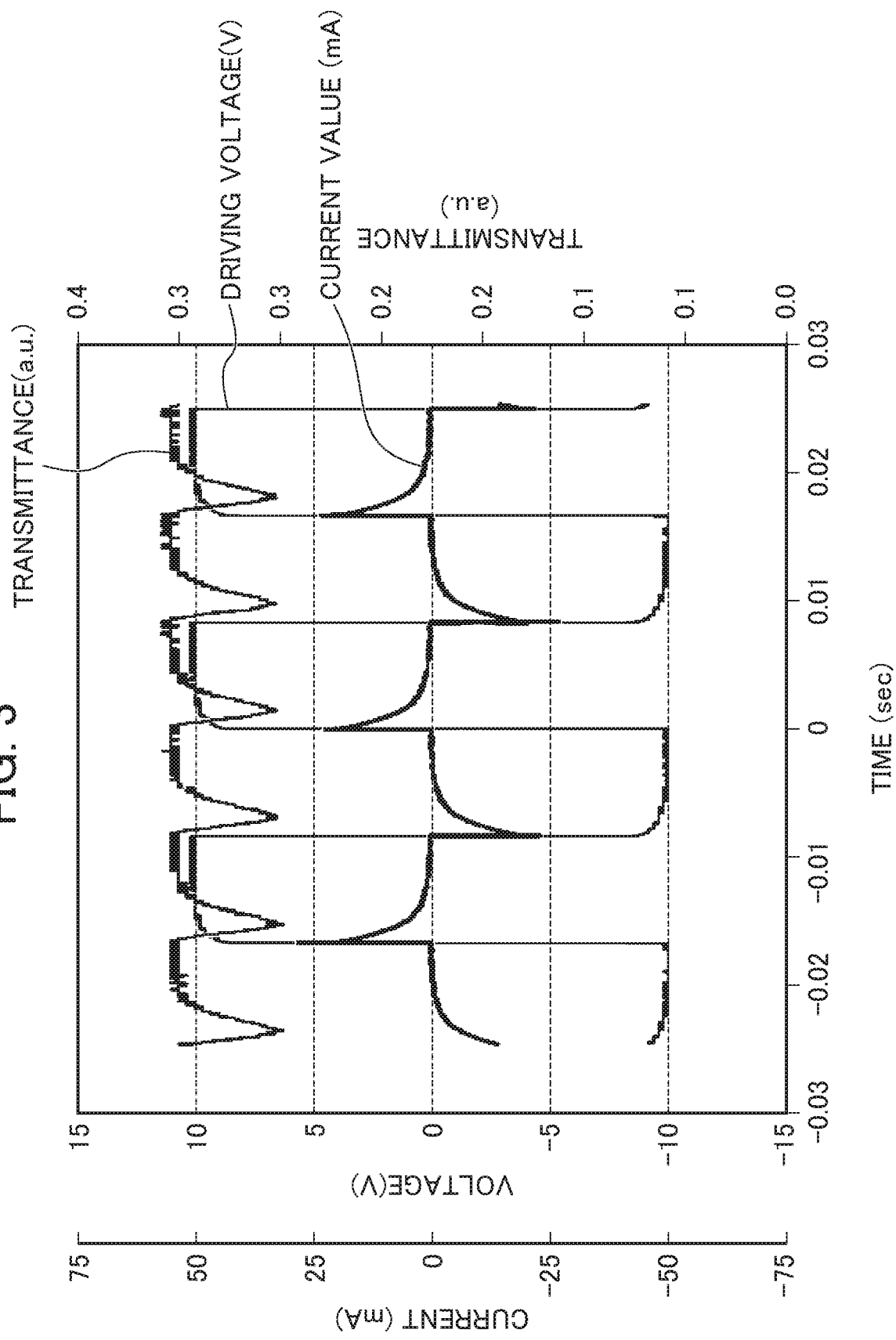
FIG. 3 is a graph illustrating a relationship between a driving voltage and a transmittance for the light control film.

FIG. 3 is a graph illustrating a relationship between the driving voltage and the transmittance in the light control film 1.

As illustrated, the driving voltage of the rectangular wave, of which the polarity is switched at the regular intervals, is applied from the driving power source S1 between the transparent electrodes 11 and 16 of the light control film 1. When the polarity of the driving voltage reverses, charge and discharge is executed with respect to electrostatic capacitance of the liquid crystal layer between the transparent electrodes 11 and 16. A time required for the charge and discharge changes according to the electrostatic capacitance of the light control film 1, a resistance value of the transparent electrodes 11 and 16, and a connection method from the power source. The charge and discharge is performed at a time constant of approximately 1 millisecond in the example of FIG. 2. The electrostatic capacitance increases as the area of the light control film 1 increases, and it is difficult to set the resistance value of the electrode to be less than a predetermined value. Accordingly, it may be difficult to shorten largely the time constant.

For this reason, a voltage having been applied to the liquid crystal layer 8 temporarily decreases, and as a result, the electric field acting on the liquid crystal molecules decreases instantaneously. Accordingly, the direction of the liquid crystal layer molecules of the liquid crystal layer changes temporarily according to a decrease in the electric field, and then, returns to the original state. Accordingly, the transmittance of the light control film 1 temporarily decreases. That is, the transmittance of the light control film 1 is not constant, but fluctuates at a first frequency identical to a frequency of a driving voltage change (hereinafter, referred to as a transmittance frequency).

(Flickering According to Relationship Between External Light and Transmittance Fluctuation)

When the external light of which an amount of light fluctuates at a second frequency (hereinafter, referred to as an external light frequency) transmits through the light control film 1 of which the transmittance fluctuates at a predetermined transmittance frequency, there is a case where "flickering" is observed in light transmitted through the light control film 1, according to a relationship between the transmittance frequency and the external light frequency. Here, it is difficult to recognize the flickering when a change in the amount of transmitted light is small, since the flickering is perceived according to the tone of the light. In addition, it is difficult to recognize the flickering insofar as a frequency, in general, is greater than or equal to 30 Hz.

(External Light Frequency)

Figure 4:
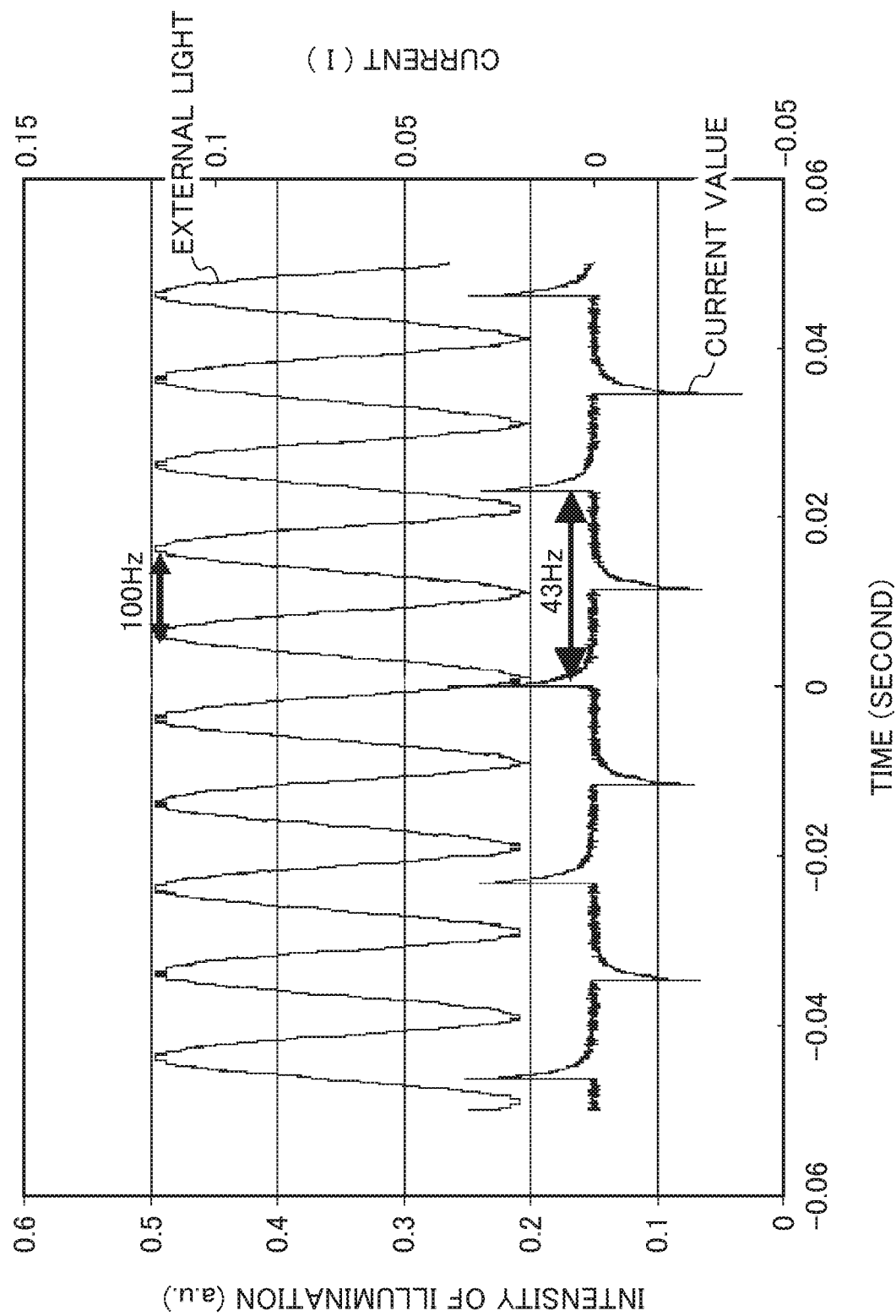
FIG. 4 is a measurement result of an amount of external light relative to emitted light of a fluorescent lamp.

FIG. 4 is a measurement result of the external light amount according to emitted light of a fluorescent lamp. In a case where the fluorescent lamp is driven by a commercial power source of a frequency of 50 Hz, intra-tube discharge occurs every half period of the commercial power source. Then, a fluorescent body emits light as a result of the intra-tube discharge, and allows the light to be emitted with an amount of light changing substantially in a sinusoidal wave at a frequency of 100 Hz. Accordingly, the amount of the external light from the fluorescent lamp changes at a frequency of 100 Hz, but it is not recognized as flickering since a frequency of changing is greater than or equal to 30 Hz.

In this connection, an amount of brightness is controlled by pulse-width modulation in an LED illumination device or the like, which has been recently used as a widespread illumination appliance. As for the pulse-width modulation, the amount of light changes largely and it is easily recognizable as flickering, accordingly. The LED illumination device or the like is driven at a frequency of greater than or equal to 100 Hz, which is higher than 30 Hz. In this connection, the frequency of the external light from the illumination device, the change of which results from such driving, is referred to as the external light frequency.

(Transmittance Frequency)

On the other hand, in a case where the frequency of the driving voltage of the light control film 1 (a frequency identical to the transmittance frequency) is high, an average transmittance decreases since the transmittance drops every time when the polarity switches. Therefore, it may be preferable that the frequency of the driving voltage (the transmittance frequency) is not as high as the external light frequency and the frequency of the driving voltage is greater than or equal to 30 Hz. In FIG. 4, the transmittance frequency is 43 Hz. As described above, it may also be possible to prevent the flickering of the transmitted light due to a change in the transmittance of the light control film itself in a case where the transmittance frequency is greater than or equal to 30 Hz.

Figure 5:
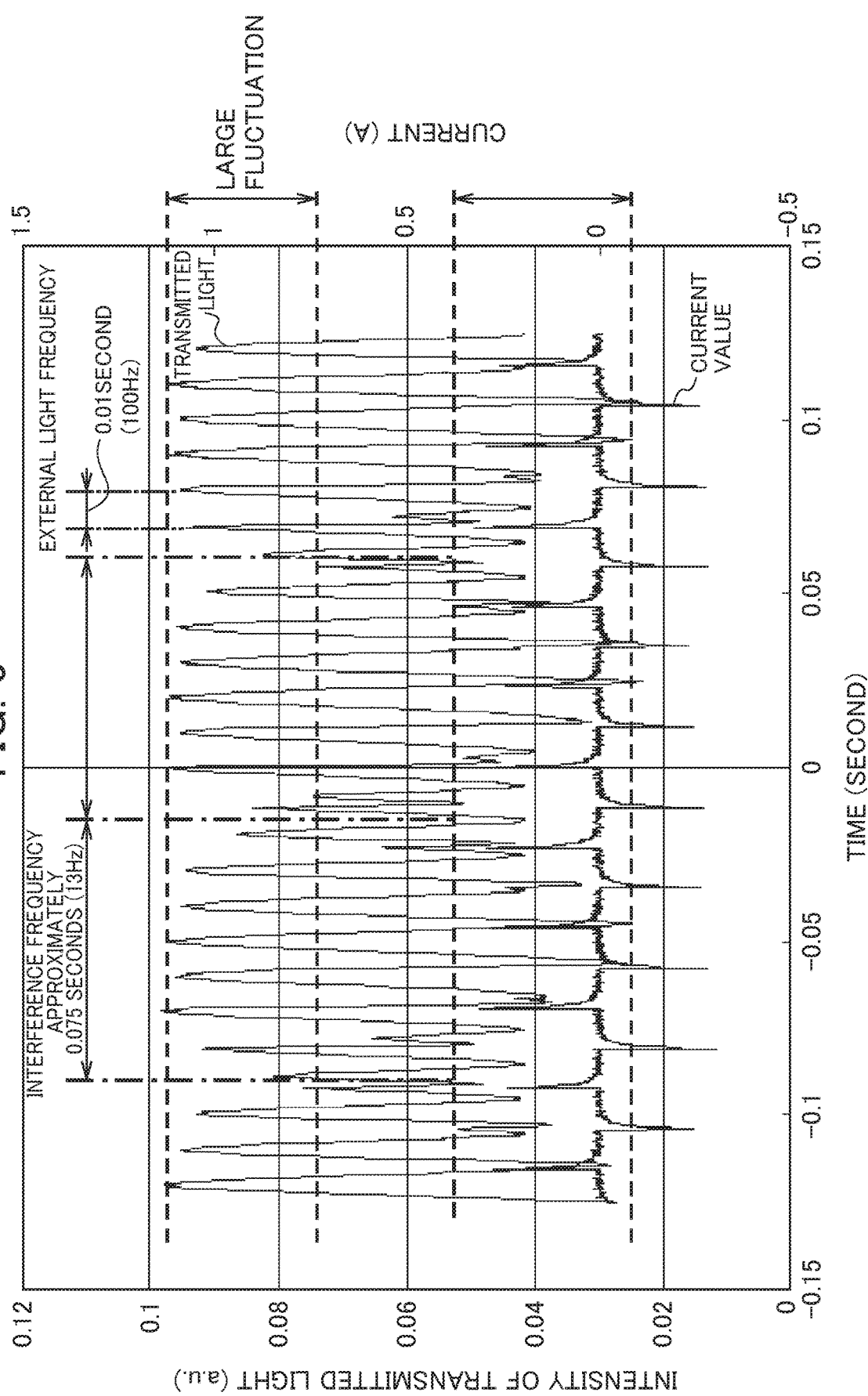
FIG. 5 is a graph illustrating a frequency of transmitted light when external light having an external light frequency of 100 Hz is transmitted through the light control film having a transmittance frequency of 43 Hz.

FIG. 5 is a graph illustrating the frequency of the transmitted light when the external light having an external light frequency of 100 Hz is transmitted through the light control film 1 having a transmittance frequency of 43 Hz. As illustrated, the amount of the transmitted light changes at a frequency identical to the external light frequency from the microscopic viewpoint. However, each peak of the external light frequency pulsates at the transmittance frequency. Accordingly, an interference wave having a third frequency of a wavelength of 0.075 seconds (13 Hz) (hereinafter referred to as an interference light frequency) occurs. The interference light frequency of 13 Hz, which is lower than the threshold frequency of 30 Hz over which it is difficult to recognize flickering, is recognized as flickering.

Figure 6:
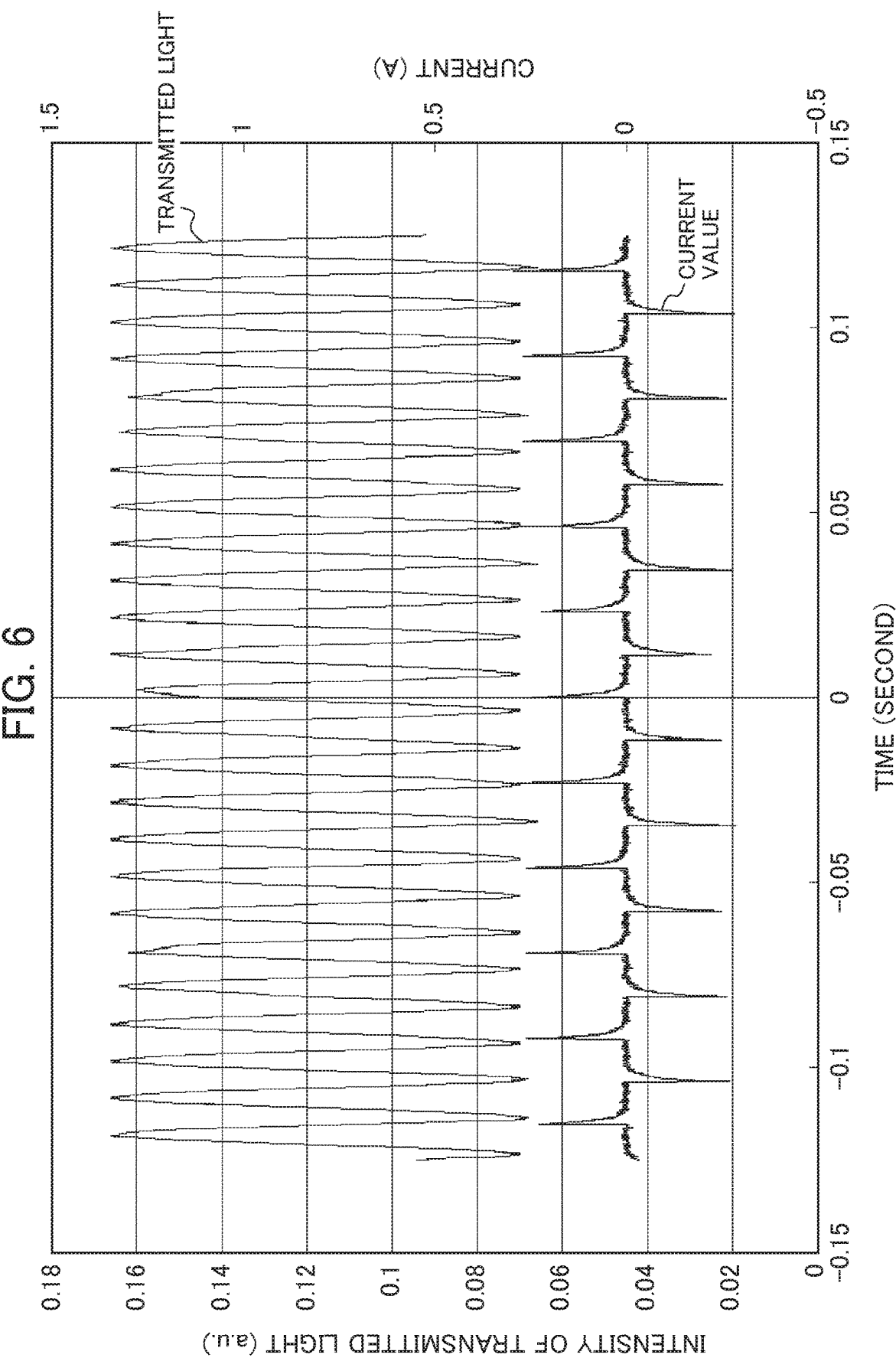
FIG. 6 is a graph similar to FIG. 5, in which a viewing angle direction is changed, using the same light control film under the same illumination as that of FIG. 5.

On the other hand, FIG. 6 is a graph similar to FIG. 5 under the same illumination with the same light control film as those of FIG. 5, when a viewing angle direction is changed. In this case, a modulation degree of the transmittance due to interference is low, and it is not recognized as "flickering". That is, the appearance of "flickering" differs when the viewing angle changes.

Next, a difference in the appearance of "flickering" according to an angle of observing the light control film 1 will be described.

Figure 7A:
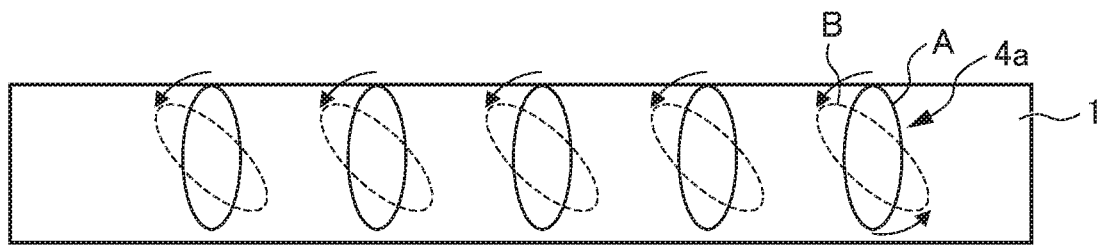
FIGS. 7A, 7B and 7C are diagrams illustrating the definition of an azimuthal angle or the like, in a single domain system.
Figure 7B:
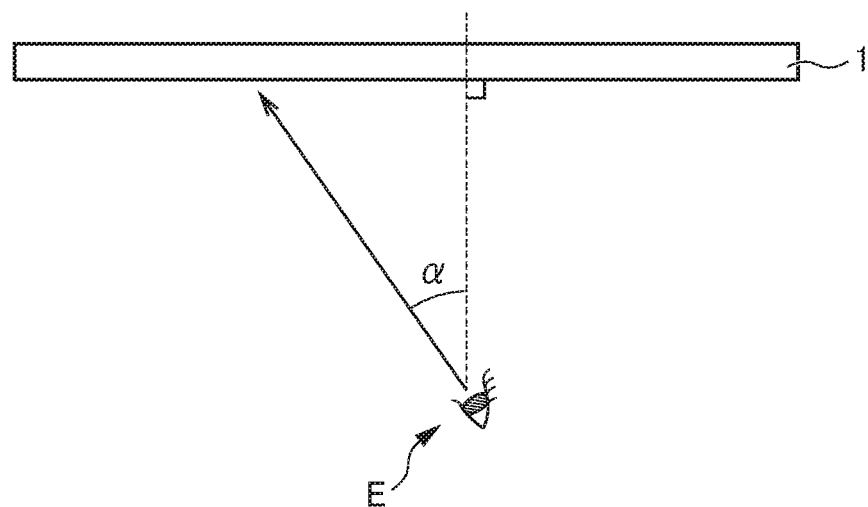
Figure 7C:
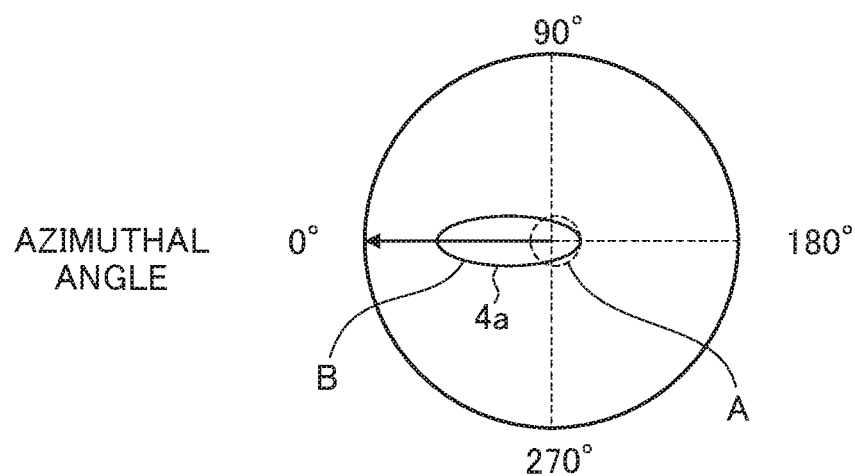

FIGS. 7A, 7B and 7C are each a diagram illustrating the definition of an azimuthal angle or the like in a single domain system.

FIG. 7A is a schematic sectional view of the light control film 1. State A indicates a state of liquid crystal molecules 4a in a case where an electric field is not generated between the transparent electrodes 11 and 16. Here, the liquid crystal molecules 4a are in a state of vertical alignment, in which a long axis direction is vertical to an in-plane direction of the light control film 1. State B indicates a state in which an electric field is generated and the liquid crystal molecules 4a are tilted. Here, the liquid crystal molecules 4a start to rotate towards a horizontal alignment such that the long axis direction of the liquid crystal molecules 4a agrees with the in-plane direction due to the electric field by the electrode.

FIG. 7B is a diagram illustrating a polar angle α which is an angle of observing the light control film. As illustrated, the polar angle of this embodiment, which is represented with a symbol a in FIG. 7B, is an angle between a normal direction of the light control film 1 (a thickness direction) and a direction in which an observer E observes the light control film 1 (an observation angle), when observing the light control film 1 upwardly from lower. Therefore, the polar angle α is 0°, when the observer E looks up directly above, that is, the light control film 1 is observed in a direction vertical to the film surface thereof.

FIG. 7C is a diagram illustrating an azimuthal angle of the liquid crystal molecules. A direction in which the liquid crystal molecules 4a fall is defined as an azimuthal angle of 0° in a clockwise direction, when an electric field is generated in the in-plane direction of the light control film 1.

Here, a relationship between the direction in which the liquid crystal molecules 4a fall and the direction in which the observer E observes the light control film 1 will be further described.

Figure 17:
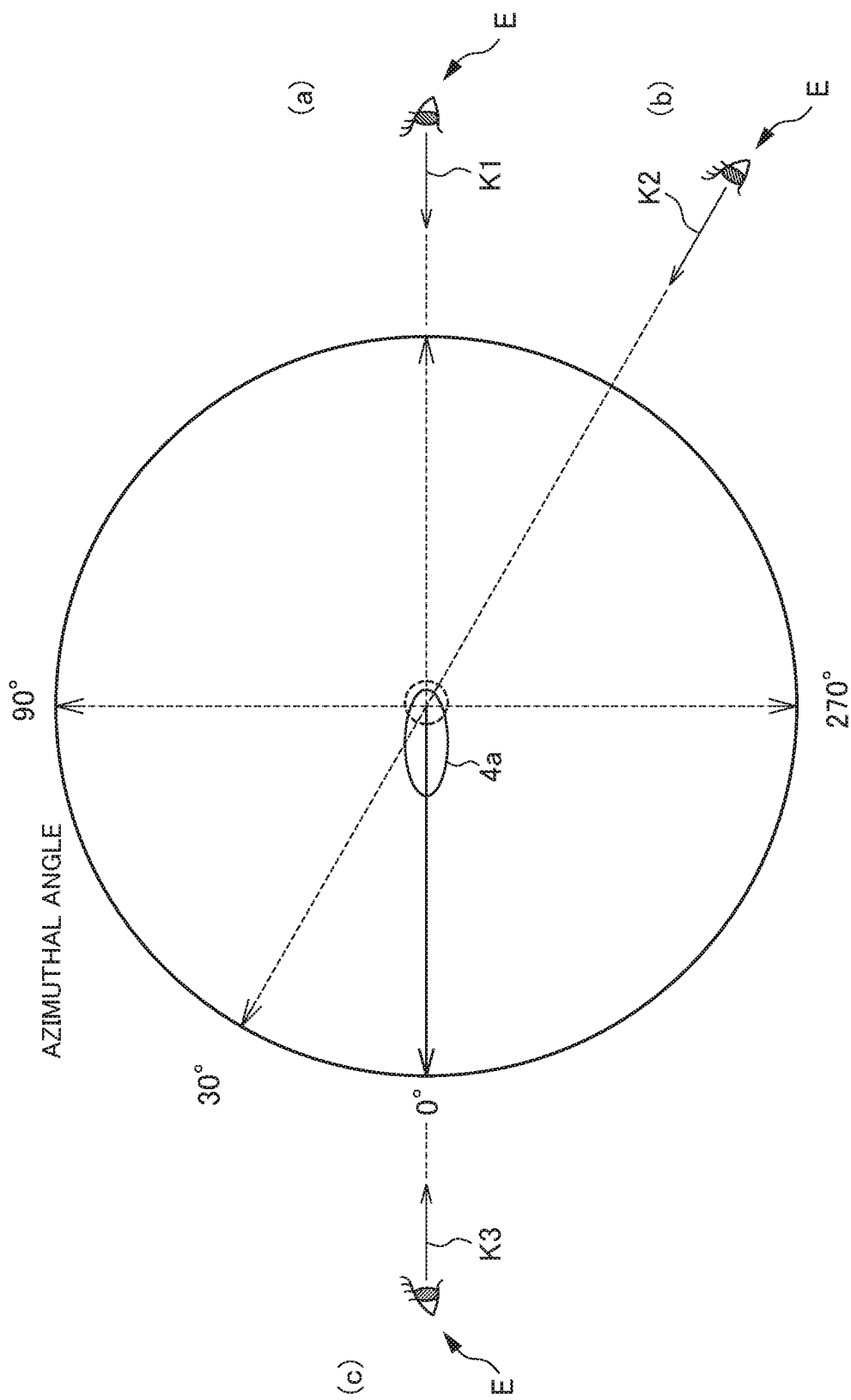
FIG. 17 is a diagram illustrating a direction in which the liquid crystal molecules fall in an in-plane direction of the light control film, and a direction in which the light control film is observed by an observer.

FIG. 17 is a diagram illustrating the direction in which the liquid crystal molecules 4a fall and the direction in which the observer E observes the light control film 1, in the in-plane direction of the light control film 1.

As described above, the direction in which the liquid crystal molecules 4a fall due to the generation of an electric field is set to an azimuthal angle of 0° in the in-plane direction of the light control film 1. At this time, for example, when the observer E observes the light control film 1 at an azimuthal angle of 0°, as illustrated with (a) in FIG. 17, a direction K1 in which the observer E observes the light control film 1 (the liquid crystal molecules 4a) is a direction of an azimuthal angle of 0° in the in-plane direction of the light control film 1. That is, an angle between a direction in which the observer E looks (a direction of observation) and an azimuthal angle of 0° is 0°.

In addition, for example, (b) and (c) in FIG. 17 illustrate that the light control film 1 is observed at an azimuthal angle of 30° and at an azimuthal angle of 180°, respectively, as illustrated in Directions K2 and K3 in which the observer E observes the light control film 1 (the liquid crystal molecules 4a) agree with directions of azimuthal angles of 30° and 180° in the in-plane direction of the light control film 1, respectively. That is, an angle between the direction in which the observer E looks (the direction of observation) and an azimuthal angle of 0° is 30° and 180°, respectively.

Figure 8:
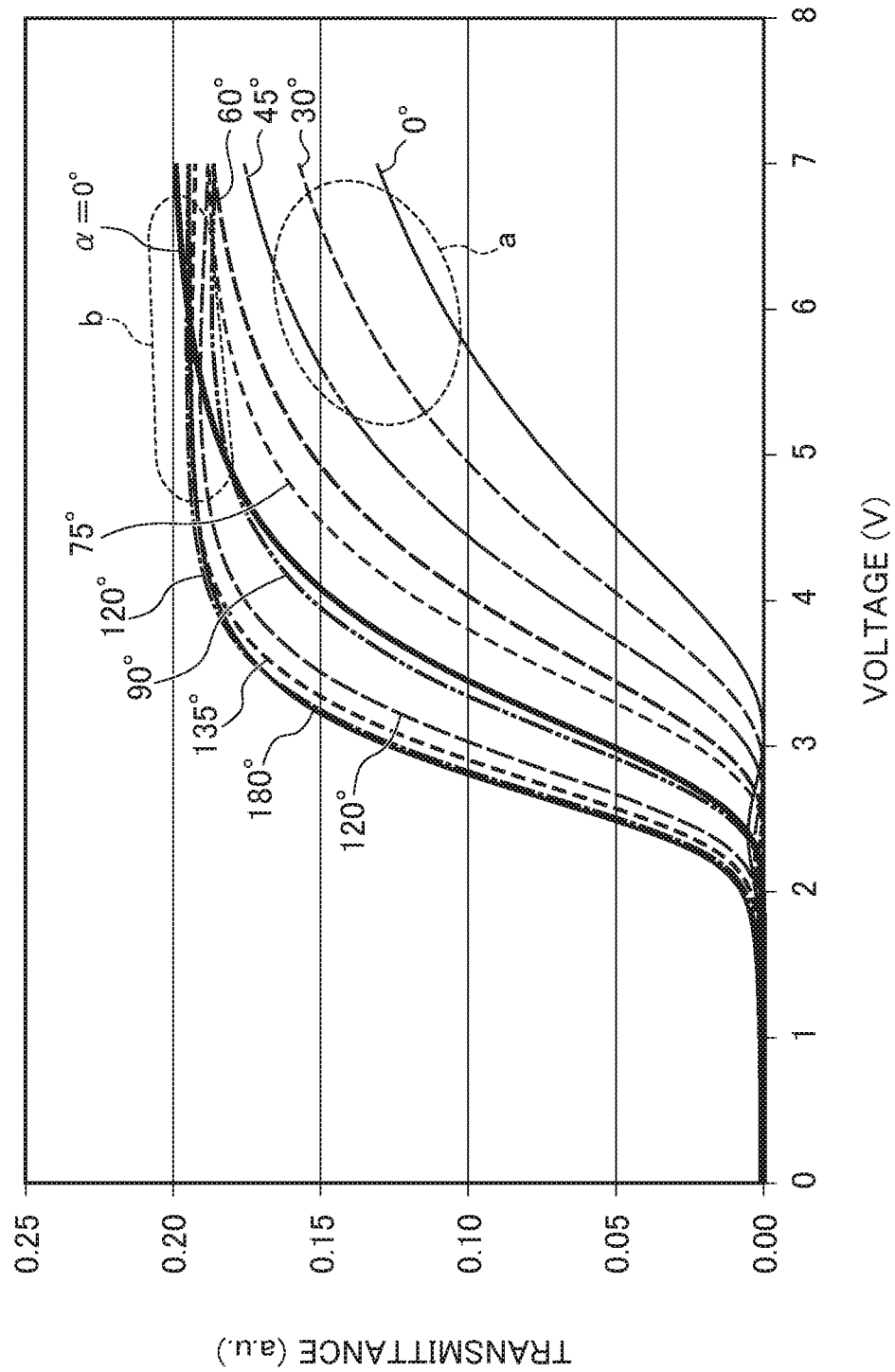
FIG. 8 is a graph illustrating a fluctuation in a transmittance with respect to an applied voltage when a voltage to be applied to the light control film is changed, and the light control film is observed from different angles.

FIG. 8 is a graph illustrating a fluctuation in a transmittance with respect to an applied voltage when the light control film 1 is observed from different angles by changing a voltage to be applied to the light control film 1. Furthermore, the light control film 1 is observed from below in the vehicle, similarly with a state in which the light control film 1 is attached to the sunroof 132.

"α=0°" represented in FIG. 8 corresponds to a case where the light control film 1 is observed from a front direction thereof, and indicates a state in which the observer looks up at the light control film 1 positioned directly above (on the head) from directly below. That is, it indicates a case where the light control film 1 is observed at 0° of the polar angle α. In addition, other angles of 0°, 30°, 45°, 60°, 75°, 90°, 120°, 135°, 150°, and 180°, illustrated in FIG. 8, are an azimuthal angle indicating an angle of observing the light control film 1. FIG. 8 indicates observation results in which the light control film 1 is looked up from below at a polar angle of 30° and at these azimuthal angles in the in-plane direction of the light control film 1. For example, "30°" in FIG. 8, indicates a state in which the light control film is looked at the polar angle α of 30°, and a case where the light control film 1 is observed at an azimuthal angle of 30° (a direction of 30° with respect to an azimuthal angle of 0°).

In addition, in FIG. 8, and FIG. 13 and FIG. 16 described below, the transmittance is calculated under the condition that the light control film 1 observed from below. The transmittance is calculated by an LCD master manufactured by Shintech Co., Ltd. In addition, the falling of the liquid crystal molecules 4a according to the application of the voltage occurs in a fashion in which a lower end of the liquid crystal molecules 4a is fixed and an upper side thereof falls.

As illustrated in FIG. 8, when the light control film 1 is observed at an azimuthal angle of 180°, that is, when the liquid crystal molecules 4a fall in a forward direction, in the in-plane direction of the light control film 1, the transmittance starts to change at a comparatively low voltage and does not change as the voltage increases subsequent to reaching a saturated transmittance.

As illustrated in FIG. 8, a fluctuation in the transmittance with respect to a voltage change is small in a range of approximately 4 V to 7 V, in a case where the light control film 1 is observed at an azimuthal angle of approximately 120° to 180°, surrounded by a dot-and-dash line b, for example, compared to a case where the light control film 1 is observed at an azimuthal angle of approximately 0° to 45°, surrounded by a dotted line a. At this time, the rotation of the liquid crystal molecules does not stop, but the liquid crystal molecules continuously rotate since the transmittance at 0° to 45° fluctuates. This is a state in which a change in the transmittance is not recognizable depending on the visual angle of the observer.

A fluctuation in the transmittance, which results in flickering, is caused by the slight rotation of the liquid crystal molecules from a horizontal alignment toward a vertical alignment due to switching of the polarity of the voltage applied to the liquid crystal molecules. However, since the liquid crystal molecules do not completely but slightly return to the vertical alignment, it is difficult to recognize flickering in a case where a fluctuation in the transmittance is small with respect to such amount of movement. Therefore, in order to make it difficult to recognize flickering, the light control film 1 may be arranged to be observed in a direction where a fluctuation in the transmittance is small with respect to a fluctuation in the voltage.

In a case where the light control film 1 is attached to the sunroof 132 of the vehicle 130, there is a bias in a direction where the light control film 1 is observed by a passenger. That is, a possibility that a passenger on a rear seat looks at the sunroof 132 is the highest and a possibility that a driver looks at the sunroof while driving is low. Then, a possibility (a frequency) that both of the passenger and the driver look at the front side of the sunroof is high, but a possibility that both turn around and look at the rear side of the sunroof is low.

For this reason, the direction in which the liquid crystal molecules 4a fall (a direction of an azimuthal angle of 0°) is determined such that it is difficult to recognize flickering in this embodiment, for a case where the passenger (in particular, the passenger on the rear seat) looks at the front of the sunroof 132, of which an observation possibility is the highest.

As described above, according to FIG. 8, in a case where the light control film 1 is observed at an azimuthal angle of 120° to 180°, surrounded by the dot-and-dash line b, a fluctuation in the transmittance of the light control film 1 is small with respect to a change in the voltage. It is more difficult to recognize flickering as a fluctuation in the transmittance is smaller. Therefore, it may be preferable that the light control film 1 is arranged on the sunroof 132 such that a direction in which the passenger on the rear seat observes the sunroof 132 is in the vicinity of an azimuthal angle of 120° to 180°.

Figure 9:
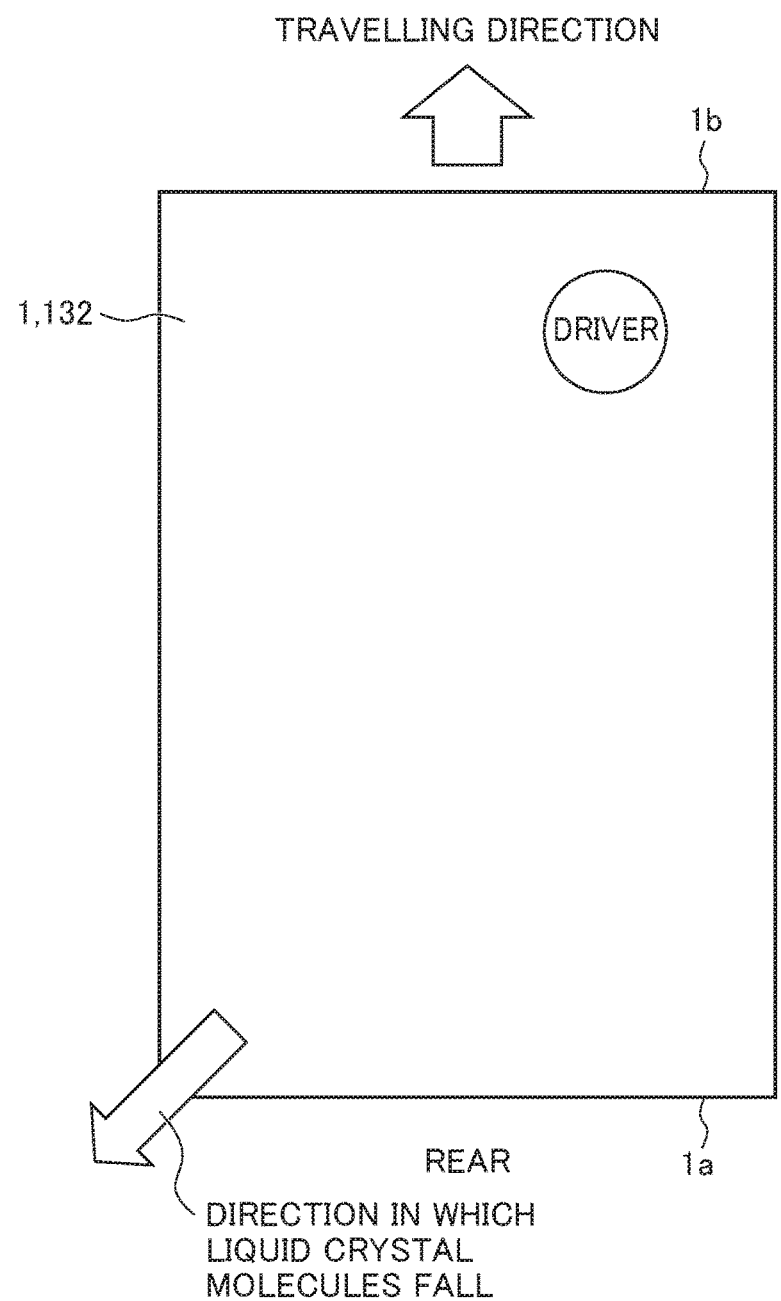
FIG. 9 is a diagram illustrating spatially a direction in which liquid crystal molecules of the light control film arranged on the sunroof fall with respect to an interior of the vehicle.

FIG. 9 is a diagram illustrating a relationship between the direction in which the liquid crystal molecules 4a of the light control film 1 arranged on the sunroof 132 fall and positions in the vehicle.

As described above, it may be preferable that the light control film 1 is arranged on the sunroof 132 such that the direction in which the passenger on the rear seat of the vehicle 130 observes the sunroof 132 is in the vicinity of an azimuthal angle of 120° to 180°, from the viewpoint of reducing flickering. That is, it may be preferable that the light control film 1 is attached to the vehicle 130 such that the liquid crystal molecules 4a fall to the rear of the vehicle 130 (including the diagonal rear).

In this embodiment, as illustrated in FIG. 9, the liquid crystal molecules 4a are configured to fall to the left-diagonal rear, as an example. Furthermore, in this embodiment, as described above, the driver's seat is arranged in the right-front portion, but in a case where the driver's seat is arranged in a left-front portion, the liquid crystal molecules 4a fall to the right-diagonal rear.

The reason why the liquid crystal molecules 4a diagonally fall is described below.

The light control film 1 is produced in a rectangular shape in the plan view, and slow axis directions of the linear polarization plates 2 and 3 are set to be parallel to one side of the rectangular shape. The linear polarization plate is manufactured such that the slow axis direction agrees with a horizontal direction or a vertical direction in order to increase the number of linear polarization plates in manufacturing the linear polarization plates 2 and 3 in a rectangular shape. On the other hand, the direction in which the liquid crystal molecules 4a of the light control film 1 fall is a diagonal angle with respect to a slow axis. Therefore, the direction in which the liquid crystal molecules 4a of the light control film 1 fall is diagonal to a travelling direction of the vehicle 130. In such a case, it is possible to reduce flickering sufficiently for practical use.

Here, in a case where it is possible to allow a decrease in the number of linear polarization plates in the manufacturing procedure and to ensure the sufficient number of linear polarization plates by setting the slow axis direction of the linear polarization plates 2 and 3 in line with a diagonal direction, the light control film 1 may be attached to the sunroof 132 such that the liquid crystal molecules 4a fall rearward in a reverse direction of the travelling direction (rearward at an angle of 180° with respect to the travelling direction), but not in line with the diagonal rear with respect to the travelling direction of the vehicle 130. Under this condition, the passenger on the rear seat of the vehicle 130 observes the sunroof 132 and the light control film 1 at an azimuthal angle of 180°, and it is possible to reduce flickering more effectively compared to a case where the liquid crystal molecules 4a are arranged to fall diagonally rearward.

The reason why the liquid crystal molecules 4a fall diagonally rearward is that a direction in which the driver turns back, that is, the direction of the left-diagonal rear, is set to an azimuthal angle of 0° because a possibility that the driver positioned in the right-side front portion turns back and looks at the sunroof is low.

At this time, more specifically, in a case where the driver's seat is arranged in the right-side front portion of the vehicle 130, it may be preferable that the direction in which the liquid crystal molecules 4a fall (a direction of an azimuthal angle of 0°) agrees with a direction of 135° counterclockwise with respect to the travelling direction of the vehicle 130. In addition, in a case where the driver's seat is arranged in the left-side front portion of the vehicle 130, it may be preferable that the direction in which the liquid crystal molecules 4a fall agrees with a direction of 135° clockwise with respect to the travelling direction of the vehicle. It may be most preferable from a point of symmetrical consideration that the direction in which the liquid crystal molecules 4a fall agrees with a direction of 180° with respect to the travelling direction of the vehicle 130. However, a use efficiency of the polarization plate decreases to result in a cost increase in this case as described above. For this reason, it may be preferable that the direction in which the liquid crystal molecules 4a fall (a direction of an azimuthal angle of 0°) agrees with a direction of 135° counterclockwise or clockwise with respect to the travelling direction of the vehicle 130.

According to this embodiment, when the passenger observes a portion of the sunroof 132, the portion being located front apart from right overhead of the seat on which the passenger is seated, a fluctuation in the transmittance of the light control film 1 of the sunroof 132 is recognized smaller than the sunroof 132 is observed from other directions. Accordingly, when the passenger observes the external light through the sunroof 132, it is difficult to observe flickering.

(Relationship with Respect to Electricity Supply Position)

Figure 10:
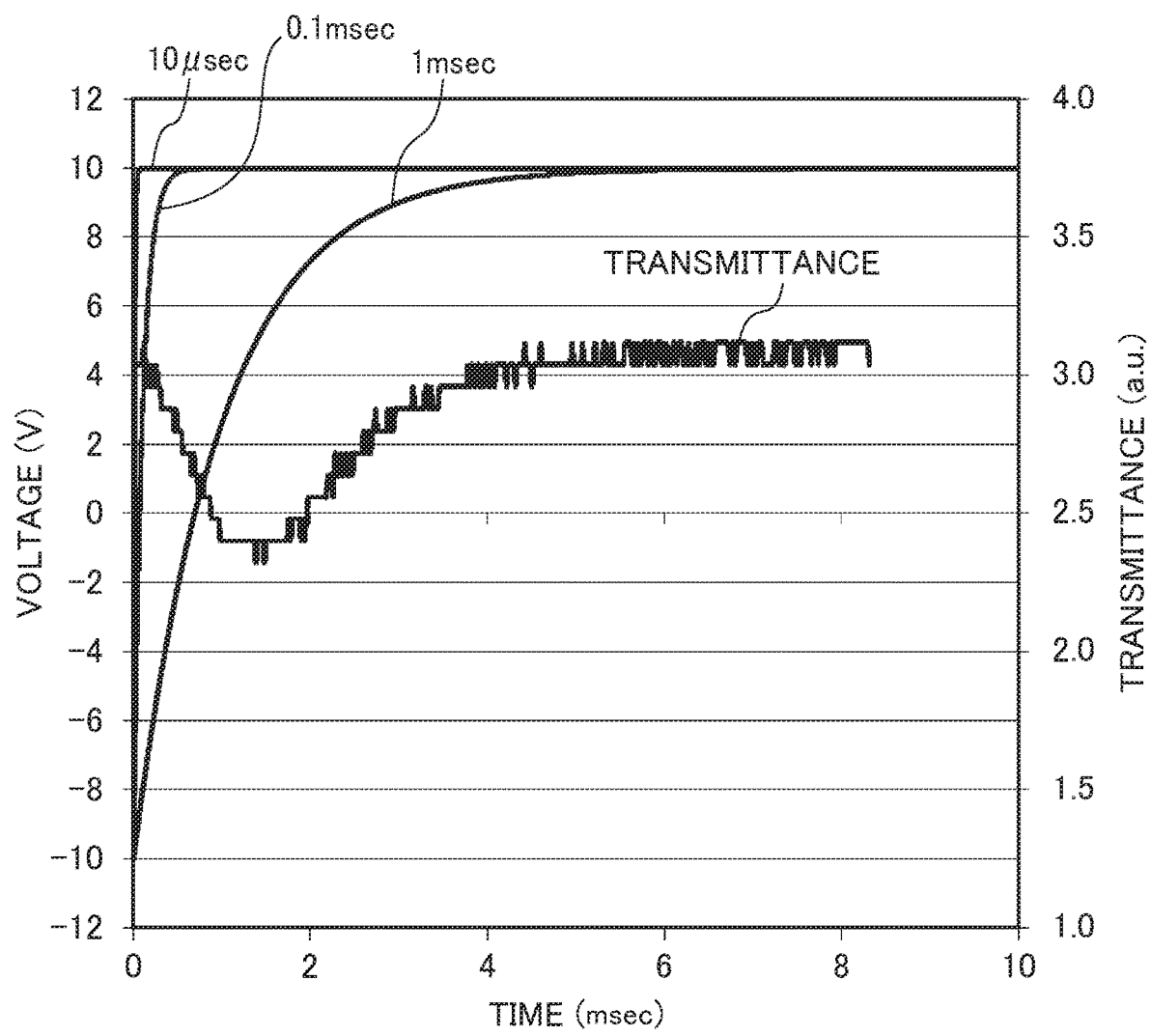
FIG. 10 is a graph illustrating a change of a voltage when the polarity of a voltage to be applied to the light control film is reversed.

FIG. 10 is a graph illustrating a voltage change when the polarity of the voltage applied to the light control film 1 reverses. FIG. 10 shows a relationship between an elapsed time and the voltage in a predetermined portion when a voltage of 10 V is applied to the transparent electrode 11, for a case where time constants are 10 μsec, 0.1 msec and 1 msec. As illustrated, as a time constant becomes longer, a period of time in which the voltage of the transparent electrode 11 is lower than 10 V is long, that is, an increase in the voltage becomes moderate.

When the increase in the voltage becomes moderate, the liquid crystal molecules are rotated due to the influence of the voltage. Consequently, the transmittance of the light control film 1 fluctuates. The graph of the transmittance in FIG. 10 illustrates a fluctuation in the transmittance when the time constant is 1 msec.

In addition, as a distance from the electricity supply position increases, the time constant becomes longer. Accordingly, when the distance from the electricity supply position increases in the light control film 1, an increase in the voltage becomes moderate to cause as a result the liquid crystals to rotate and the transmittance to fluctuate, such that flickering is easily viewed. Further, as the distance from the electricity supply position increases, the voltage does not increase completely within the time constant and an effective voltage becomes lower, accordingly.

Figure 11:
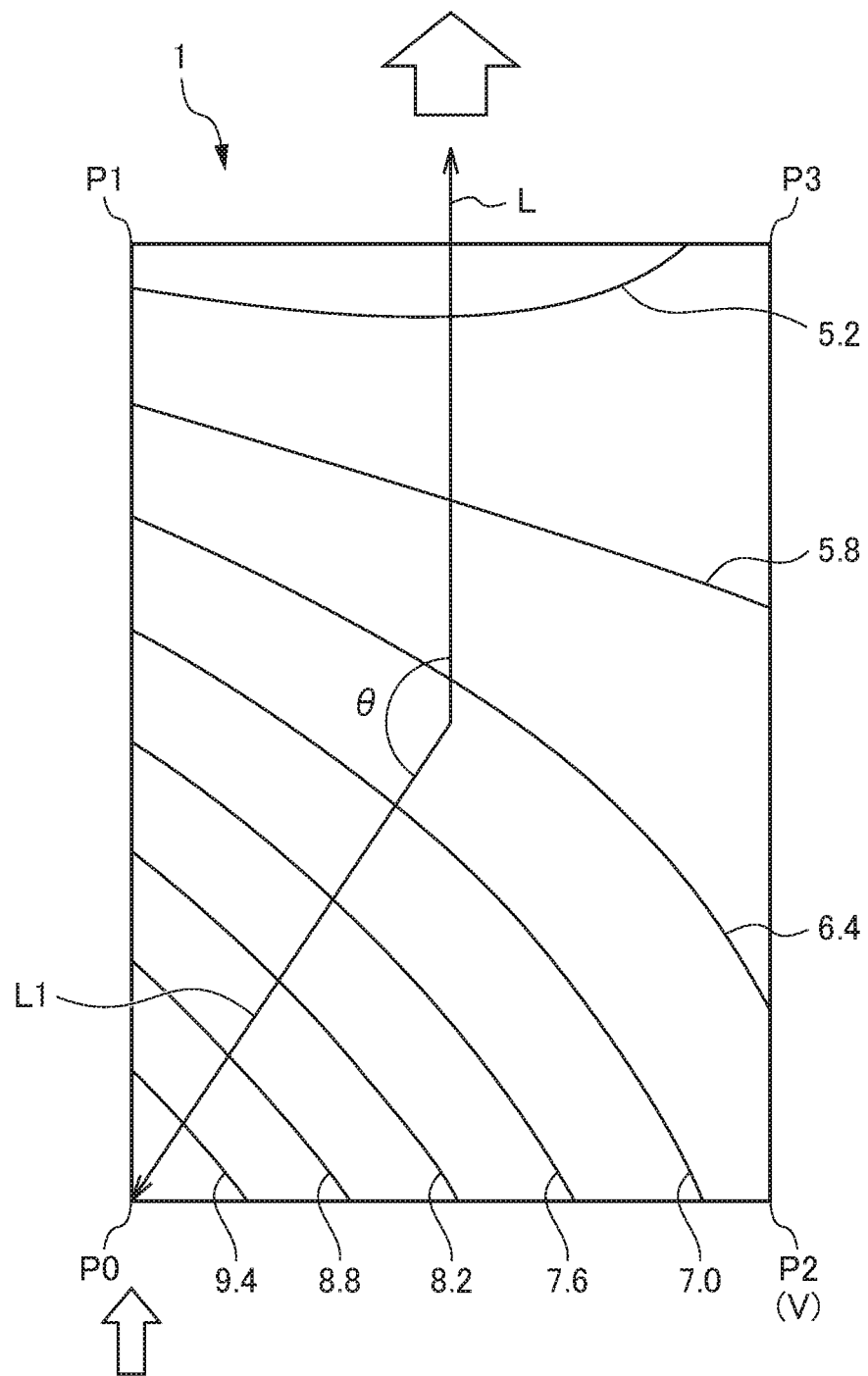
FIG. 11 is a diagram illustrating a result of simulating a relationship between an interior position and a voltage of the light control film immediately after electricity is supplied to the light control film from one location.

FIG. 11 is a diagram illustrating a result of simulating a relationship between a position and a voltage in the light control film 1 immediately after electricity is supplied from an electricity supply position P0 of the transparent electrode 11 of the light control film 1 of this embodiment.

In the embodiment, a left-diagonal rear position of the light control film 1 illustrated with an arrow in the drawing corresponds to the electricity supply position P0. The left-diagonal rear represents a position on a line L1 tilted by an angle of θ with respect to a line L directed from the center of the light control film 1 towards front of the vehicle 130 in the travelling direction, in an edge portion of the light control film 1. The angle θ is greater than 90° and less than 180°.

As illustrated in FIG. 11, an effective voltage of the left-diagonal rear close to the electricity supply position P0 is high and the effective voltage becomes lower as the distance from the electricity supply position P0 increases. A time constant of the left-diagonal rear close to the electricity supply position P0 is short and the time constant becomes longer as the distance from the electricity supply position P0 increases. Accordingly, a fluctuation in the transmittance of the left-diagonal rear close to the electricity supply position P0 is small and a possibility of flickering observed is low. The fluctuation in the transmittance is large and flickering is easily viewed as the distance from the electricity supply position P0 increases.

First, descriptions will be given of a case where the electricity supply position with respect to the light control film 1 is provided in the right-diagonal front of the vehicle 130. With the case described above, a fluctuation in the liquid crystal molecules due to a polarity switching decreases in the right-diagonal front around the electricity supply position. However, the fluctuation in the liquid crystal molecules increases in the vicinity of the left-diagonal rear far from the electricity supply position.

At this time, light passing diagonally through the light control film 1 from front to rear of the vehicle 130 is incident light coming in a direction in which a transmittance fluctuation is small (a direction of an azimuthal angle of 120° to 180°) with respect to a fluctuation in the liquid crystal molecules. Accordingly, it is difficult to recognize flickering due to a fluctuation in the liquid crystal molecules resulting from the polarity switching of the voltage. Therefore, it is also difficult to recognize flickering for the light passing through a region far from the electricity supply position at the rear of the vehicle.

However, since light diagonally passing through the rear region of the light control film 1 from rear to front of the vehicle 130, is in a direction in which a fluctuation in the transmittance is large (a direction of an azimuthal angle of 0° to 45°), as with a case where the passenger of the vehicle looks up rearward in the vehicle, a fluctuation in the liquid crystal molecules due to the polarity switching of the voltage is recognized easily as flickering.

In addition, most of the light diagonally passing through the front region of the light control film 1 from rear to front of the vehicle 130 passes through the front glass and travels into an exterior of the vehicle 130. Therefore, if the electricity supply position is arranged on the front of the vehicle and a fluctuation in the liquid crystal molecules in the front region of the light control film 1 decreases, it is not possible to obtain such an effect.

In contrast, in a case where the electricity supply position is arranged at the rear of the vehicle 130 and light is diagonally transmitted through the light control film 1 from diagonal rear to front of the vehicle 130, a fluctuation in the liquid crystal molecules in the rear region of the vehicle 130 close to the electricity supply position decreases Accordingly, it is possible to suppress flickering.

In addition, as with a case where the electricity supply position is positioned on the front of the vehicle 130, most of the light diagonally passing through the front region of the light control film 1 toward the front in the vehicle, passes through the front glass and travels into the exterior of the vehicle. Accordingly, it is difficult to visually recognize flickering.

Furthermore, as for light transmitted through the light control film 1 in a right overhead direction of the vehicle body of the vehicle 130 (light transmitted through the light control film 1 from a normal direction of a front surface of the light control film 1), it is difficult to recognize flickering when viewed in any direction.

Accordingly, in order to reduce flickering for a case where light is diagonally incident on the light control film 1 from the rear of the vehicle, it may be preferable that the electricity supply position P0 of the light control film 1 is disposed at the rear of the vehicle 130, that is, the rear from the center of the light control film 1 in a front-rear direction of the vehicle 130, and at the edge portion of the light control film 1. In addition, it may be preferable that the electricity supply position P0 of the light control film 1 is provided somewhere on a side 1*a* which is the rear of the vehicle 130, as illustrated in FIG. 9.

Therefore, in this embodiment, the electricity supply position P0 is set to the left-diagonal rear of the vehicle 130, as an example. Here, as described above, in this embodiment, the liquid crystal molecules 4*a* of the light control film 1 fall to the left-diagonal rear of the vehicle 130 in the in-plane direction of the light control film 1, and when the passenger in the vehicle observes the sunroof, it is difficult to recognize flickering in the front of the vehicle 130, but it is easy to recognize flickering in the rear compared to the front.

As described above, as a result of the electricity supply position P0 being set to the left-diagonal rear of the vehicle 130, it is possible that flickering hardly occurs in the left-diagonal rear. In a case where the electricity supply position P0 is located at the left-diagonal rear, flickering easily occurs in the right-diagonal front, far from the electricity supply position P0. However, as described above, it is difficult to recognize flickering in the front since the liquid crystal molecules 4a fall to the left-diagonal rear of the vehicle 130. Therefore, even if the left-diagonal rear is the electricity supply position P0, a possibility that flickering is recognized in the front is low.

As described above, according to this embodiment, it is possible that flickering hardly occurs for light incident from both front and rear of the light control film 1. For this reason, the passengers in the vehicle do not sense any flickering inside the vehicle or feel uncomfortable.

Furthermore, in this embodiment, it may be preferable that the electricity supply position P0 of the light control film 1 is located at the rear of the vehicle 130, and an example where the electricity supply position P0 is provided at the left-diagonal rear of the vehicle 130 has been described. However, the electricity supply position P0 may be located at the front of the vehicle 130 in the case of emphasizing a flickering reduction effect in the sunroof 132 on the front side of the vehicle 130 or the case of considering flickering in light that is diagonally incident from rear to front of the sunroof 132 (the light control film 1). In this case, specifically, it may be preferable that the electricity supply position P0 is provided somewhere on a side 1b illustrated in FIG. 9.

Second Embodiment

Next, a light control film of a second embodiment will be described. The second embodiment is different from the first embodiment in that liquid crystal molecules 4a of a light control film 1 are arranged in a multi-domain system. Other features are similar to those of the first embodiment, and thus, the repeated description will be omitted.

Figure 12:
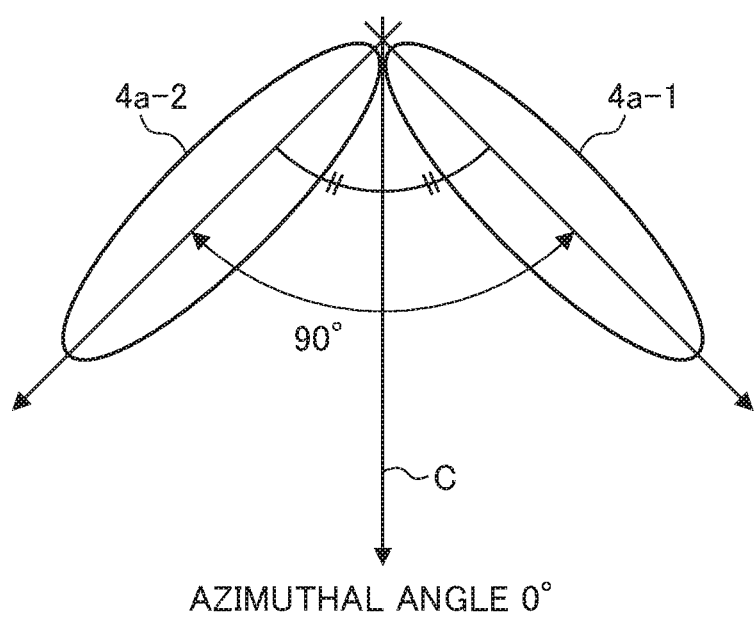
FIG. 12 is a diagram illustrating an azimuthal angle in a multi-domain system of a second embodiment, and illustrates a case where liquid crystal molecules fall in directions crossing each other at 90°.

FIG. 12 is a diagram illustrating an azimuthal angle in a multi-domain system of two domains, and illustrates a case where liquid crystal molecules 4a-1 and 4a-2 of respective domains fall at an angle of 90° to each other.

As illustrated in FIG. 12, the liquid crystal molecules 4a-1 and 4a-2 fall in directions at an angle of 90° crossing each other with a voltage applied in the in-plane direction of the light control film 1, in this embodiment. In this case, a direction of an arrow C which divides evenly the angle of the directions in which two liquid crystal molecules 4a-1 and 4a-2 fall is set as an azimuthal angle of 0°.

Figure 13:
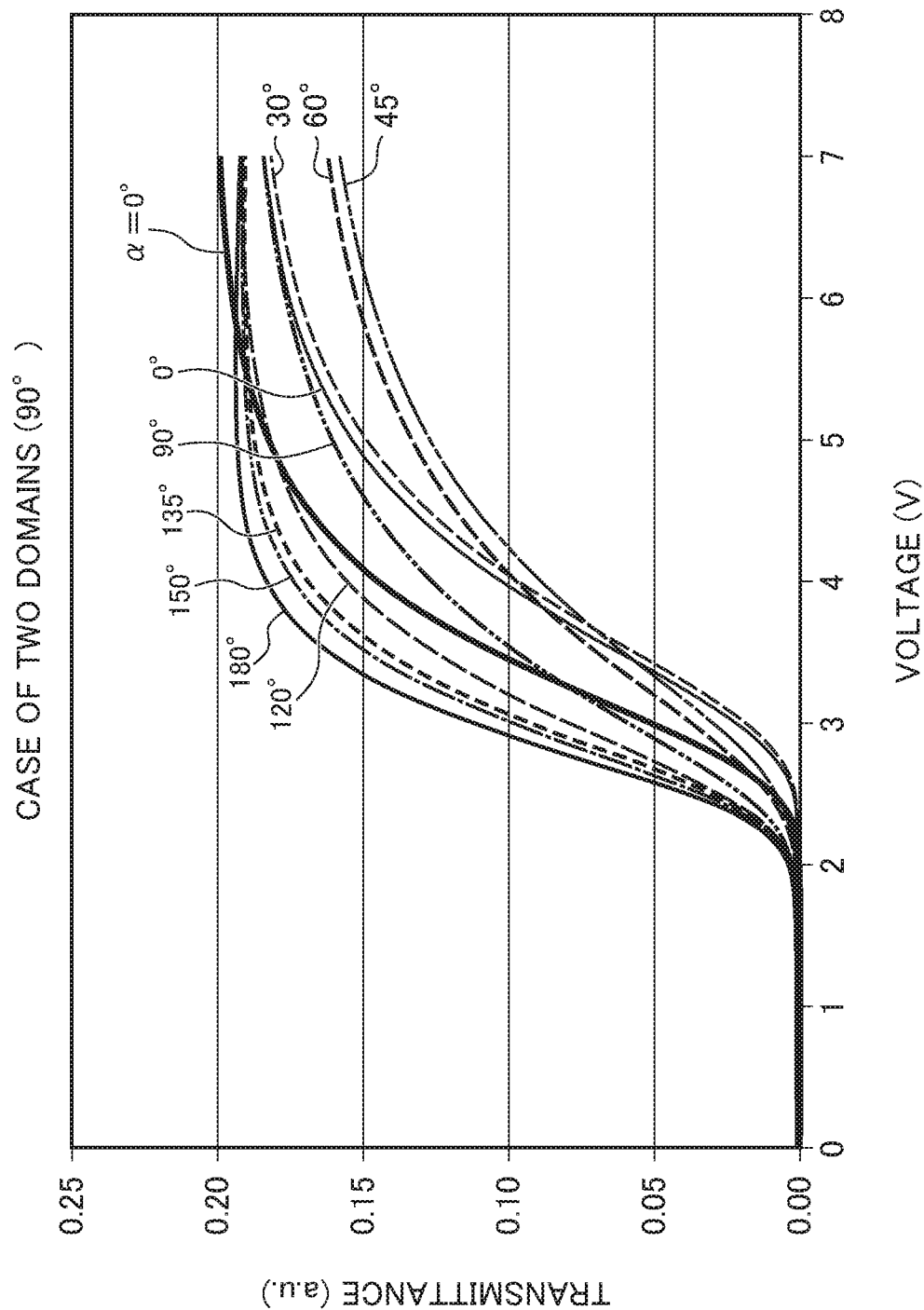
FIG. 13 is a graph illustrating a fluctuation in a transmittance with respect to an applied voltage when a light control film of the second embodiment is observed from different angles.

FIG. 13 is a similar graph to that of FIG. 8 of the first embodiment in the case of FIG. 12, and is a graph illustrating a fluctuation in the transmittance with respect to an applied voltage when the light control film 1 is observed from different angles by changing the voltage to be applied to the light control film 1.

"α=0°" represented in FIG. 13 indicates a state in which the light control film positioned directly above is looked up from directly below. That is, it is a case where the light control film 1 is observed at a polar angle α of 0°, similarly with FIG. 8 described above. In addition, other angles of 0°, 30°, 45°, 60°, 75°, 90°, 120°, 135°, 150° and 180° shown in FIG. 13 are azimuthal angles indicating angles of observing the light control film 1. FIG. 13 indicates a state in which the light control film 1 is looked up from the bottom at a polar angle of 30° and at each azimuthal angle in the in-plane direction of the light control film 1, similarly with FIG. 8 described above. Furthermore, the arrow C direction is set to an azimuthal angle of 0° in the azimuthal angle illustrated in FIG. 13, as described for FIG. 12.

When the light control film 1 is observed at azimuthal angles of approximately 120° to 180° in the second embodiment, a fluctuation in the transmittance with respect to a voltage change is small, for example, in a range of approximately 4 V to 7 V, compared to a case where the light control film 1 is observed at azimuthal angles of approximately 0° to 60°. However, the liquid crystal molecules fall in two directions in the multi-domain and a fluctuation in the transmittance with respect to a voltage change is averaged to be moderate, compared to the first embodiment.

In the second embodiment, it is also difficult to recognize flickering when a fluctuation in the transmittance is small. Accordingly, the light control film 1 is configured to be observed in a direction where a fluctuation in the transmittance with respect to a voltage fluctuation is small in order to make it difficult to recognize flickering.

Therefore, also in the second embodiment, the direction in which the liquid crystal molecules 4a fall is determined such that it is difficult to recognize flickering for a case where the passenger (in particular, the passenger on the rear seat) looks at the front, of which an observation possibility is the highest.

As described above, according to FIG. 13, a fluctuation in the transmittance with respect to a voltage change is small in a case where the light control film 1 is observed at azimuthal angles of 120° to 180° with voltage range of approximately 4 V to 7 V. It is difficult to recognize flickering as a fluctuation in the transmittance is small.

Therefore, the light control film 1 is arranged on the sunroof 132 such that a direction in which a passenger at a rear seat observes a sunroof 132 falls in the vicinity of azimuthal angles of 120° to 180°.

Figure 14:
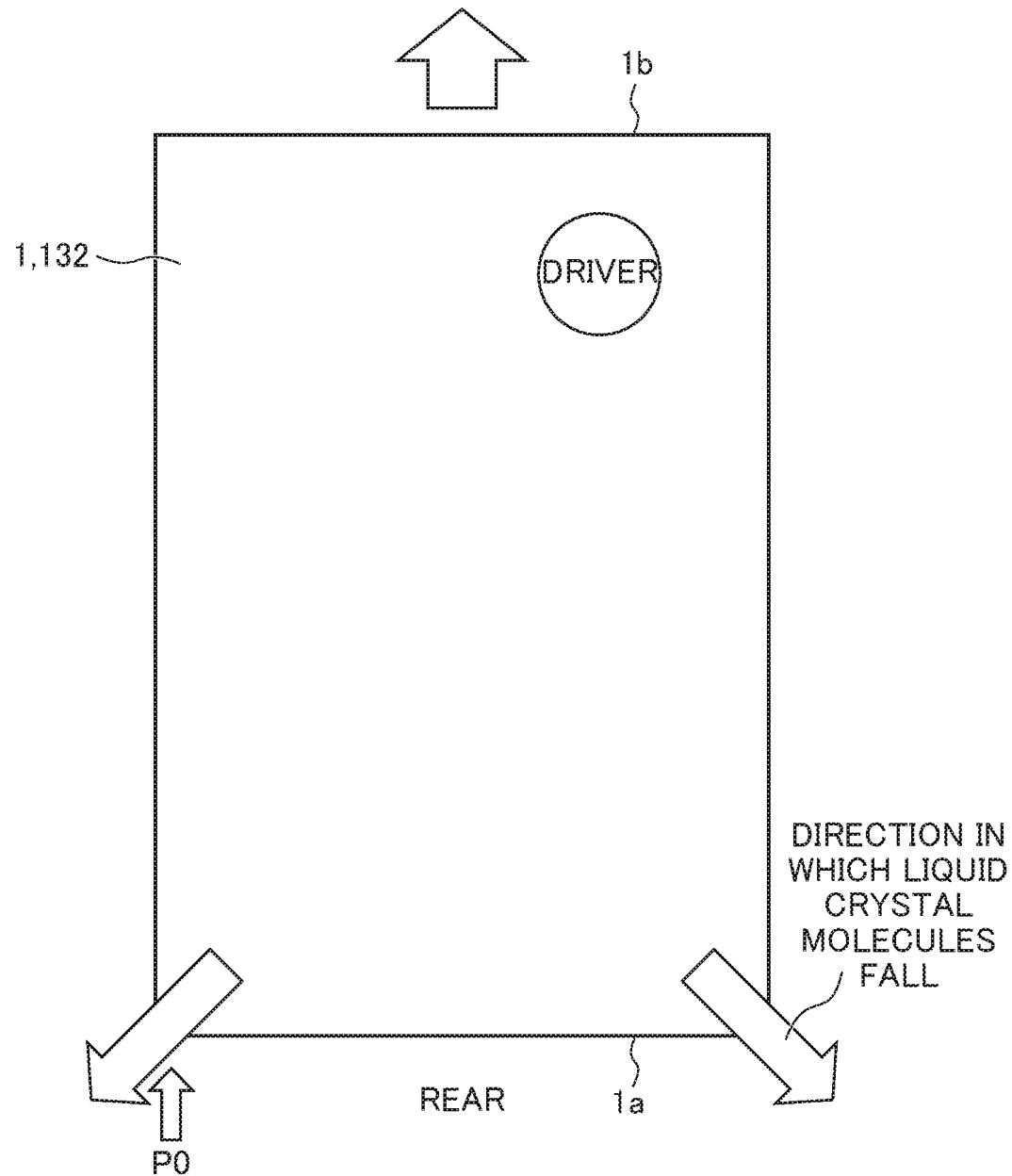
FIG. 14 is a diagram illustrating a spatial relationship of a direction in which the liquid crystal molecules of the light control film arranged on the sunroof fall with respect to an interior of the vehicle, in the second embodiment.

FIG. 14 is a diagram illustrating a relationship between the direction in which the liquid crystal molecules 4a of the light control film 1 arranged on the sunroof 132 fall and a position in a vehicle. In this embodiment, as illustrated in FIG. 14, the liquid crystal molecules 4a of each domain fall to the left-diagonal rear or the right-diagonal rear.

Here, the falling to the left-diagonal rear or the right-diagonal rear indicates that an upper end of the liquid crystal molecules 4a falls to the diagonal rear, for example, in a direction of ±135° with respect to a travelling direction when the travelling direction of the vehicle 130 is set to 0°. At this time, when the travelling direction of the vehicle 130 is set to 0°, an azimuthal angle of 0° is a direction of 180°.

In the second embodiment also, the light control film 1 is arranged with respect to the sunroof 132 of the vehicle such that the liquid crystal molecules 4a fall to the left-diagonal rear or the right-diagonal rear. Therefore, when the passenger looks right overhead or front at the sunroof 132 from the seat on which the passenger is seated, a fluctuation in the transmittance in the light control film 1 of the sunroof 132 is recognized smaller than when the sunroof 132 is seen from other directions. Therefore, when the external light is observed through the sunroof 132, it is difficult to observe flickering.

Also in the second embodiment, it may be preferable that an electricity supply position P0 is located at the rear of the vehicle 130, and for example, the electricity supply position P0 is located at the left-diagonal rear of the vehicle 130. Accordingly, it is possible that flickering hardly occurs in the left-diagonal rear. Here, in a case where the electricity supply position P0 is located at the left-diagonal rear, flickering may tend to occur in the right-diagonal front far from the electricity supply position P0. However, it is difficult to recognize flickering at the front, since the liquid crystal molecules 4a fall diagonally rearward. Therefore, if the left-diagonal rear is the electricity supply position P0, a possibility that flickering is recognized at the front is low. As described above, also in the second embodiment, it is possible that flickering hardly occurs in light incident from both front and rear of the light control film 1. For this reason, the passengers in the vehicle do not sense any flickering inside the car or feel uncomfortable.

Figure 15:
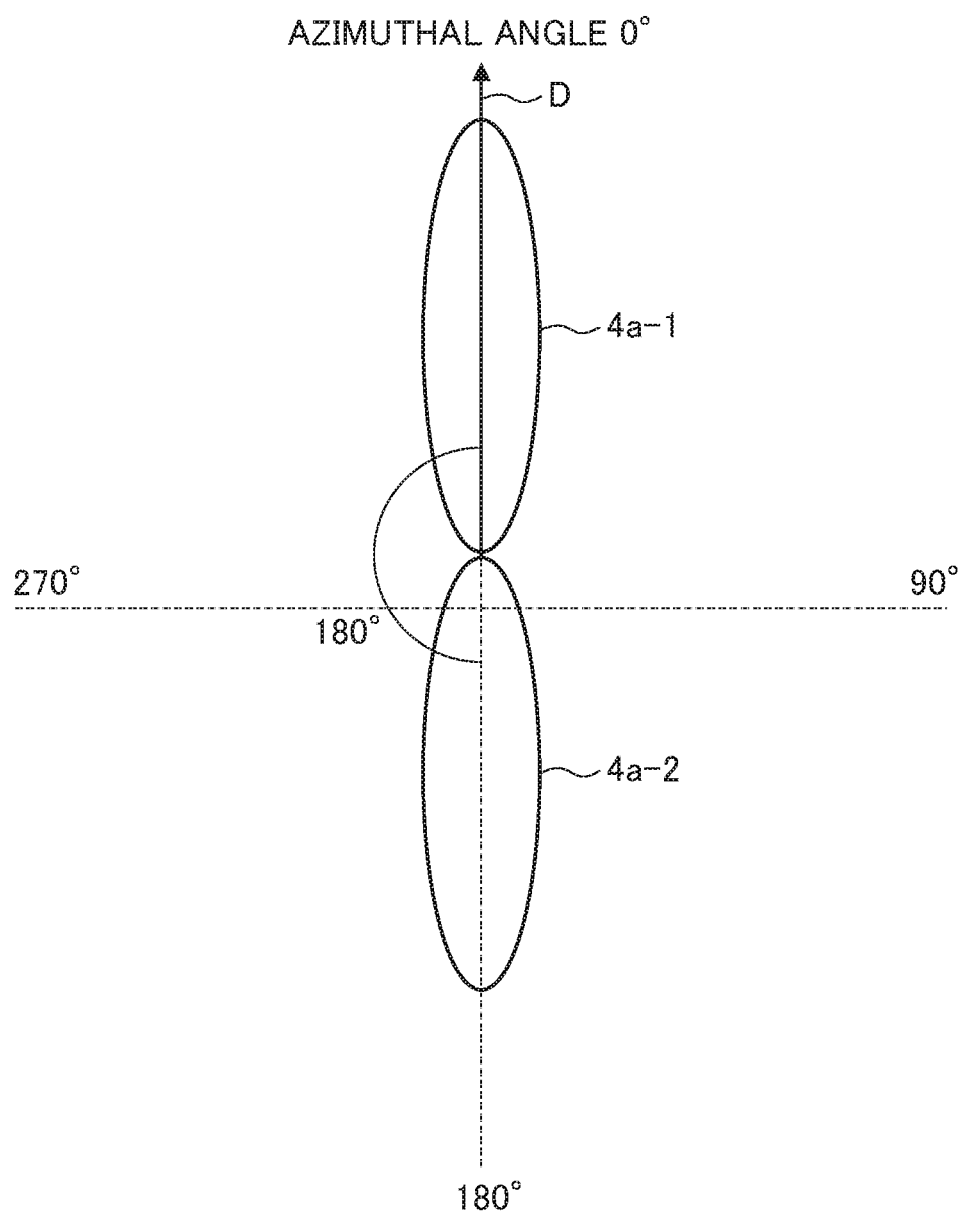
FIG. 15 illustrates a case where in a multi-domain system (two domains), liquid crystal molecules of each of the domains, fall in directions having an angle of 180° to each other.

FIG. 15 also illustrates a case where the liquid crystal molecules of each domain fall in directions at an angle of 180° crossing each other, in the multi-domain system (two domains).

In this case, in the liquid crystal molecules on one side (for example, in FIG. 15, a liquid crystal molecules 4a-1), a direction in which the liquid crystal molecules fall (an arrow D direction illustrated in FIG. 15) is set to an azimuthal angle of 0°.

Figure 16:
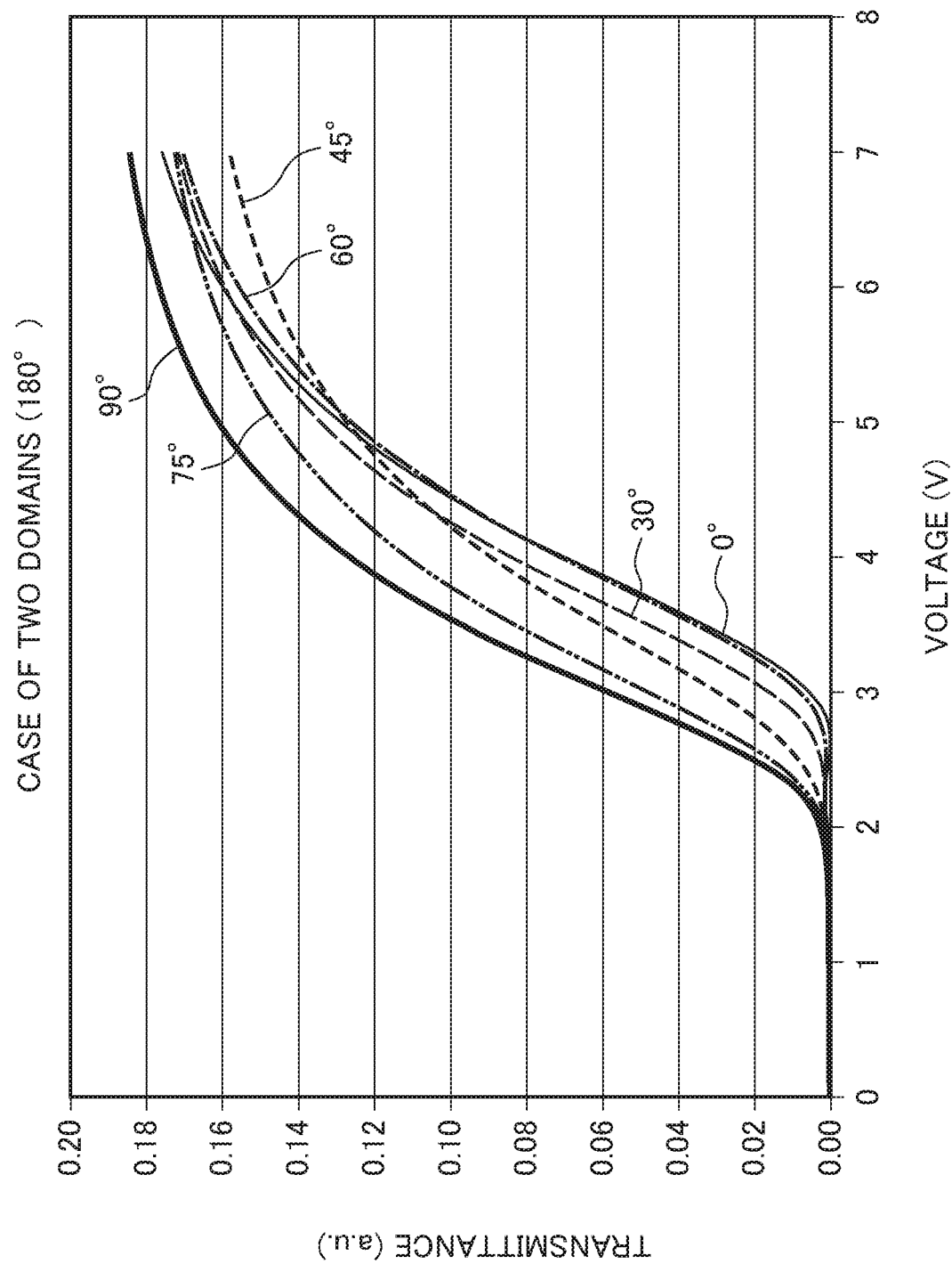
FIG. 16 is a graph illustrating a fluctuation in a transmittance with respect to an applied voltage when the light control film is observed from different angles, in the case of FIG. 15.

FIG. 16 is a graph illustrating a fluctuation in the transmittance with respect to the applied voltage when the light control film is observed from different angles by changing the voltage to be applied to the light control film 1, for the case of FIG. 15.

Angles of 0°, 30°, 45°, 60°, and 90°, illustrated in FIG. 16, are azimuthal angles indicating angles of observing the light control film 1, and indicate a state in which the light control film 1 is looked up from the bottom, at a polar angle of 30°. FIG. 16 shows a case where the observation is performed at each azimuthal angle in the in-plane direction of the light control film 1, similarly with FIG. 8 and the like, as described above. Furthermore, in the azimuthal angle illustrated in FIG. 16, the arrow D direction is set to an azimuthal angle of 0°, as described for FIG. 15.

In this mode, since an angle at which the falling directions of liquid crystal molecules 4a-1 and 4a-2 cross each other is 180°, results at azimuthal angles of 0 to 90° are illustrated in FIG. 16. This is because the angle between the directions in which the liquid crystal molecules 4a-1 and 4a-2 fall is 180°, and thus, for example, transmittances at azimuthal angles of 10° and 190° are identical to transmittances at azimuthal angles of 350° and 170°, respectively. Accordingly, transmittances at azimuthal angles of 90° to 180° are substantially identical to transmittances at azimuthal angles of 90° to 0°.

As illustrated, in this case, a fluctuation in transmittances with respect to applied voltages does not change largely depending on the azimuthal angles at which the light control film 1 is observed. Therefore, the direction in which the liquid crystal molecules fall is not particularly limited with respect to the travelling direction of the vehicle 130. However, also in this case, the electricity supply position P0 with respect to the light control film 1 is located at the rear of the vehicle 130. Accordingly, it is possible that flickering hardly occurs in light coming from behind. In addition, when the electricity supply position P0 with respect to the light control film 1 is located at the front of the vehicle, it is possible that flickering hardly occurs in light coming from front.

Hereinafter, a light control film, an electricity supply method, and the like according to a third embodiment to a seventh embodiment will be described. Light control films described in the third embodiment to the seventh embodiment are attachable to a sunroof 132 or a window of a vehicle 130, window glass of a building, and the like, as with the light control film 1 of the first embodiment described above.

In addition, the third embodiment to the seventh embodiment are each an embodiment relevant to an electricity supply direction with respect to a light control film, and a direction in which liquid crystal molecules of the light control film fall is not particularly limited.

Comparative Embodiment

Figure 18A:
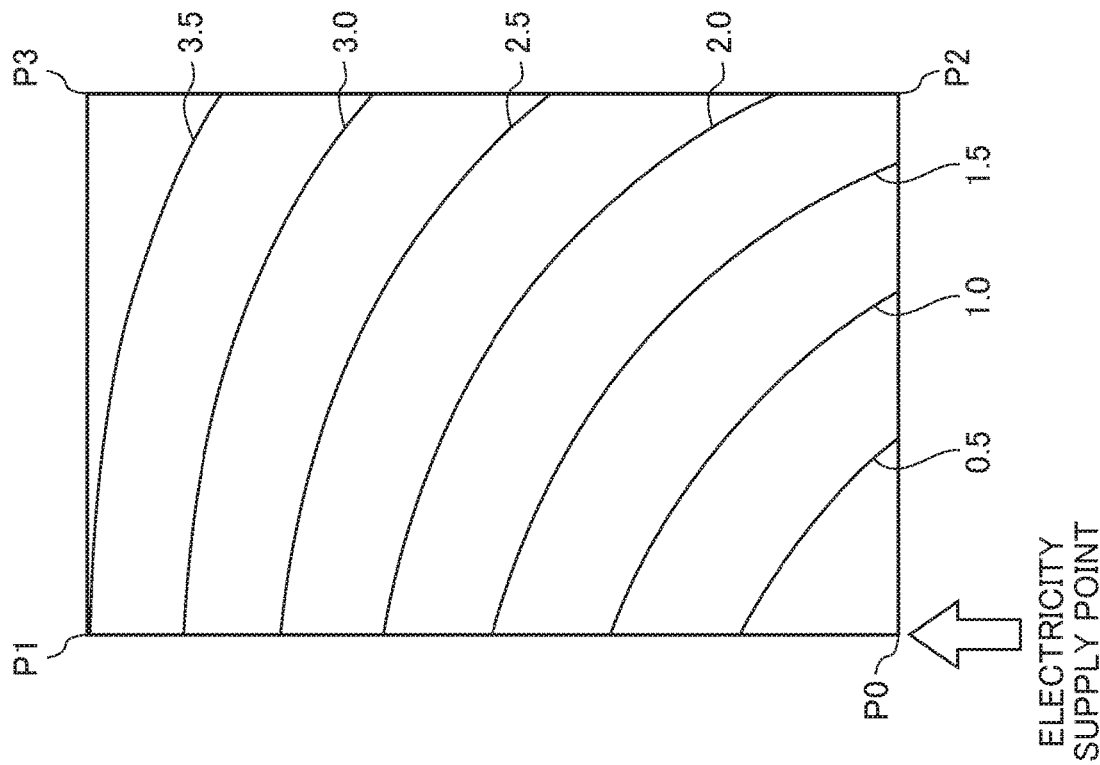
Figure 18B:
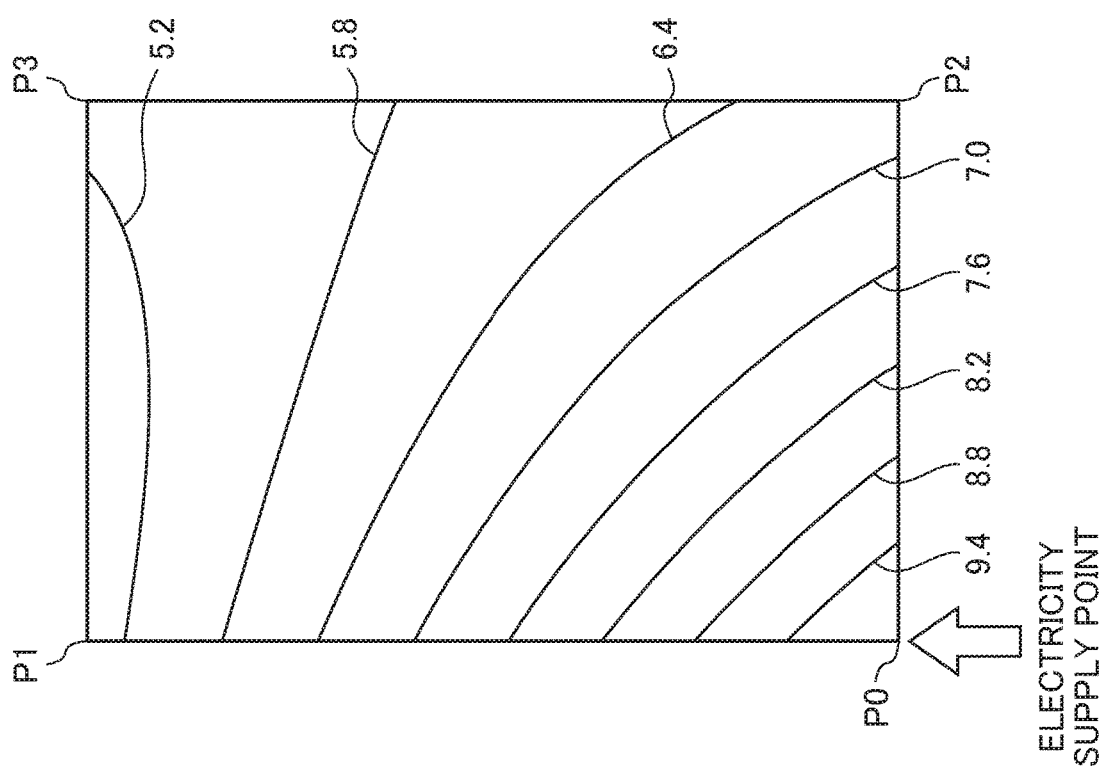

Next, in order to easily describe the third embodiment to the seventh embodiment described below, a comparative embodiment will be described in advance. FIGS. 18A and 18B are each a diagram illustrating a comparative embodiment of the third embodiment to the seventh embodiment. In the comparative embodiment, as illustrated by an arrow in the drawing, an electricity supply point P0 is provided at one corner of four corners of a light control film 1 in a rectangular shape. A voltage is supplied to two electrodes of a lower transparent electrode 11 and an upper transparent electrode 16 of a liquid crystal cell 4 of the light control film 1, from one location of the electricity supply point P0. In addition, in the comparative embodiment, a direction in which liquid crystal molecules fall is not limited.

FIGS. 18A and 18B are each a simulation result illustrating a potential distribution of a transparent electrode in the case of applying a driving voltage of 10 V, having a frequency 60 Hz. FIG. 18A illustrates a potential distribution of the lower transparent electrode 11, and FIG. 18B illustrates a potential distribution of the upper transparent electrode 16. The transparent electrode is formed of ITO and has a thickness of 100 nm. The size of a light control film is 1.2 (m)×0.8 (m).

Figure 19:
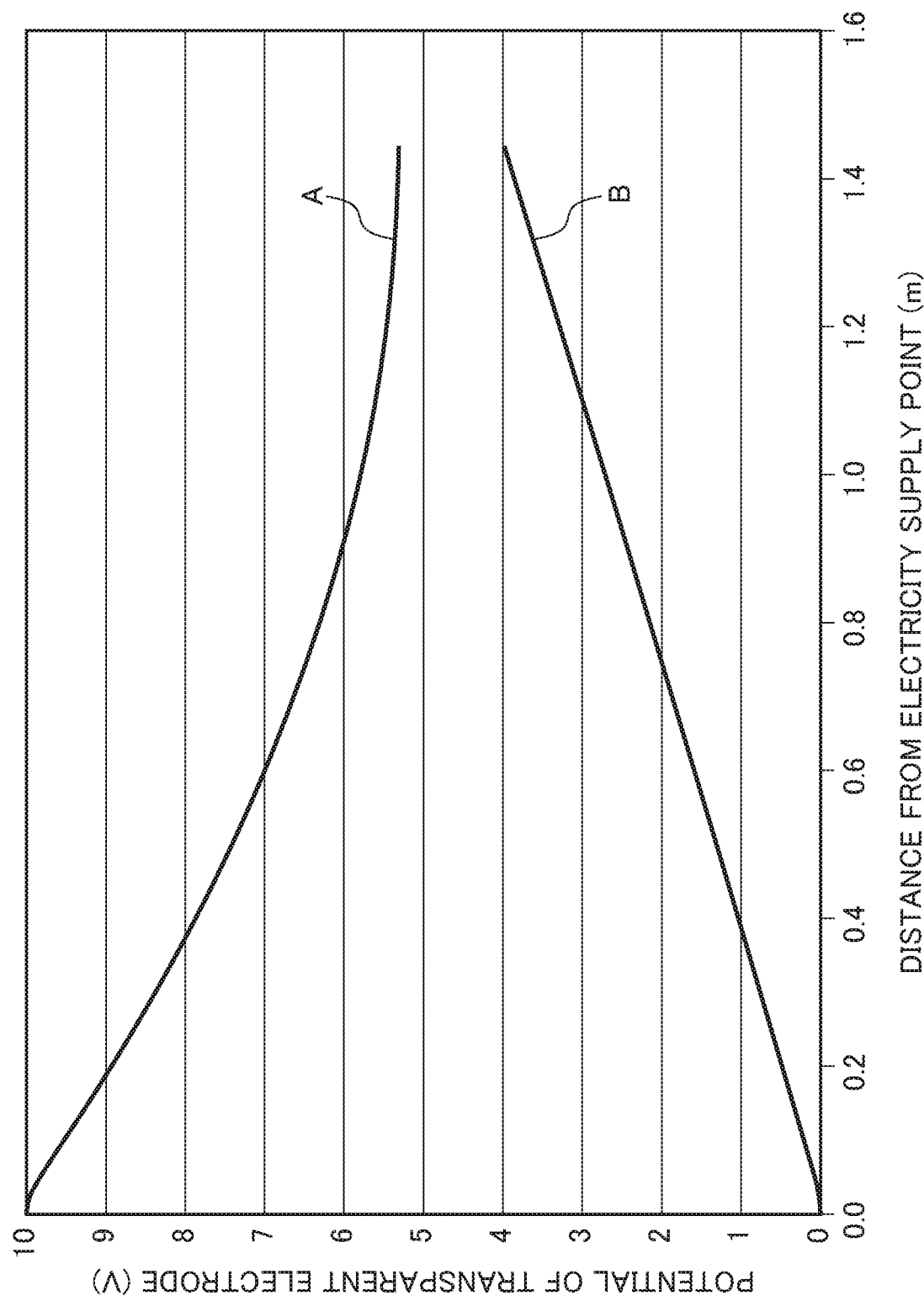
FIG. 19 is a comparative embodiment, and is a graph illustrating FIG. 18 in a relationship between a distance from an electricity supply point P0 and a potential of a transparent electrode.

FIG. 19 is a graph translating FIGS. 18A and 18B in a relationship between a distance from the electricity supply point P0 and the potential of the transparent electrode. "A" illustrates the potential of the upper transparent electrode 16, and "B" illustrates the potential of the lower transparent electrode 11.

Figure 20:
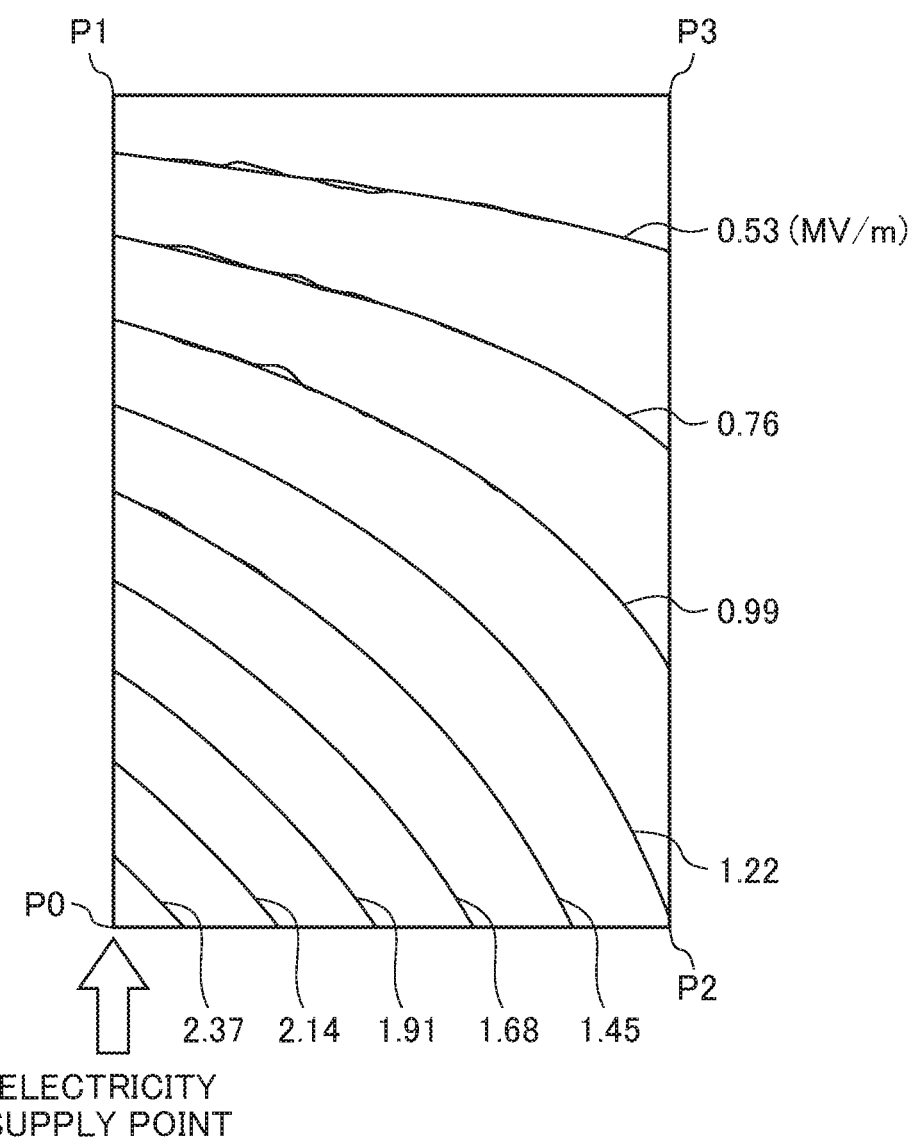
FIG. 20 is a comparative embodiment, and illustrates an electric field between an upper transparent electrode and a lower transparent electrode in the same condition as that of FIG. 18.

FIG. 20 illustrates an electric field between the upper transparent electrode 16 and the lower transparent electrode 11 in the same condition as that of FIGS. 18A and 18B.

Figure 21:
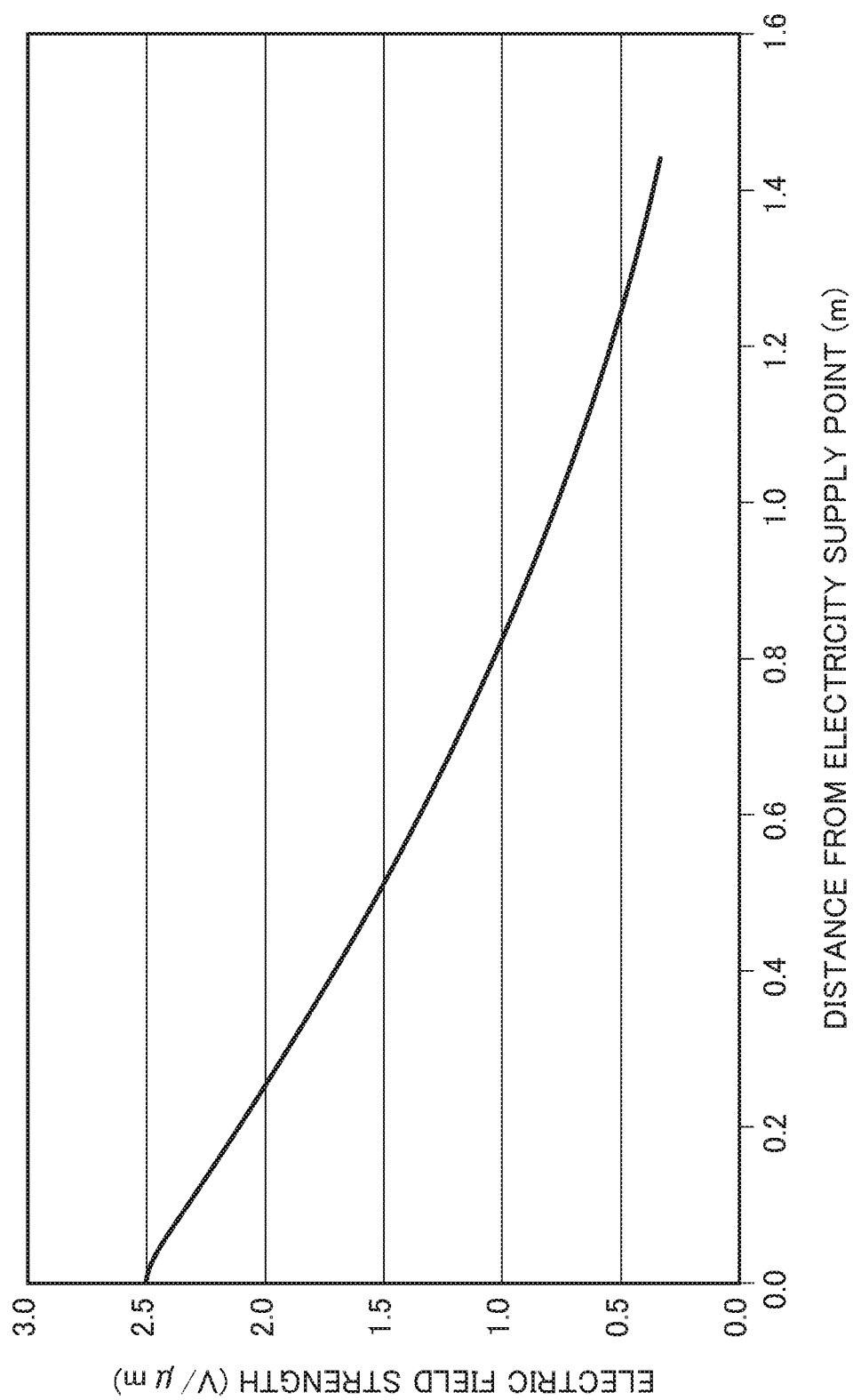
FIG. 21 is a comparative embodiment, and is a graph illustrating FIG. 20 in a relationship between a distance from an electricity supply point P0 and an electric field strength.

FIG. 21 is a graph illustrating FIG. 20 in the distance from the electricity supply point P0 and an electric field strength.

In the comparative embodiment, as illustrated, a voltage close to the electricity supply point P0 is high and the voltage decreases as the distance from the electricity supply point P0 increases. In a case where a voltage of 10 V is applied to the electricity supply point P0, a voltage at a point P3 which is a position diagonal to the electricity supply point P0 is approximately 6.5 V, in the example of FIGS. 18A and 18B. That is, a time constant when the polarity of a driving voltage is reversed becomes longer as being remote from the electricity supply point P0, and a drop in the transmittance increases. For this reason, in the comparative embodiment, a fluctuation in the transmittance is large and flickering is easily recognized in a portion far from the electricity supply point P0.

Third Embodiment

Figure 22:
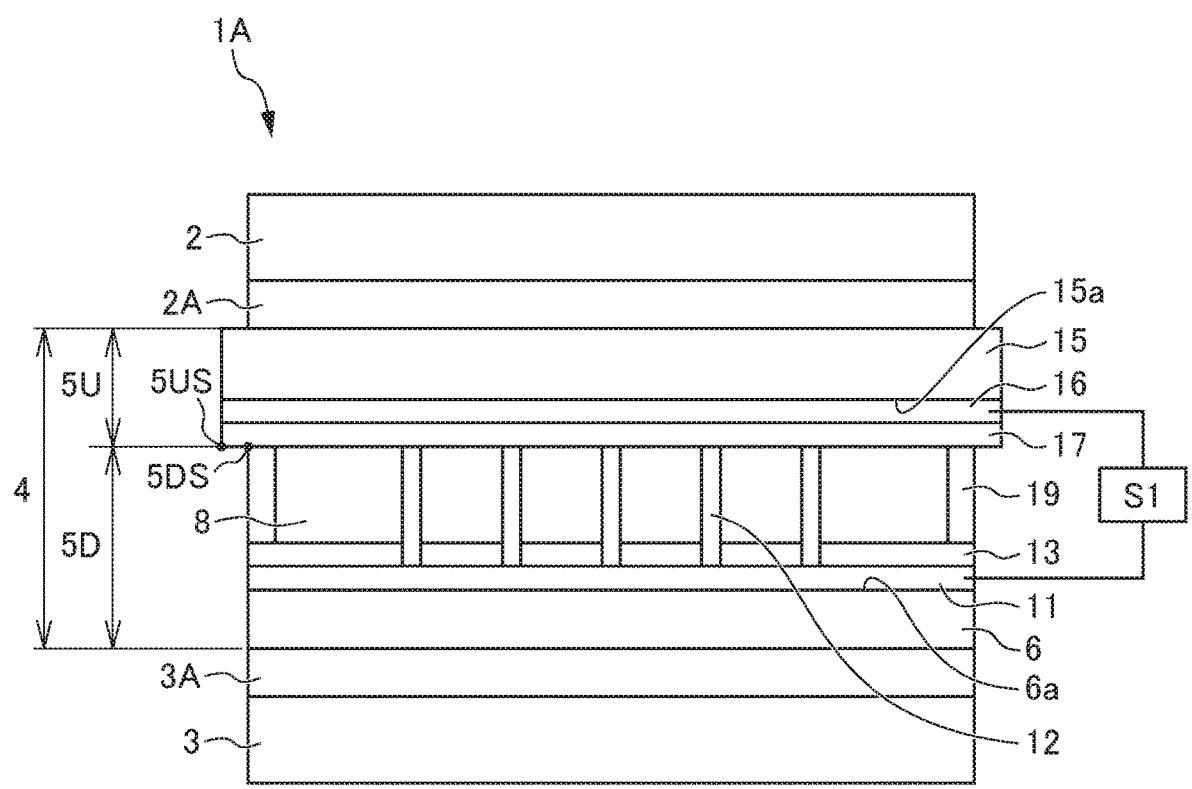
FIG. 22 is a sectional view illustrating a basic configuration of a light control film of a third embodiment.

FIG. 22 is a sectional view illustrating a basic configuration of a light control film 1A according to a third embodiment.

Figure 23:
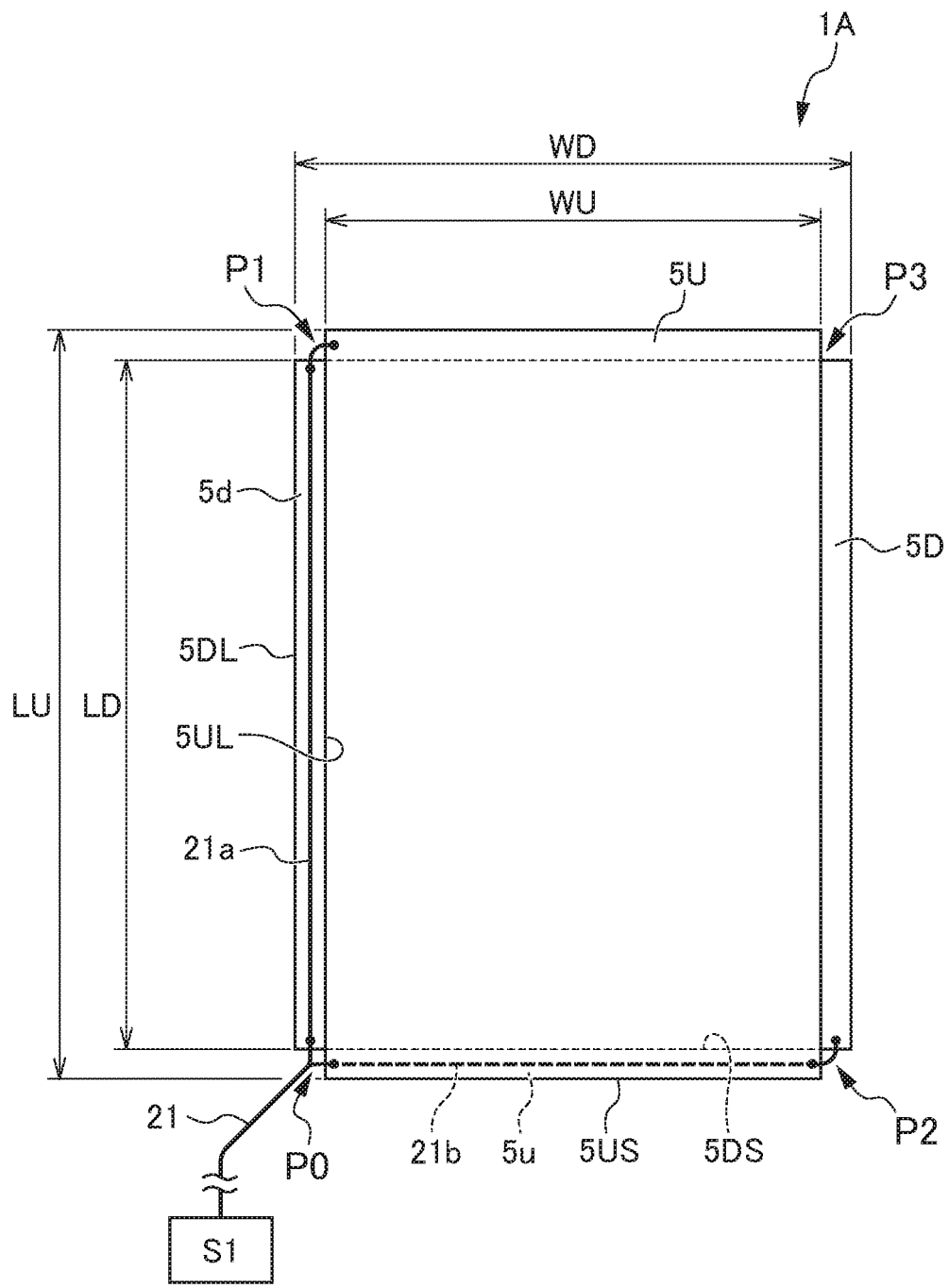
FIG. 23 is a plan view of the light control film of the third embodiment.

FIG. 23 is a plan view of the light control film 1A of the third embodiment.

As illustrated, the light control film 1A of the third embodiment is similar to the light control film 1 of the first embodiment described above, except that aspect ratios of a lower transparent electrode 11 and an upper transparent electrode 16 are slightly different from each other, the lower transparent electrode 11 and the upper transparent electrode 16 are arranged such that lateral sides are shifted from each other, and an electricity supply method is different.

In the third embodiment, as with the comparative embodiment, as illustrated by an arrow in the drawing, an electricity supply point P0 is provided on one corner of four corners of the light control film 1A in a rectangular shape. A voltage is supplied to two electrodes of the lower transparent electrode 11 and the upper transparent electrode 16 of a liquid crystal cell 4 of the light control film 1A, from the electricity supply point P0.

Furthermore, in this embodiment, the lower transparent electrode 11 is provided on an entire surface of a base material 6, and the upper transparent electrode 16 is provided on an entire surface of a base material 15. Accordingly, the lower transparent electrode 11 and the base material 6 are in the same shape, and the upper transparent electrode 16 and the base material 15 are in the same shape.

In addition, in this embodiment, a cohesion layer 6a is provided on a surface of the base material 6 facing the lower transparent electrode 11, and a cohesion layer 15a is provided on a surface of the base material 15 facing the upper transparent electrode 16.

The cohesion layers 6a and 15a are formed of an inorganic substance, an organic substance, or a mixture thereof.

$SiO_x$ (x=1 to 2), $MgF_2$, $Al_2O_3$, $TiO_2$, $Nb_2O_5$, and the like may be preferable as the inorganic substance. Examples of the organic substance include an acrylic resin, an urethane resin, a melamine resin, an alkyd resin, a siloxane-based polymer, and the like, and it may be preferable that a thermosetting resin formed of a mixture of a melamine resin, an alkyd resin, and an organic silane condensate, is used as the organic substance.

In addition, a manufacturing method of the cohesion layers 6a and 15a includes dry process such as a vacuum vapor deposition method, a sputtering method, and an ion plating method, a wet process (a coating method), or the like.

It may be preferable that the cohesion layers 6a and 15a are formed of one or a plurality of layers of two or more layers, and the overall thickness is approximately 1 nm to 300 nm.

In addition, as illustrated in FIG. 22 and FIG. 23, in the light control film 1A of this embodiment, the size of the lower transparent electrode 11 is different from the size of the upper transparent electrode 16.

That is, a length LU of the upper transparent electrode 16 in a longitudinal direction is longer than a length LD of the lower transparent electrode 11 in the longitudinal direction. And a length WU of the upper transparent electrode 16 in a transverse direction is shorter than a length WD of the lower transparent electrode 11 in the transverse direction.

Two electrodes of the lower transparent electrode 11 and the upper transparent electrode 16 having different shapes are arranged such that central axes thereof are coincident with each other. In this manner, a first upper-side lateral side 5UL extending in the longitudinal direction (a first direction) from the electricity supply point P0 in four lateral sides of the upper transparent electrode 16 and a first lower-side lateral side 5DL extending in the longitudinal direction from the electricity supply point P0 in four lateral sides of the lower transparent electrode 11, for example, are configured to be separated sideway from each other by approximately 2 mm while being parallel to each other. It should be noted that the strict parallelism is not necessary.

In addition, a second upper lateral side 5US extending in the transverse direction (a second direction) from the electricity supply point P0 in four lateral sides of the upper transparent electrode 16, and a second lower-side lateral side 5DS extending in the transverse direction from the electricity supply point P0 in four lateral sides of the lower transparent electrode 11 are configured to be separated sideway from each other by approximately 2 mm while being parallel to each other.

Accordingly, in the upper transparent electrode 16, an exposure surface (a first exposure surface) 5u directed towards the lower transparent electrode 11 side is formed in an edge portion extending to P2 from the electricity supply point P0 along the transverse direction.

In addition, in the lower transparent electrode 11, an exposure surface (a second exposure surface) 5d directed towards the upper transparent electrode 16 side is formed in an edge portion extending to P1 from the electricity supply point P0 along the longitudinal direction.

A flexible printed board (FPC) 21 extends to the electricity supply point P0 of the lower transparent electrode 11 and the upper transparent electrode 16 from a driving power source S1. The FPC 21 is electrically connected to the lower transparent electrode 11 and the upper transparent electrode 16 at the electricity supply point P0.

The FPC 21 is formed of laminated two layers of copper foils through an insulating layer. In the laminated two layers of copper foils, one copper foil is arranged to electrically connected to one transparent electrode (for example, the upper transparent electrode), and the other copper foil is arranged to electrically connect to the other transparent electrode (for example, the lower transparent electrode), at the electricity supply point P0. The FPC 21 is divided into FPCs 21a and 21b in two directions from the electricity supply point P0. Furthermore, the FPCs 21a and 21b may be separately produced and then respectively connected to the FPC 21. Alternatively, two FPCs 21a and 21b which are separately produced and connected to each other may be connected to the FPC 21. The FPC 21a extends along the exposure surface 5d and the FPC 21b extends along the exposure surface 5u.

In this embodiment, a front surface of the copper foil is further covered with a cover lay in the FPC 21. A five-layer structure is used, which includes a cover lay, a copper foil, an insulating layer, a copper foil and a cover lay in this order in the thickness direction. Furthermore, a laminated structure of the FPC 21 is not limited thereto and another structure may be adopted through suitable selection. For example, three or more layers of copper foils may be laminated through an insulator in the thickness direction.

The FPCs 21a and 21b are fixed with a tape or the like. However, the FPCs 21a and 21b are not limited thereto, and may be bonded to each other with an adhesive.

Each of the FPCs 21a and 21b extends an outer edge portion of the base materials 6 and 15, and is electrically connected to the lower transparent electrode 11 and the upper transparent electrode 16 at connection points P1 and P2 each provided at a corner adjacent to the electricity supply point P0. The FPC 21a and the FPC 21b are each connected electrically to a corresponding connection point in such a manner that one of the laminated two layers of copper foils is arranged to have electrical continuity with one transparent electrode (for example, the upper transparent electrode), and the other is arranged to have electrical continuity with the other transparent electrode (for example, the lower transparent electrode).

The FPCs 21a and 21b do not have electric continuity with the electrodes at points other than the electricity supply point P0, and the connection points P1 and P2 provided at the corner adjacent to the electricity supply point P0.

That is, the FPCs 21a and 21b are not continuously connected electrically to the lower transparent electrode 11 and the upper transparent electrode 16 on a surface (a line), but are electrically connected at a plurality of points (the electricity supply point and the connection point) with a predetermined interval.

Furthermore, in this embodiment, the FPC 21a is electrically connected to the lower transparent electrode 11 and the upper transparent electrode 16 at two points of the electricity supply point P0 and the connection point P1 provided at the corner adjacent to the electricity supply point P0, and the FPC 21b is electrically connected to the lower transparent electrode 11 and the upper transparent electrode 16 at two points of the electricity supply point P0 and the connection point P2 provided at the corner adjacent to the electricity supply point P0. However, the FPCs 21a and 21b are not limited thereto, and each of the FPCs 21a and 21b may be electrically connected to the lower transparent electrode 11 and the upper transparent electrode 16 at two or more points.

In addition, in this embodiment, the FPC 21 is connected to the lower transparent electrode 11 and the upper transparent electrode 16 at the connection points P1 and P2 on the corner but is not limited thereto. The FPC 21 may be connected to the lower transparent electrode 11 and the upper transparent electrode 16 in a portion other than the corner.

FIGS. 24A and 24B illustrate potentials of the lower transparent electrode 11 and the upper transparent electrode 16, respectively, in a case where the thickness of the copper foil of the FPC is 35 μm, the width is 2 mm and a driving voltage of 10 V is applied with the polarity switched at a frequency of 240 Hz. FIG. 24A illustrates the potential of the electrode of an upper laminate 5U and FIG. 24B illustrates the potential of the electrode of an lower laminate 5D.

The thickness of the copper foil of the FPC is not limited to 35 μm, and may be greater than or equal to 9 μm.

Figure 25:
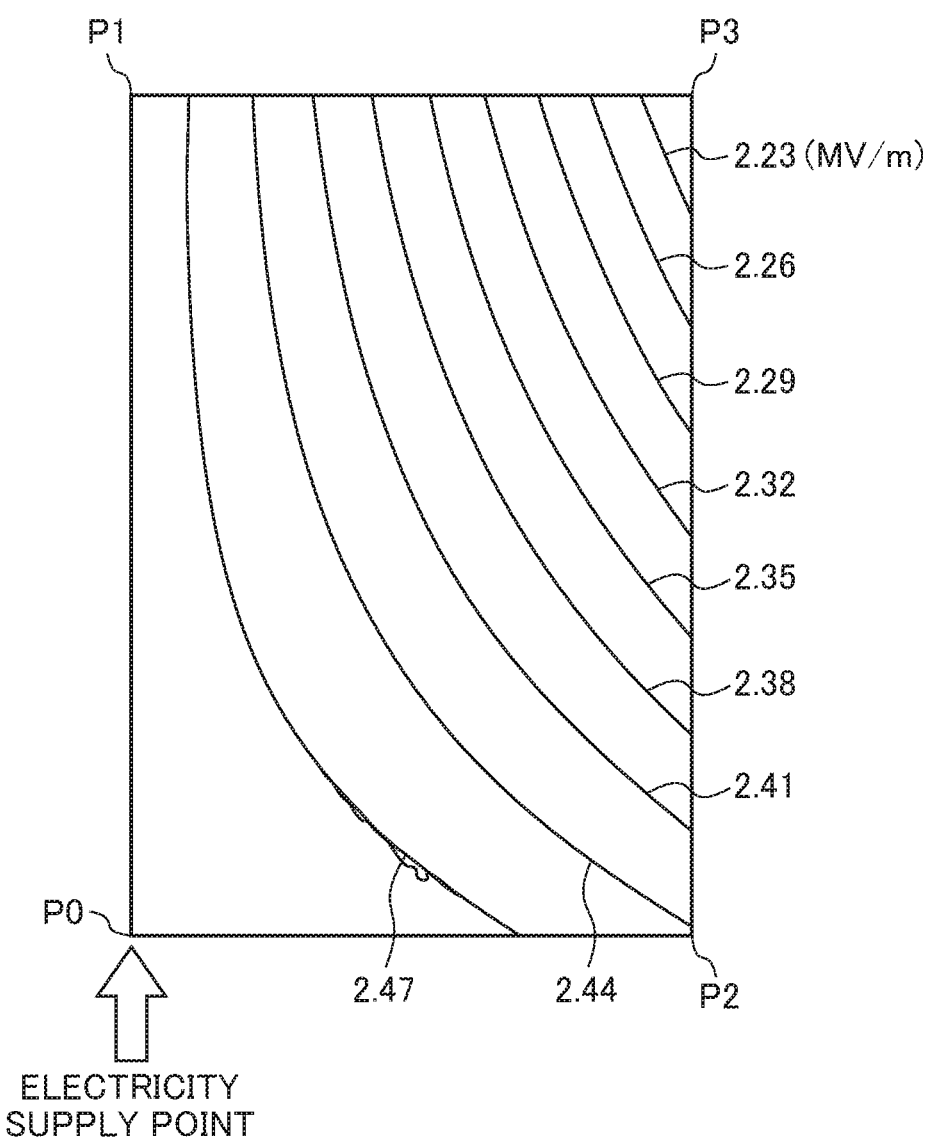
FIG. 25 is a diagram illustrating an electric field generated between the upper laminate and the lower laminate in a case where the thickness of a copper foil of FPC is 35 μm and a frequency of a driving voltage of a rectangular wave supplied from a power source is 240 Hz.

FIG. 25 is a diagram illustrating an electric field to be generated between the upper laminate 5U and the lower laminate 5D in the same condition.

Figure 26:
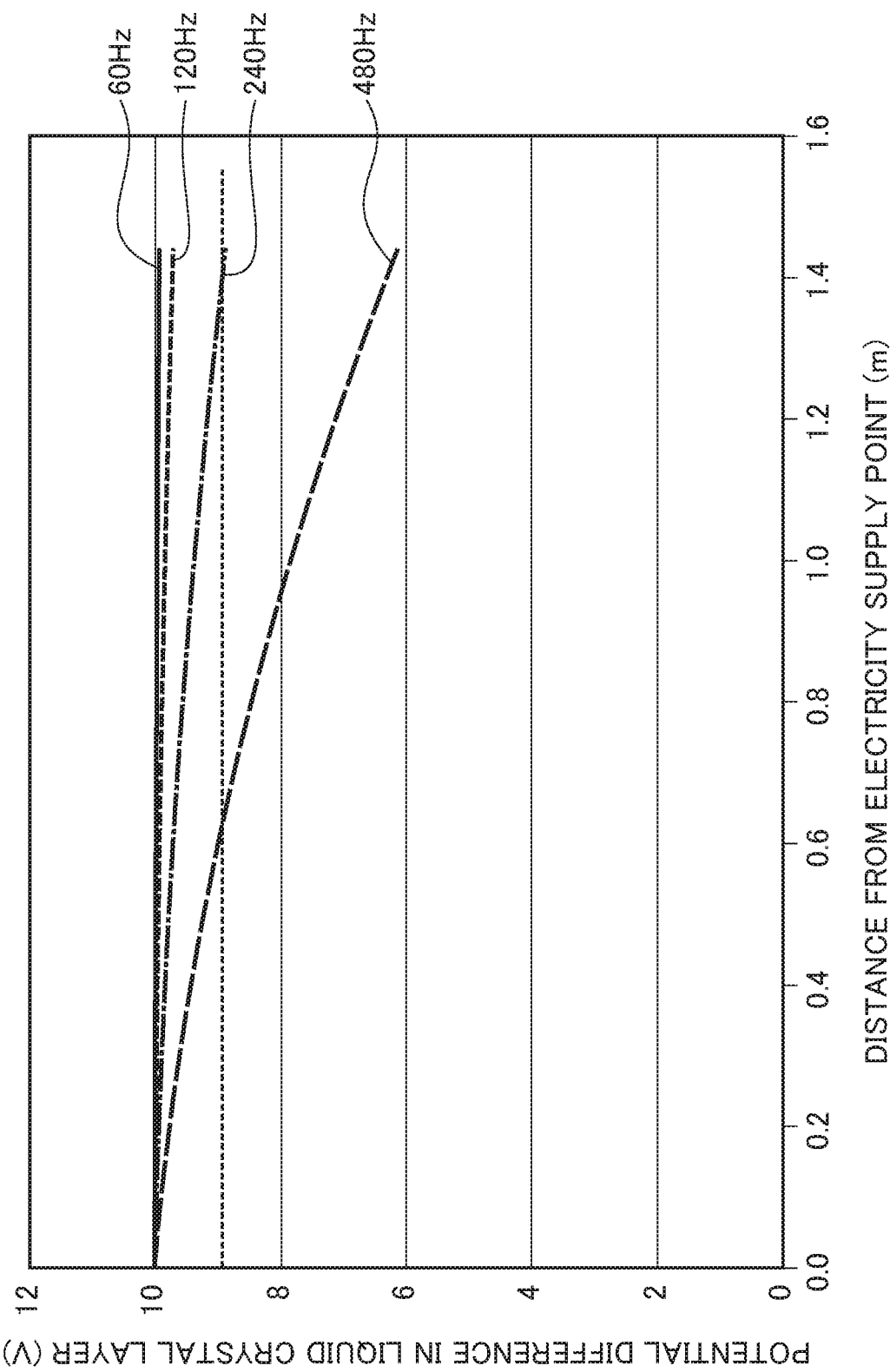
FIG. 26 illustrates a relationship between a potential difference between an upper transparent electrode and a lower transparent electrode and the distance from the electricity supply point, in a case where the thickness of the copper foil of FPC is 35 μm and frequencies of the driving voltage of the rectangular wave supplied from the power source are different from each other.

FIG. 26 illustrates a relationship of a potential difference between the lower transparent electrode 11 and the upper transparent electrode 16 with respect to the distance from the electricity supply point P0, in the same condition.

Figure 27:
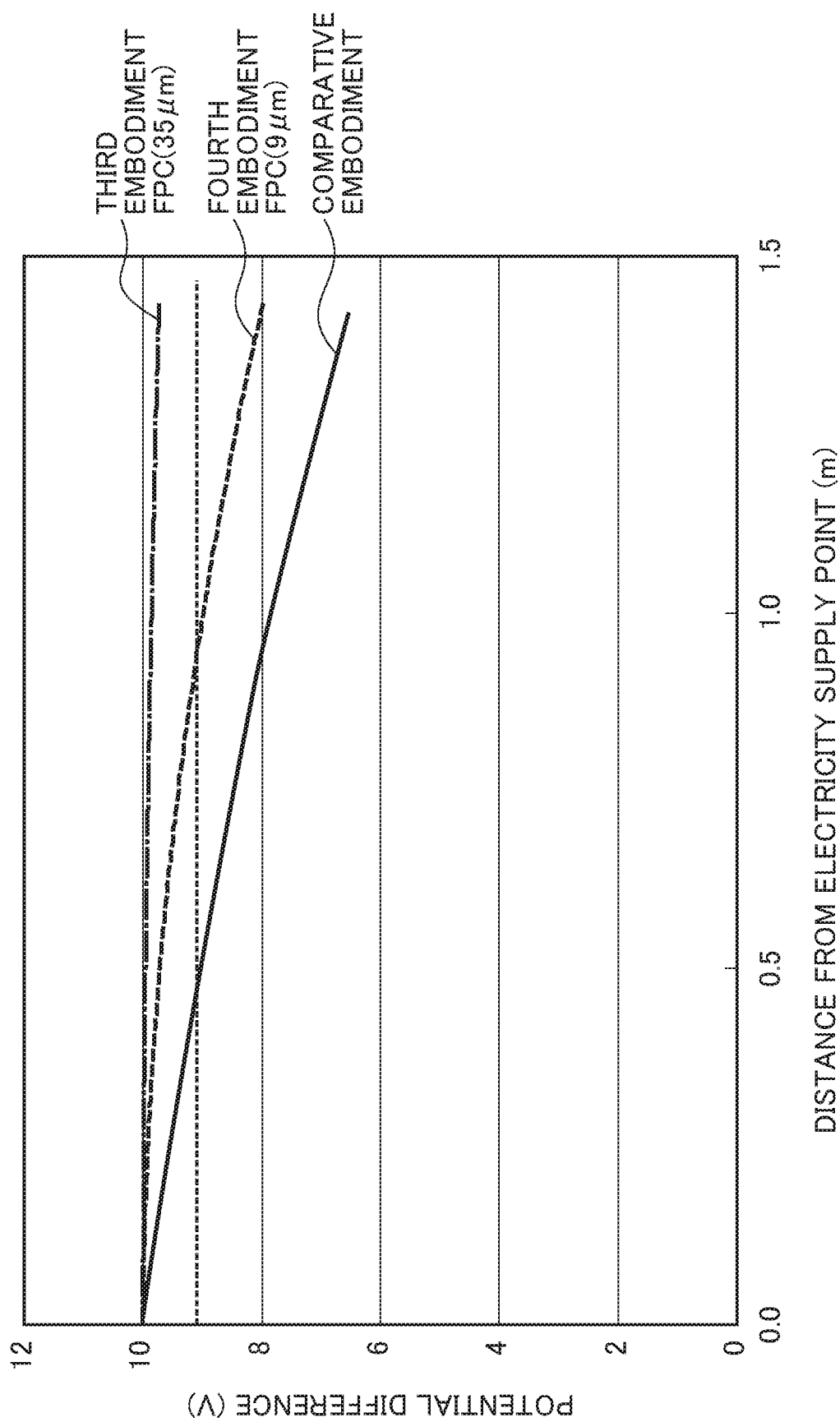
FIG. 27 is a diagram illustrating a relationship between the distance from the electricity supply point and the potential difference, in the third embodiment and a fourth embodiment.

FIG. 27 illustrates a relationship between the distance from the electricity supply point P0 and a potential difference between the lower transparent electrode 11 and the upper transparent electrode 16, in the same condition for the third embodiment and the fourth embodiment described below.

Effect of Third Embodiment (1) As illustrated in FIG. 24A, FIG. 24B and FIG. 25, according to this embodiment, a voltage drop in the in-plane direction of the light control film 1A is small, compared to the comparative embodiment of FIGS. 18A and 18B. Regarding a frequency of switching polarity as illustrated in FIG. 26, the higher the frequency is, the larger is a ratio of a drop in the voltage with respect to an increase in the distance from the electricity supply point P0.

As illustrated in FIG. 27, a potential difference between the upper transparent electrode 16 and the lower transparent electrode 11 at a distance approximately 1.4 m (in the vicinity of P3 diagonal to the electricity supply point P0) from the electricity supply point P0 and at a time of 1 msec after polarity switching is approximately 9.7 V, for a case where a driving voltage of 10 V with the polarity switching at a frequency of 240 Hz is applied.

A difference between the value described above and 10 V is considerably reduced, compared to a potential difference of 6.5 V in the comparative embodiment illustrated in FIG. 27.

That is, a drop in the transmittance is small at a position apart from the electricity supply point P0, since a time constant when the polarity of the driving voltage is reversed becomes shorter compared to the comparative embodiment. For this reason, at the portion far from the electricity supply point P0, a fluctuation in the transmittance decreases and it is difficult to recognize flickering.

(2) According to this embodiment, there is one electricity supply point P0 connected directly to the driving power source S1. The FPC 21 is configured to extend in two directions along the lateral sides of the lower transparent electrode 11 and the upper transparent electrode 16 from the electricity supply point P0. Thus, the FPC 21 extends and is connected to the lower transparent electrode 11 and the upper transparent electrode 16 at the connection points P1 and P2 apart from the electricity supply point P0. Accordingly, electricity supply to the lower transparent electrode 11 and the upper transparent electrode 16 is also performed from a point other than the electricity supply point P0.

Accordingly, it is possible to decrease a drop in the transmittance by easy wiring and easy installation work, compared to increasing the number of electricity supply points P0.

(3) For example, it may be optional that a bus line is arranged in the light control film 1A of this embodiment, such that sheet resistances of the lower transparent electrode 11 and the upper transparent electrode 16 are substantially reduced. In this case, an electricity supply efficiency is improved, but the appearance is damaged by the bus line. If the bus line is formed to be thin such that the bus line is not noticeable, the cost may increase. However, in this embodiment, the FPC 21 is provided in an outer circumferential portion, and thus, can be covered at the time of attaching the light control film 1A to the sunroof 132. Accordingly, the appearance is not damaged and the cost does not increase in order to form the bus line to be thin.

In addition, the FPC 21 is not connected to the entire lateral sides of the lower transparent electrode 11 and the upper transparent electrode 16, but is electrically connected to the lower transparent electrode 11 and the upper transparent electrode 16 at positions (the connection points P1 and P2) apart from the electricity supply point P0 by predetermined distances. When the FPC 21 is connected to the entire lateral side, a voltage drop occurs in the middle. However, since the FPC 21 is connected to the lower transparent electrode 11 and the upper transparent electrode 16 at the connection points P1 and P2 apart from the electricity supply point P0, voltage drops at the connection points are small.

Furthermore, in this embodiment, an example has been described in which the light control film 1A is formed by interposing a liquid crystal layer 8 between the base materials 6 and 15. However, the light control film 1A is not limited thereto, and the same effect may be obtained by adopting the same configuration provided as the electricity supply method in a light control film of an alternating voltage driving, and hysteresis or a driving mode not having a memory function, for example, a suspended particle device (SPD) mode.

Modification Embodiment 1

Furthermore, in FIG. 26, in a case where the frequency of the driving voltage becomes higher, a charging time (or a discharging time) of each frame, is 8.3 msec at 60 Hz, 4.2 msec at 120 Hz, and 2.1 msec at 480 Hz. The time constant is a value intrinsic to the light control film 1A, and does not depend on the frequency. In a case where the distance from the electricity supply point P0 increases, the time constant increases, and thus, in a case where charge and discharge is not completed within the time described above, the effective voltage becomes lower. Since the degree of a decrease in the voltage increases as the time becomes shorter, this degree of a decrease increases as the frequency becomes higher.

In FIG. 26, frequency dependency of a reaching potential difference increases as the distance from the electricity supply position increases. This indicates that the time constant becomes longer as the distance from the electricity supply position increases. Accordingly, when flickering is noticeable at 30 Hz to 60 Hz of driving voltage, it may be preferable that more connection points provided than this embodiment. For example, any one of FPCs 21a and 21b is configured to extend, and a connection point may be provided at a position P3 diagonal to the electricity supply point P0 illustrated in FIG. 23. According to the modification embodiment as described above, it may be possible to reduce a decrease in the electric field at a position apart from the electricity supply point P0.

Modification Embodiment 2

In FIG. 23, an example is illustrated in which the FPCs 21a and 21b extend in two directions from the electricity supply point P0, and are electrically connected to the lower transparent electrode 11 and the upper transparent electrode 16 at the two connection points P1 and P2. However, it is not limited to this, but the number of connection points may be one.

FIGS. 35A and 35B are each a plan view of a light control film of Modification Embodiment 2. FIG. 35A is a plan view of an example of the light control film (a light control film 1D-1) of Modification Embodiment 2, and FIG. 35B is a plan view of an example of another light control film (a light control film 1D-2) of the Modification Embodiment 2.

As illustrated in FIG. 35A, in the light control film 1D-1, one FPC 21a extends in one direction along an exposure surface 5d from an electricity supply point P0, and is electrically connected to a lower transparent electrode 11 and an upper transparent electrode 16 at a connection point P1. That is, as for the light control film 1D-1, electrical continuity with electrodes is established only at two points of the electricity supply point P0 and the connection point P1.

In addition, as illustrated in FIG. 35B, in the light control film 1D-2, one FPC 21b extends in one direction along an exposure surface 5u from the electricity supply point P0, and is electrically connected to the lower transparent electrode 11 and the upper transparent electrode 16 at a connection point P2. That is, as for the light control film 1D-2, electrical continuity with electrodes is established only at two points of the electricity supply point P0 and the connection point P2.

In this embodiment, the slope of a potential difference is slightly precipitous, but it is possible to sufficiently reduce flickering for practical use, compared to the third embodiment described above. In a case where the size of the light control film is smaller than the size described in the third embodiment (1.2 m×0.8 m), in particular, it may be possible that the slope of a potential difference is moderate and flickering is reduced effectively.

In addition, this embodiment may make it possible that flickering is reduced sufficiently along with reducing the number of members involved in the wiring and the like and suppressing the production cost and the like.

Fourth Embodiment

Figure 28:
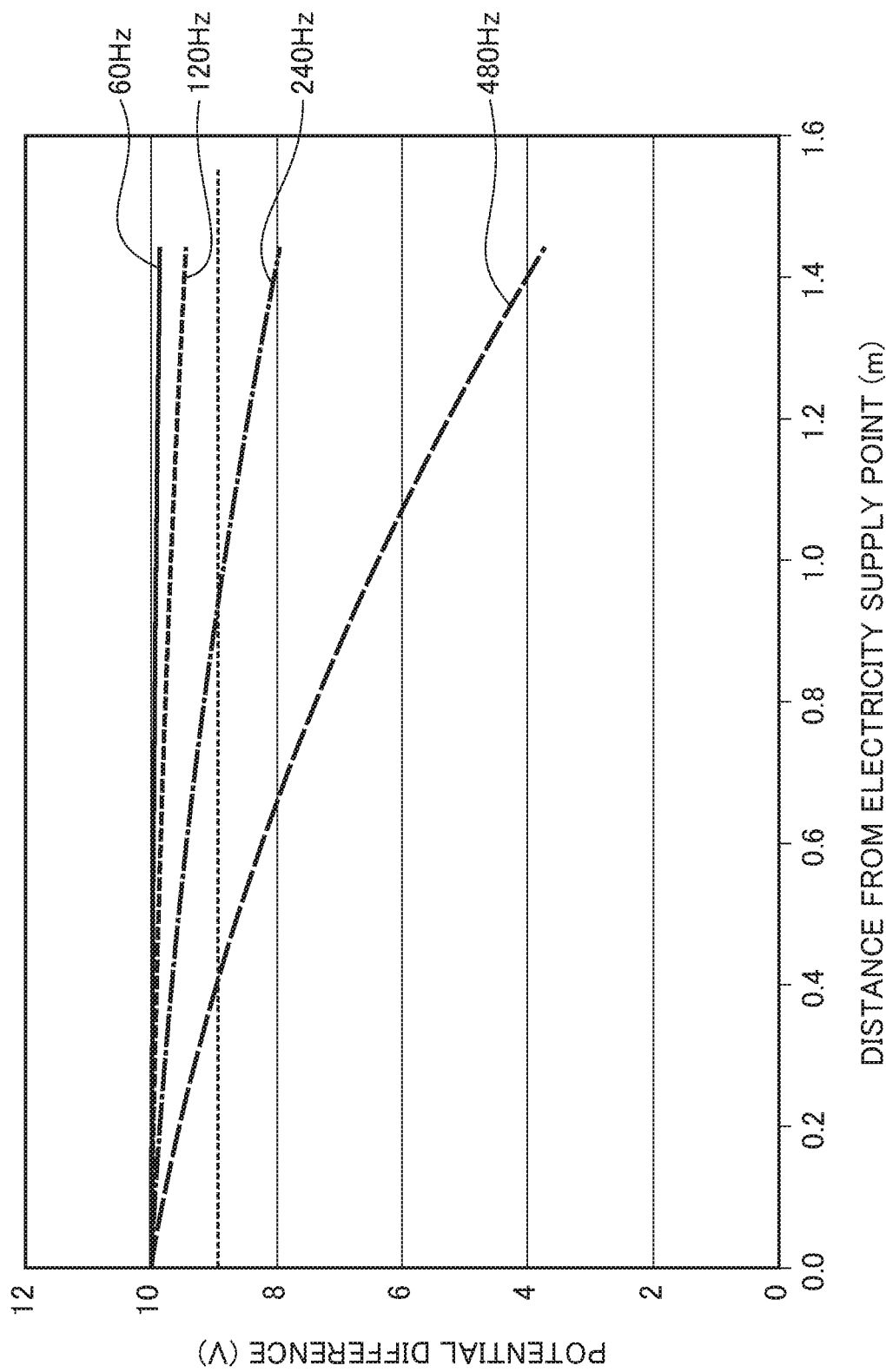
FIG. 28 is a diagram corresponding to FIG. 26, illustrating a relationship between a potential difference between the upper transparent electrode and the lower transparent electrode and the distance from the electricity supply point, in a case where the thickness of a copper foil of FPC is 9 µm and frequencies of the voltage supplied from the power source are different from each other.

FIG. 28 is a diagram corresponding to FIG. 26, illustrating a relationship between a potential difference between both electrodes and a distance from an electricity supply point P0, in a case where the thickness of a copper foil of FPC 21 is 9 μm, and frequencies of voltages to be supplied from a driving power source S1 are 60 Hz, 120 Hz, 240 Hz, and 480 Hz. In addition, the width of the copper foil is 2 mm.

Effective voltages become lower as the distance from the electricity supply point P0 increases, compared to FIG. 26. In the case of 240 Hz, a potential difference is less than or equal to 9 V of an allowable range at the distance of approximately 1.4 m from the electricity supply point P0. Accordingly, flickering tends to be recognized easily.

However, the effective voltage at a point P3 on a diagonal line is greater than or equal to 9 V of an allowable range at 60 Hz or 120 Hz. Accordingly, a considerable difference is not observed in the transmittance in the case of driving at a frequency of less than or equal to 60 Hz.

However, in a case where the thickness of the copper foil is 9 μm and flickering is noticeable as the time constant becomes longer, it may be possible to improve the degree of flickering by increasing one connection point to another position as described above, for example, the position P3. In addition, it may be possible to improve the degree of flickering by further increasing a line width from 2 mm.

Fifth Embodiment

Next, a light control film 1B of a fifth embodiment will be described. FIGS. 29A and 29B are each a plan view of the light control film 1B of the fifth embodiment. FIG. 29A is a diagram illustrating a patterning shape of an upper transparent electrode 16, and FIG. 29B is a diagram illustrating a patterning shape of a lower transparent electrode 11.

In descriptions below, the same reference numerals will be applied to the same portions as those of the third embodiment. The fifth embodiment is different from the third embodiment in shapes of the upper transparent electrode 16 and the lower transparent electrode 11. Furthermore, the description of alignment layers 17 and 13 will be omitted in the following description. The alignment layers 17 and 13 are formed on the upper transparent electrode 16 and the lower transparent electrode 11, respectively.

(Cohesion Layer)

In the fifth embodiment, as described in the third embodiment, a cohesion layer 15a is formed on a front surface of a base material 15 (hereinafter, referred to as an upper base material in this embodiment), and the upper transparent electrode 16 is provided on the cohesion layer 15a.

In addition, a cohesion layer 6a is formed on a front surface of a base material 6 (referred to as a lower base material in this embodiment), and the lower transparent electrode 11 is provided on the cohesion layer 6a.

The cohesion layer 15a is provided in order to improve adhesion between the upper transparent electrode 16 and the upper base material 15, and the cohesion layer 6a is provided in order to improve adhesion between the lower transparent electrode 11 and the lower base material 6. In addition, adhesion between a seal material 19 and the cohesion layers 15a, 6a is higher than adhesion between the seal material 19 and the upper and lower transparent electrodes 16, 11.

As illustrated in FIG. 29A, aspect ratios of the upper base material 15 and the lower base material 6 are slightly different from each other, and the upper base material 15 and the lower base material 6 are arranged such that lateral sides are shifted from each other.

In this manner, since the upper base material 15 and the lower base material 6 are arranged shifted from each other, an exposure surface 5u1 and an exposure surface 5u2 directed towards the lower base material 6 are formed on an exterior of a laminated region of the upper base material 15 overlapping with the lower base material 6. In addition, an exposure surface 5d1 and an exposure surface 5d2 directed towards the upper base material 15 are formed on an exterior of a laminated region of the lower base material 6 overlapping with the upper base material 15 (refer to FIG. 29B).

(Upper Side Transparent Electrode)

In this embodiment, the upper transparent electrode 16 is not provided on the entire surface of the upper base material 15. The upper base material 15 is provided with a first exposure region 30 in which the cohesion layer 15a is exposed. The upper transparent electrode 16 is divided into a plurality of regions electrically connected (continuous) to each other through the first exposure region 30.

The plurality of regions of the upper transparent electrode 16 are as follows:

(1) An exposure surface electrode portion 16a1 provided on the exposure surface 5u1, and an exposure surface electrode portion 16a2 provided on the exposure surface 5u2.

(2) A rectangular inside electrode portion 16b which is slightly smaller than a region laminated with the lower base material 6 and which is provided a certain distance inside the outer edge portion in the upper base material 15.

(3) Corner electrode portions 16c0, 16c1, and 16c2 provided in the vicinity of each of an electricity supply point P0 (P0u), a connection point P1 (P1u) and a connection point P2 (P2u), which are provided in an outer circumferential region having a certain width surrounding an outer circumference of the inside electrode portion 16b in the region laminated with the lower base material 6 in the upper base material 15.

Here, in the fifth embodiment, an electricity supply point which supplies electricity to the upper transparent electrode 16 of the electricity supply point P0 is set to P0u, and an electricity supply point which supplies electricity to the lower transparent electrode 11 of the electricity supply point P0 is set to P0d. The electricity supply point P0u is an electricity supply point provided on the exposure surface 5u2 and the electricity supply point P0d is an electricity supply point provided on the exposure surface 5d1, of the electricity supply point P0.

A connection point connected to the upper transparent electrode 16 is set to P1u and a connection point connected to the lower transparent electrode 11 is set to P1d, of the connection point P1.

The connection point P1d is a connection point of the connection point P1, which is provided on the exposure surface 5d1.

The connection point P1u is a connection point of the connection point P1, which is provided on the exposure surface 5u1, and is located at a position where the FPC 21a further extends from the connection point P1d.

A connection point connected to the upper transparent electrode 16 is set to P2u and a connection point connected to the lower transparent electrode 1 is set to P2d, of the connection point P2.

The connection point P2u is a connection point of the connection point P2, which is provided on the exposure surface 5u2.

The connection point P2d is a connection point of the connection point P2, which is provided on the exposure surface 5d1, and is located at a position where the FPC 21b further extends from the connection point P2u.

That is, a portion excluding the corner electrode portions 16c0, 16c1, and 16c2 from the outer circumferential region having a certain width surrounding the outer circumference of the inside electrode portion 16b in the laminated region of the upper base material 15 is the first exposure region 30 in which the upper transparent electrode 16 is not provided. The cohesion layer 15a which is a lower layer of the upper transparent electrode 16 is exposed in the first exposure region 30.

Figure 30:
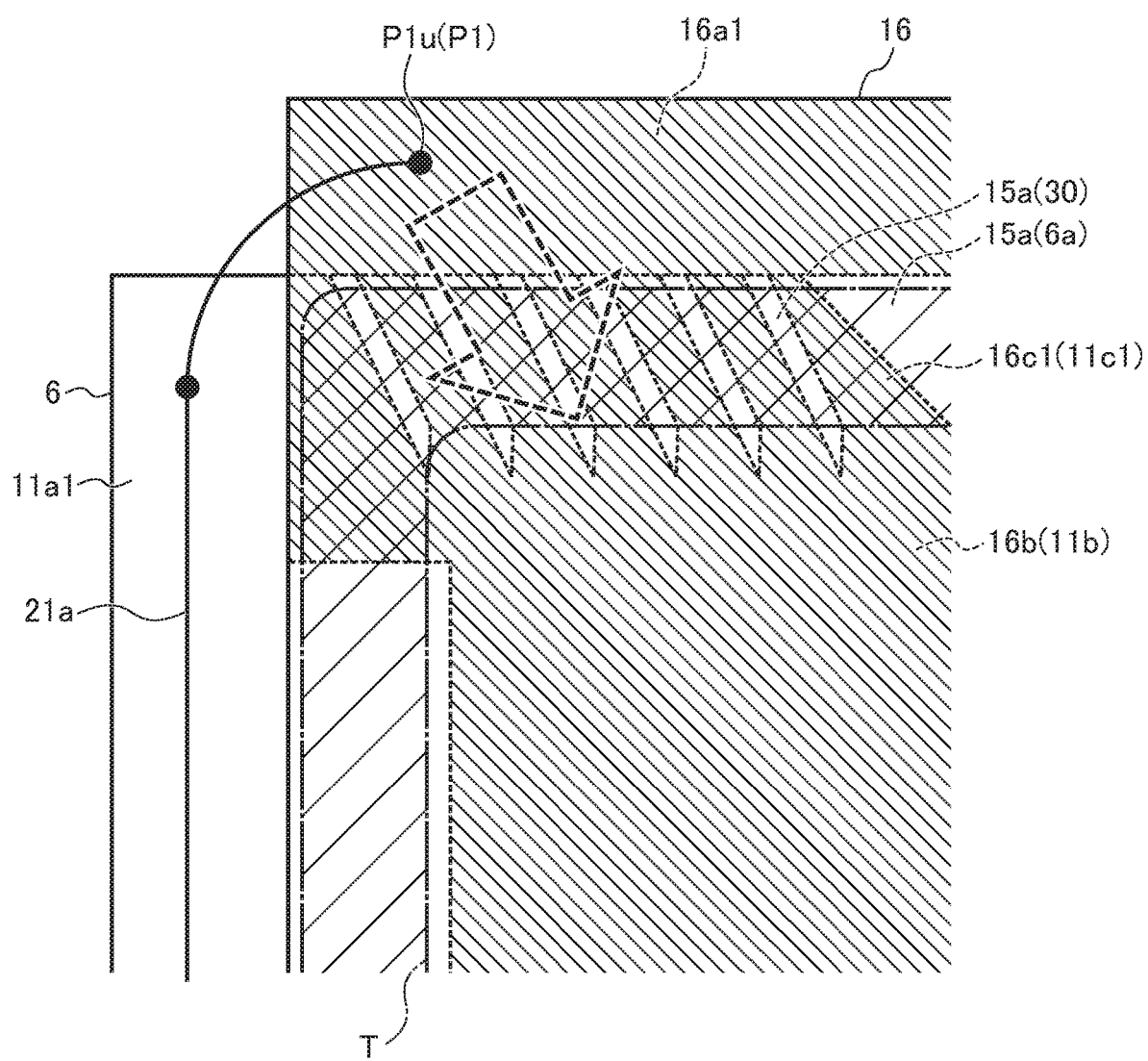
FIG. 30 is an enlarged view of a region S surrounded by a dot-and-dash line of FIG. 29A.

FIG. 30 is an enlarged view of a region S surrounded by a dot-and-dash line of FIG. 29A. As illustrated, the upper transparent electrode 16 is partially removed in the corner electrode portion 16c1 (the same applies to the corner electrode portions 16c0 and 16c2 though not illustrated in FIG. 30). The cohesion layer 15a is exposed like streaks, which form a plurality of first exposure regions 30.

Such first exposure regions 30 are formed by partially removing the upper transparent electrode 16 by etching. It should be noted that the first exposure region 30 is not limited to the shape illustrated in the drawing. For example, the streaks like portion which is provided in the corner electrode portion 16c1 may be in other shapes insofar as a current flow from the connection point P1u to the inside electrode portion 16b, illustrated by an arrow in the drawing, is not hindered.

The inside electrode portion 16b and an exposure surface electrode portion 16a1 are electrically connected to each other in the vicinity of the connection point P1u through the corner electrode portion 16c1.

In addition, though it is not illustrated, the inside electrode portion 16b and an exposure surface electrode portion 16a2 are electrically connected to each other in the vicinity of the electricity supply point P0u through the corner electrode portion 16c0, and are electrically connected to each other in the vicinity of the connection point P2u through the corner electrode portion 16c2.

(Lower Side Transparent Electrode)

In this embodiment, the lower transparent electrode 11 is not also provided on the entire surface of the lower base material 6, but a second exposure region 31 exists, in which the cohesion layer 15a is exposed. The lower transparent electrode 11 is divided into a plurality of regions electrically connected to each other through the second exposure region 31.

The plurality of regions of the lower transparent electrode 11 are as follows:

(1) An exposure surface electrode portion 11a1 provided on the exposure surface 5d1, and an exposure surface electrode portion 11a2 provided on the exposure surface 5d2.

(2) A rectangular inside electrode portion 11b which is slightly smaller than a region laminated with the upper base material 15 and which is provided a certain distance inside the outer edge portion, in the lower base material 6.

(3) Corner electrode portions 11c0, 11c1, and 11c2 provided in the vicinity of each of an electricity supply point P0 (P0d), a connection point P1 (P1d), and a connection point P2 (P2d), which are provided in an outer circumferential region having a certain width surrounding an outer circumference of the inside electrode portion 11b in the region laminated with the upper base material 15 in the base material 6.

That is, a portion excluding the corner electrode portions 11c0, 11c1, and 11c2 from the outer circumferential region having a certain width surrounding the outer circumference of the inside electrode portion 11b in the laminated region of the lower base material 6, is the second exposure region 31 in which the lower transparent electrode 11 is not provided. The cohesion layer 15a which is a lower layer of the lower transparent electrode 11 is exposed in the second exposure region 31.

In addition, the lower transparent electrode 11 is partially removed in the corner electrode portions 11c0, 11c1, and 11c2, and the cohesion layer 15a is exposed like streaks, which form a plurality of second exposure regions 31.

Then, the inside electrode portion 11b and an exposure surface electrode portion 11a1 are electrically connected to each other in the vicinity of the electricity supply point P0d through the corner electrode portion 11c0, and are electrically connected to each other in the vicinity of the connection point P1d through the corner electrode portion 11c1.

The inside electrode portion 11b and an exposure surface electrode portion 11a2 are electrically connected to each other in the vicinity of the connection point P2d through the corner electrode portion 11c2.

(Manufacturing Method)

Figure 31:
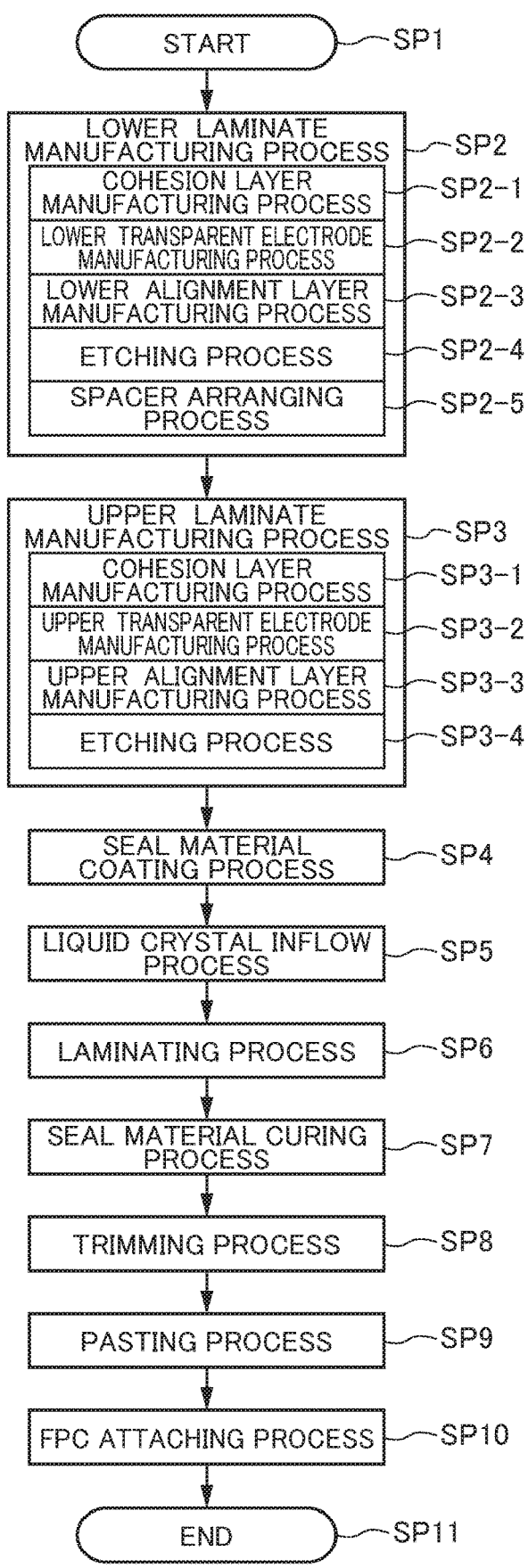
FIG. 31 is a flowchart illustrating a manufacturing process of a light control film 1B.

Next, a method for manufacturing the light control film 1A of this embodiment will be described. FIG. 31 is a flowchart illustrating a manufacturing process of the light control film 1A.

(Lower Side Laminate Manufacturing Process SP2)

First, in a lower laminate manufacturing process SP2, a lower laminate 5D is manufactured.

The lower laminate manufacturing process SP2 includes a cohesion layer manufacturing process SP2-1, a lower transparent electrode manufacturing process SP2-2, a lower alignment layer manufacturing process SP2-3, an etching process SP2-4, and a spacer arranging process SP2-5.

In the cohesion layer manufacturing process SP2-1, a cohesion layer 6a is manufactured on one surface of a lower base material 6 by using an acrylic resin, for example by coating.

In the lower transparent electrode manufacturing process SP2-2, a lower transparent electrode 11 is manufactured on approximately the entire surface of the cohesion layer 6a of the lower base material 6 with ITO by a vacuum film forming such as sputtering.

In the lower alignment layer manufacturing process SP2-3, a coating liquid for an alignment layer (a lower alignment layer) 13 is applied onto the lower transparent electrode 11 of the lower base material 6, and is dried, and then, is cured by irradiation of ultraviolet rays, and thus, the lower alignment layer 13 is manufactured.

In the etching process SP2-4, the lower alignment layer 13 and the lower transparent electrode 11 are partially removed by etching.

As described above, where the lower alignment layer 13 and the lower transparent electrode 11 are removed partially in the laminated region is a portion excluding corner electrode portions 11c0, 11c1, and 11c2 from a region having a certain width surrounding the outer circumference of an inside electrode portion 11b and the streaks-like portion in the corner electrode portions 11c0, 11c1, and 11c2.

Then, where the lower alignment layer 13 and the lower transparent electrode 11 are removed is a second exposure region 31 in which the cohesion layer 6a is exposed.

Next, in the spacer arranging process SP2-5, a coating liquid in which bead spacers are dispersed as spacers 12 is applied by a spin coating or the like, and then, a drying treatment and a burning treatment are sequentially executed, and thus, the spacers 12 (the bead spacers) are randomly arranged on the entire surface of the lower base material 6. Thus, the lower laminate 5D is manufactured.

Furthermore, in this embodiment, the bead spacer is used as the spacer 12, but the spacer 12 is not limited thereto, and as with the first embodiment, the photospacer may be used.

(Upper Side Laminate Manufacturing Process SP3)

A subsequent upper laminate manufacturing process SP3 is identical to the lower laminate manufacturing process SP2, except that the spacer arranging process is not included. That is, the upper laminate manufacturing process SP3 includes a cohesion layer manufacturing process SP3-1, an upper transparent electrode manufacturing process SP3-2, an upper alignment layer manufacturing process SP3-3, and an etching process SP3-4.

In the cohesion layer manufacturing process SP3-1, a cohesion layer 15a is manufactured on one surface of an upper base material 15 by using an acrylic resin through coating.

In the upper transparent electrode manufacturing process SP3-2, the upper transparent electrode 16 is manufactured on approximately the entire surface of the cohesion layer 15a of the upper base material 15 with ITO by vacuum film forming such as sputtering.

In the upper alignment layer manufacturing process SP3-3, a coating liquid for an alignment layer (an upper alignment layer) 17 is applied onto the upper transparent electrode 16 of the upper base material 15, and is dried, and then, is cured by irradiation with ultraviolet rays, and thus, the upper alignment layer 17 is manufactured.

In the etching process SP3-4, the upper alignment layer 17 and the upper transparent electrode 16 are partially removed by etching.

Where the upper alignment layer 17 and the upper transparent electrode 16 are removed partially in the laminated region is the portion excluding corner electrode portions 16c0, 16c1, and 16c2 from the outer circumferential region having a certain width surrounding the outer circumference of an inside electrode portion 16b and the streaks-like portion in the corner electrode portions 16c0, 16c1, and 16c2.

Then, where the upper alignment layer 17 and the upper transparent electrode 16 are removed is a first exposure region 30 in which the cohesion layer 15a is exposed.

In a seal material coating process SP4 subsequent to the upper laminate manufacturing process SP3, a seal material 19 is applied onto the lower base material 6 by using a dispenser.

At this time, a region to be coated with the seal material 19 is a region T surrounded by a dot-and-dash line in FIG. 30 having a certain width from the outer circumference of the laminated region.

The region T is the second exposure region 31 in which the lower transparent electrode 11 is not provided except for the corner electrode portions 11c0, 11c1, and 11c2, and the cohesion layer 6a is exposed. In the corner electrode portions 11c0, 11c1, and 11c2, the cohesion layer 6a is exposed in the shape of streaks. Therefore, the seal material 19 is in contact with the cohesion layer 6a in the portion where the lower transparent electrode 11 is not provided.

Here, since an adhesion strength between the cohesion layer 6a and the seal material 19 is higher than a cohesion strength between the lower transparent electrode 11 and the seal material 19, the seal material 19 is bonded appropriately to the lower base material 6.

Next, in a liquid crystal inflow process SP5, liquid crystals flow into the frame-like seal material 19.

Furthermore, in this embodiment, a multipoint one drop filling (ODF) injection method is used for the arrangement of the liquid crystals. The multipoint ODF is a method in which a liquid crystal material is dropped onto a plurality of positions in the seal material 19 by a dispenser or the like, before the other laminate is bonded thereto.

In addition, the method is not limited to the multipoint ODF injection method, and another method may be used in which a gap formed for the liquid crystal layer 8 is filled with the liquid crystal material, after the upper laminate 5U and the lower laminate 5D are laminated.

In a laminating process SP6, the upper laminate 5U and the lower laminate 5D, for example, are pressed by rollers, and are bonded to each other, and thus, the liquid crystal material arranged on the lower laminate 5D is pressed. At this time, a distance between the upper laminate 5U and the lower laminate 5D in the central portion of the light control film 1A is retained to the thickness of the spacer 12 (the bead spacer).

At this time, as with the first embodiment, the upper laminate 5U and the lower laminate 5D are arranged such that lateral sides are shifted from each other. Accordingly, exposure surfaces (first exposure surfaces) 5u1 and 5u2 are formed in the upper laminate 5U, and exposure surfaces (second exposure surfaces) 5d1 and 5d2 are formed in the lower laminate 5D.

By undergoing such bonding, a region in contact with the seal material 19 in the upper base material 15 is a region surrounded by a dot-and-dash line in FIG. 30 having a certain width from the outer circumference of the laminated region.

This region is the first exposure region 30 in which the upper transparent electrode 16 is not provided except for the corner electrode portions 16c0, 16c1, and 16c2 and the cohesion layer 15a is exposed. In addition, the cohesion layer 15a is exposed in the shape of streaks in the corner electrode portions 16c0, 16c1, and 16c2. Therefore, the seal material 19 is in contact with the cohesion layer 6a in the portion where the lower transparent electrode 11 is not provided.

Here, since an adhesion strength between the cohesion layer 15a and the seal material 19 is higher than a cohesion strength between the upper transparent electrode 16 and the seal material 19, the seal material 19 is bonded appropriately to the upper base material 15.

Subsequently, in a curing process SP7 of the seal material 19, the seal material 19 is cured by irradiation with ultraviolet rays and heating, and thus, the liquid crystal cell 4 is manufactured.

Subsequently, in a trimming process SP8, a laminate produced as described above is trimmed into a rectangular shape. Furthermore, various methods applicable to trimming of such a type of film material may be adopted, such as irradiation of a laser beam and trimming using a metallic mold.

Then, in a pasting process SP9, a linear polarization plate 2 and a linear polarization plate 3 are respectively bonded to both sides of the liquid crystal cell 4 with an adhesive. In this connection, the bonding process may be omitted for a case where guest-host type liquid crystals are employed in place of the linear polarization plate.

Further, in an FPC attaching process SP10, a flexible printed board (FPC) 21 extending from a driving power source S1 is attached to a light control film 1B.

The FPC is divided in two directions, and one FPC 21a is connected to an electricity supply point P0d of an exposure surface electrode portion 11a1, and the other FPC 21b is connected to an electricity supply point P0u of an exposure surface electrode portion 16a2. Each of the FPC 21a and the FPC 21b is a two-layer structure for electricity supply with respect to the lower transparent electrode and electricity supply with respect to the upper transparent electrode.

The FPC 21a extends along the exposure surface electrode portion 11a1. A portion of the FPC 21a for supplying electricity to the lower transparent electrode is electrically connected to the exposure surface electrode portion 11a1 at the electricity supply point P0 (P0d) and the connection point P1 (P1d) (refer to FIG. 29B). And a portion of the FPC 21a for supplying electricity to the upper transparent electrode is electrically connected to the exposure surface electrode portion 16a1 at the connection point P1 (P1u) (refer to FIG. 29A).

The FPC 21b extends along the exposure surface electrode portion 16a2. A portion of the FPC 21b for supplying electricity to the upper transparent electrode is electrically connected to the exposure surface electrode portion 11a2 at the electricity supply point P0 (P0u) and the connection point P2 (P2u) (refer to FIG. 29A). And a portion of the FPC 21b for supplying electricity to the lower transparent electrode is electrically connected to the exposure surface electrode portion 11a2 at the connection point P2 (P2d) (refer to FIG. 29B).

As described above, the light control film 1B is manufactured.

According to this embodiment, the following effects are obtained in addition to the same effects as those of the third embodiment.

According to this embodiment, in the lower base material 6, a region to be coated with the seal material 19 is a region surrounded by a dot-and-dash line in FIG. 30, having a certain width from the outer circumference of the laminated region. The portion is the second exposure region 31 in which the lower transparent electrode 11 is not provided except for the corner electrode portions 11c0, 11c1, and 11c2 and the cohesion layer 6a is exposed. And the cohesion layer 6a is exposed in the shape of streaks in the corner electrode portions 11c0, 11c1, and 11c2.

In addition, the region in contact with the seal material 19 in the upper base material 15 is the region surrounded by the dot-and-dash line in FIG. 30, having a certain width from the outer circumference of the laminated region. This region is the first exposure region 30 in which the upper transparent electrode 16 is not provided except for the corner electrode portions 16c0, 16c1, and 16c2 and the cohesion layer 15a is exposed. And the cohesion layer 15a is exposed in the shape of streaks in the corner electrode portions 16c0, 16c1, and 16c2.

That is, the seal material 19 is in contact with the cohesion layer 15a provided on the upper base material 15 and the cohesion layer 6a provided on the lower base material 6. And the adhesion strength between the cohesion layers 15a, 6a and the seal material 19 is higher than the cohesion strength between the lower transparent electrode 11 or the upper transparent electrode 16 and the seal material 19.

For this reason, the adhesion between the seal material 19 and the lower and upper base materials 6, 15 is excellent. Accordingly, a possibility that the seal material 19 is peeled off is low.

In this embodiment, it has been described: The upper transparent electrode 16 is not provided except for the corner electrode portions 16c0, 16c1, and 16c2 in the region having a certain width from the outer circumference of the laminated region; and the lower transparent electrode 11 is not provided except for the corner electrode portions 11c0, 11c1 and 11c2 and the cohesion layer 15a is exposed.

However, it is not limited thereto, and the transparent electrodes 16 and 11 may be patterned such that a part of the transparent electrodes 16 and 11 remains in a region other than the corner electrode portions. Thus, the adhesion is improved due to the concavities and convexities of the patterned transparent electrodes 16 and 11.

Further, since an exposure method of the cohesion layer 6a and the cohesion layer 15a in the lower base material 6 and the upper base material 15, respectively, is performed in the etching process, this embodiment provides an effect of making the patterning easy.

Sixth Embodiment

Figure 32:
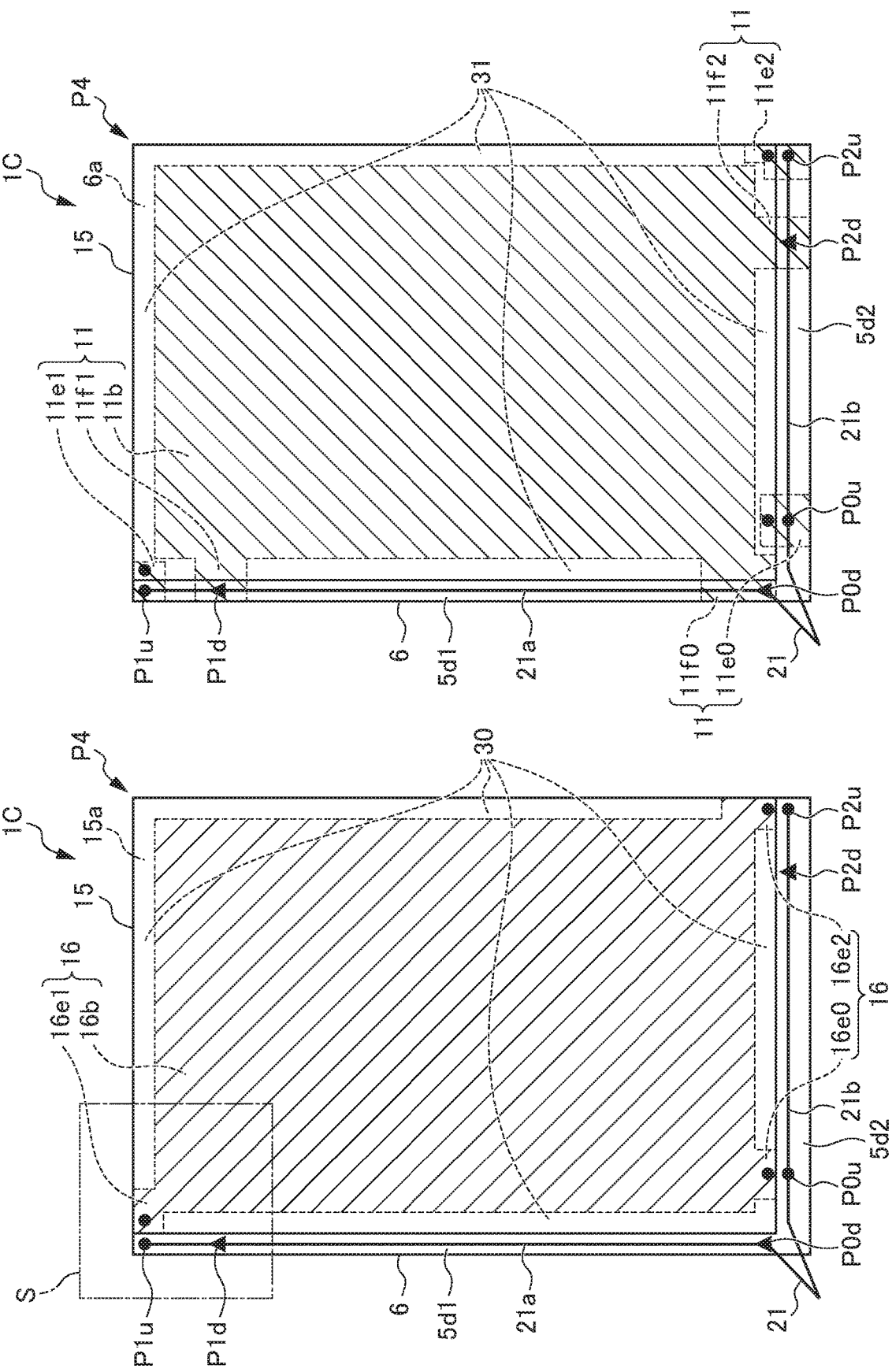

Next, a light control film 1C of a sixth embodiment will be described. FIGS. 32A and 32B are each a plan view of the light control film 1C of the sixth embodiment, in which FIG. 32A is a diagram illustrating the patterning shape of an upper transparent electrode 16, and FIG. 32B is a diagram illustrating the patterning shape of a lower transparent electrode 11.

In the following description, the same reference numerals will be applied to the same portions as those of the third embodiment or the fifth embodiment, and the description thereof will be omitted. The sixth embodiment is different from the fifth embodiment in: shapes of a base material 15 (referred to as an upper base material in this embodiment) and a base material 6 (referred to as a lower base material in this embodiment); shapes of the upper transparent electrode 16 and the lower transparent electrode 11; and a wiring method.

In the sixth embodiment also, a cohesion layer 15a is formed on the front surface of the upper base material 15 and the upper transparent electrode 16 is provided on the cohesion layer 15a. In addition, a cohesion layer 6a is formed on the front surface of the lower base material 6 and the lower transparent electrode 11 is provided on the cohesion layer 6a.

As illustrated in FIG. 32A, the upper base material 15 is in a rectangular shape approximately similar to that of the lower base material 6, and is smaller than the lower base material 6. The upper base material 15 is laminated on the lower base material 6 such that two sides in four outer circumferential sides overlap with each other. The two sides overlapping with each other are two sides extending from a point P4 diagonal to an electricity supply point P0.

Accordingly, in the lower transparent electrode 11, an exposure surface 5d1 directed towards the upper transparent electrode 16 is formed in an edge portion extending to a connection point P1 (P1d and P1u) along a longitudinal direction from an electricity supply point P0 (P0d). In addition, an exposure surface 5d2 directed towards the upper transparent electrode 16 is formed in an edge portion extending to a connection point P2 (P2d and P2u) from the electricity supply point P0 (P0u) along a direction orthogonal to the longitudinal direction.

In the sixth embodiment, an electricity supply point of the electricity supply point P0 which supplies electricity to the upper transparent electrode 16 is set to P0u, and an electricity supply point of the electricity supply point P0 which supplies electricity to the lower transparent electrode 11 is set to P0d.

Of the electricity supply point P0, the electricity supply point P0u is provided on the exposure surface 5d2 and the electricity supply point P0d is provided on the exposure surface 5d1.

Of the connection point P1, one connection point which is connected to the upper transparent electrode 16 is set to P1u, and the other connection point which is connected to the lower transparent electrode 11 is set to P1d.

The connection point P1u is provided at an end opposite to the electricity supply point P0 on the exposure surface 5d1, and the connection point P1d is located at a region which is closer to the electricity supply point P0 than the connection point P1u in an end portion on the exposure surface 5d1.

A connection point of the connection point P2 which is connected to the upper transparent electrode 16 is set to P2u, and a connection point of the connection point P2 which is connected to the lower transparent electrode 11 is set to P2d.

The connection point P2u is provided at an end opposite to the electricity supply point P0 on the exposure surface 5d2, and the connection point P2d is located at a region which is closer to the electricity supply point P0 than the connection point P2u in an end portion on the exposure surface 5d2.

(Upper Side Transparent Electrode)

In this embodiment, the upper transparent electrode 16 is not provided on the entire surface of the upper base material 15, but a first exposure region 30 exists, in which the cohesion layer 15a is exposed. The upper transparent electrode 16 is divided into a plurality of regions electrically connected to each other through the first exposure region 30.

The plurality of regions of the upper transparent electrode 16 are as follows:

(1) A rectangular inside electrode portion 16b slightly smaller than the upper base material 15, inside a certain distance from the outer circumference of the upper base material 15.

(2) Corner electrodes 16e0, 16e1, and 16e2 provided in the vicinity of each of the electricity supply point P0u, the connection point P1u, and the connection point P2u, in a region in the vicinity of the corner of the outer circumferential region of the inside electrode portion 16b.

That is, a portion excluding the corner electrodes 16e0, 16e1, and 16e2 from the outer circumferential region having a certain width surrounding the outer circumference of the inside electrode portion 16b in the laminated region of the upper base material 15 is the first exposure region 30 in which the upper transparent electrode 16 is not provided. In this portion, the cohesion layer 15a which is the lower layer of the upper transparent electrode 16 is exposed.

As with the fifth embodiment, in the corner electrodes 16e0, 16e1, and 16e2, the upper transparent electrode 16 is partially removed and the cohesion layer is exposed in the shape of streaks, forming a plurality of first exposure regions 30.

(Lower Side Transparent Electrode)

In this embodiment, the lower transparent electrode 11 is not provided on the entire surface of the lower base material 6, and a second exposure region 31 exists, in which the cohesion layer 15a is exposed. The lower transparent electrode 11 is divided into a plurality of regions electrically connected to each other through the second exposure region 31.

The plurality of regions of the lower transparent electrode 11 are as follows:

(1) A rectangular inside electrode portion 11b slightly smaller than a region laminated with the upper base material 15 and being located a certain distance inside the outer edge portion in the lower base material 6.

(2-1) A corner electrode portion 11f1 which is provided at the connection point P1d of the exposure surface 5d1 extends into the laminated region from the exposure surface 5d1, and is electrically connected to the inside electrode portion 11b.

(2-2) A corner electrode portion 11f0 which is provided at the electricity supply point P0d of the exposure surface 5d1, extends into the laminated region from the exposure surface 5d1, and is electrically connected to the inside electrode portion 11b.

(2-3) A corner electrode portion 11f2 which is provided at the connection point P2d of the exposure surface 5d2, extends into the laminated region from the exposure surface 5d2, and is electrically connected to the inside electrode portion 11b.

(3-1) An upper connection electrode portion 11e1 which is provided at the connection point P1u of the exposure surface 5d1 extends into the laminated region from the exposure surface 5d1, and is not electrically connected to the inside electrode portion 11b.

(3-2) An upper connection electrode portion 11e0 which is provided at the electricity supply point P0u of the exposure surface 5d2, extends into the laminated region from the exposure surface 5d2, and is not electrically connected to the inside electrode portion 11b.

(3-3) An upper connection electrode portion 11e2 which is provided at the connection point P2u of the exposure surface 5d2, extends into the laminated region from the exposure surface 5d2, and is not electrically connected to the inside electrode portion 11b.

Figure 33:
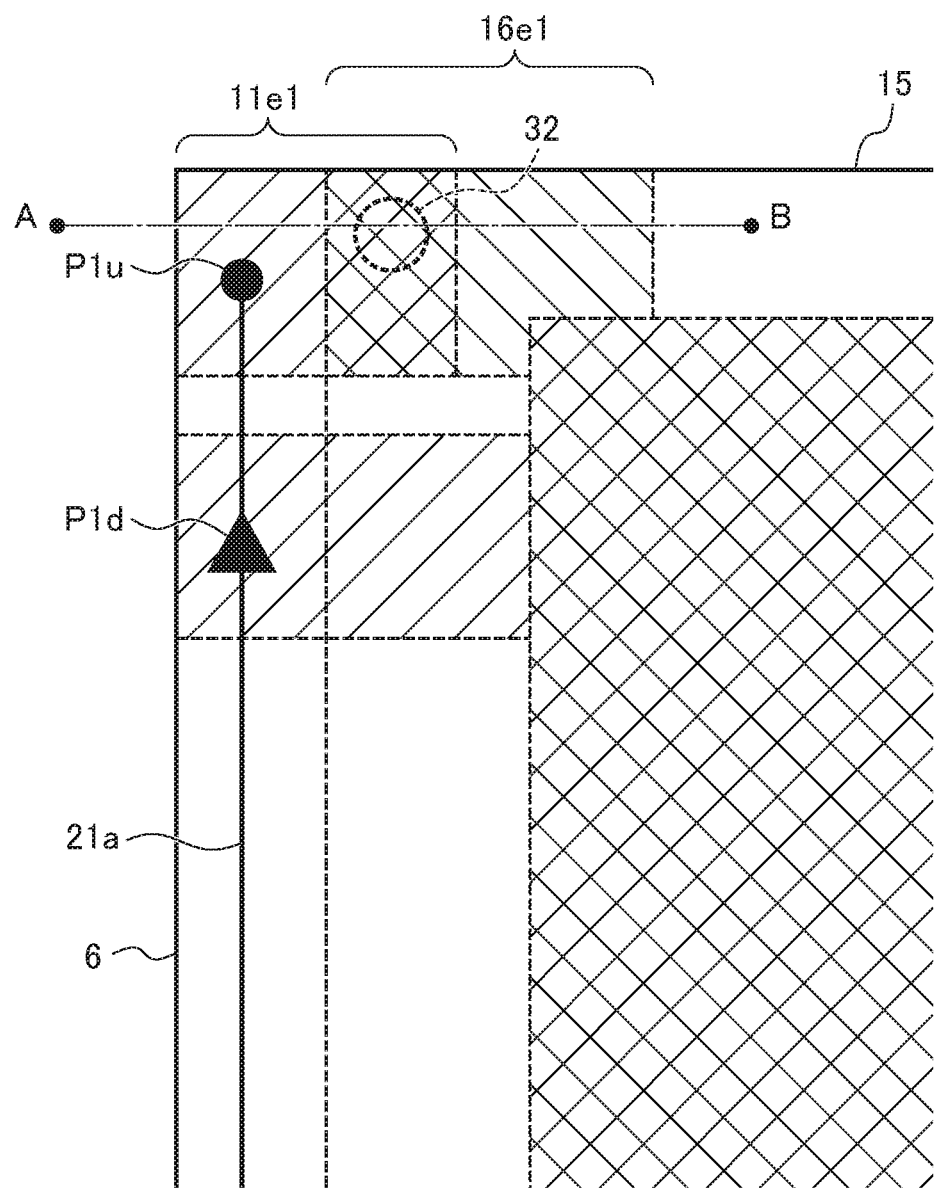
FIG. 33 is an enlarged view of a region S surrounded by a dot-and-dash line of FIG. 32A, and is a diagram illustrating the patterning shapes of the upper and lower transparent electrodes.
Figure 34:
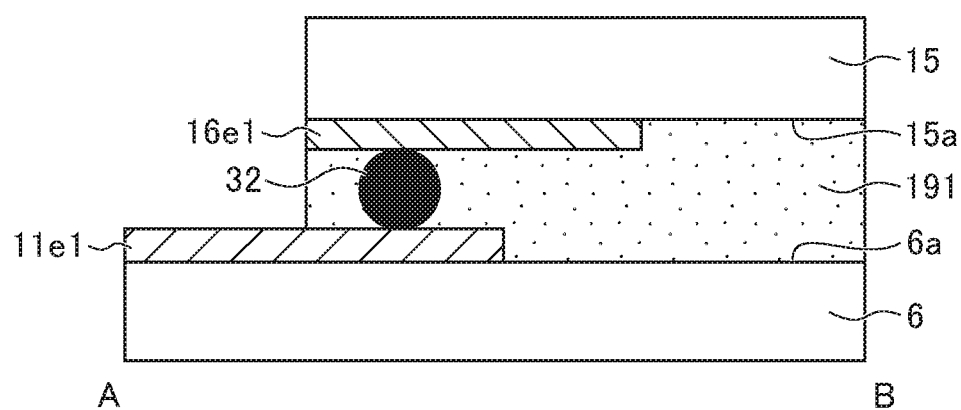
FIG. 34 is a sectional view along line A-B of FIG. 33.

FIG. 33 is an enlarged view of a region S surrounded by a dot-and-dash line of FIG. 32A, and is a diagram illustrating the patterning shape of the upper and lower transparent electrodes. FIG. 34 is a sectional view along line A-B of FIG. 33.

As illustrated, a bead seal portion 191 in which a seal material containing a bead 32 having electrical conductivity is arranged where the corner electrode 16e1 provided on the upper base material 15 overlaps with the upper connection electrode portion 11e1 provided on the lower base material 6, in the laminated region of the upper base material 15 and the lower base material 6. The corner electrode 16e1 provided on the upper base material 15 and the upper connection electrode portion 11e1 provided on the lower base material 6 are electrically connected to each other through the bead 32. Furthermore, in FIGS. 33 and 34, in order to facilitate understanding, one bead 32 is illustrated, but in actual, a plurality of beads are arranged. In addition, the bead 32 is formed of a resin, the surface of which is subjected to gold plating.

Though it is not illustrated, the bead seal portion 191 is also arranged where the corner electrode 16e0 provided on the upper base material 15 overlaps with the upper connection electrode portion 11e0 provided on the lower base material 6, and where the corner electrode 16e2 provided on the upper base material 15 overlaps with the upper connection electrode portion 11e2 provided on the lower base material 6, in the laminated region of the upper base material 15 and the lower base material 6.

An FPC 21 extending from a driving power source is divided into two directions. One FPC 21a extends on the exposure surface 5d1 and the other FPC 21b extends on the exposure surface 5d2.

A line of the FPC 21a for electricity supply to the lower transparent electrode is connected to the corner electrode portion 11f0 at the electricity supply point P0d and is connected to the corner electrode portion 11f1 at the connection point P1d. Each of the corner electrode portion 11f0 and the corner electrode portion 11f1 is connected to the inside electrode portion 11b, and thus, power for supplying electricity to the lower transparent electrode is supplied to the inside electrode portion 11b from the FPC 21a.

A line of the FPC 21a for supplying electricity to the upper transparent electrode is connected to the upper connection electrode portion 11e1 at the connection point P1u. Since the upper connection electrode portion 11e1 is connected to the corner electrode 16e1 through the bead 32 in the bead seal portion 191, power for electricity supply to the upper transparent electrode is supplied to the inside electrode portion 16b from the FPC 21a. Furthermore, a conductive member is not limited to the bead seal portion 191 insofar as electrically connecting the upper and lower transparent electrodes together.

The line of the FPC 21b for electricity supply to the lower transparent electrode is connected to the corner electrode portion 11f2 at the connection point P2d. Since the corner electrode portion 11f2 is connected to the inside electrode portion 11b, power for supplying electricity to the lower transparent electrode is supplied to the inside electrode portion 11b from the FPC 21a.

The line of the FPC 21b for supplying electricity to the upper transparent electrode is connected to the upper connection electrode portion 11e0 at the electricity supply point P0u. Since the upper connection electrode portion 11e0 is connected to the corner electrode 16e0 through the bead 32 in the bead seal portion 191, the power for supplying electricity to the upper transparent electrode is supplied to the inside electrode portion 16b from the FPC 21a.

In addition, the line for supplying electricity to the upper transparent electrode is connected to the upper connection electrode portion 11e2 at the connection point P2u. Since the upper connection electrode portion 11e2 is connected to the corner electrode 16e2 through the bead 32 in the bead seal portion 191, the power supplying for electricity to the upper transparent electrode is supplied to the inside electrode portion 16b from the FPC 21a.

In this embodiment, the light control film 1C is manufactured as with the fifth embodiment.

That is, the seal material 19 is in contact with the second exposure region 31 in which the lower transparent electrode 11 is not provided and the cohesion layer 15a is exposed in the lower base material 6. In addition, the seal material 19 is in contact with the first exposure region 30 in which the upper transparent electrode 16 is not provided and the cohesion layer 15a is exposed in the upper base material 15.

Accordingly, the seal material 19 is in contact with the cohesion layer 15a provided on the upper base material 15 and the cohesion layer 6a provided on the lower base material 6. The adhesion strength between the cohesion layers 15a, 6a and the seal material 19 is higher than the adhesion strength between the lower and upper transparent electrodes 11, 16 and the seal material 19. For this reason, the adhesion between the seal material 19 and the lower and upper base materials 6, 15 is excellent, and thus, a possibility that the seal material 19 is peeled off is low.

Seventh Embodiment

Next, a light control film 1E of a seventh embodiment will be described.

FIGS. 36A and 36B are each a plan view of the light control film 1E of the seventh embodiment. FIG. 36A is a diagram illustrating the patterning shape of an upper transparent electrode 16, and FIG. 36B is a diagram illustrating the patterning shape of a lower transparent electrode 11.

In the following description, the same reference numerals will be applied to the same portions as those of any one of the third embodiment, the fifth embodiment, and the sixth embodiment, and the description thereof will be omitted. The seventh embodiment is different from the third embodiment in: shapes of a base material 15 (referred to as an upper base material in this embodiment) and a base material 6 (referred to as a lower base material in this embodiment); the shape of the upper transparent electrode 16 and the lower transparent electrode 11; and the wiring method, etc.

In this embodiment, the upper base material 15 and the lower base material 6 are in the same rectangular shape, and when observing the light control film 1E from a normal direction with respect to an in-plane direction, the upper base material 15 and the lower base material 6 are arranged such that four lateral sides are coincident with each other.
(Upper Side Transparent Electrode)

In this embodiment, the upper transparent electrode 16 is not provided on the entire surface of the upper base material 15, but is formed inside a first exposure region 30 provided on the peripheral portion of the upper base material 15. The first exposure region 30 is formed along four lateral sides of the upper base material 15 with a predetermined width, and is a region in which a cohesion layer 15a is exposed.
(Lower Side Transparent Electrode)

In this embodiment, the lower transparent electrode 11 is not provided on the entire surface of the lower base material 6, but is formed inside a second exposure region 31 provided on the peripheral portion of the lower base material 6. The second exposure region 31 is formed along four lateral sides of the lower base material 6 with a predetermined width (in this embodiment, the same width as that of the first exposure region 30), and is a region in which a cohesion layer 6a is exposed. The lower transparent electrode 11 includes the following regions:

(1) An inside electrode portion 11b which is formed inside the second exposure region 31 and is electrically connected to an electricity supply point P0d and connection points P1d and P2d.

(2-1) An upper connection electrode portion 11e1 which is provided at the connection point P1u and a region surrounding the connection point P1u, and which is not electrically connected to the inside electrode portion 11b.

(2-2) An upper connection electrode portion 11e0 which is provided at the electricity supply point P0u and a region surrounding the electricity supply point P0u, and which is not electrically connected to the inside electrode portion 11b.

(2-3) An upper connection electrode portion 11e2 which is provided at the connection point P2u and a region surrounding the connection point P2u, and which is not electrically connected to the inside electrode portion 11b. Furthermore, in this embodiment, an example has been described in which the first exposure region 30 and the second exposure region 31 are formed, but it is not limited thereto, and for example, the first exposure region 30 and the second exposure region 31 may not be formed.

Figure 37A:
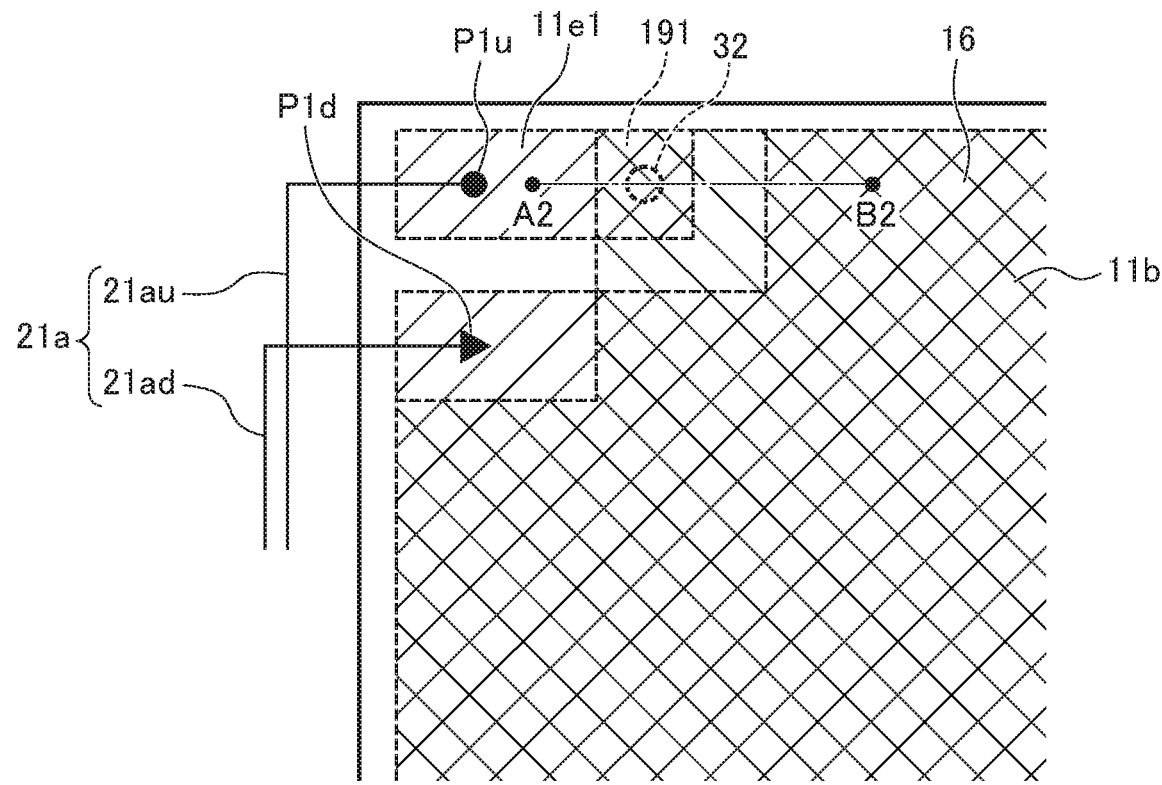
FIGS. 37A and 37B are diagrams each illustrating a patterning shape or the like of upper and lower transparent electrodes at a connection point P1.
Figure 37B:
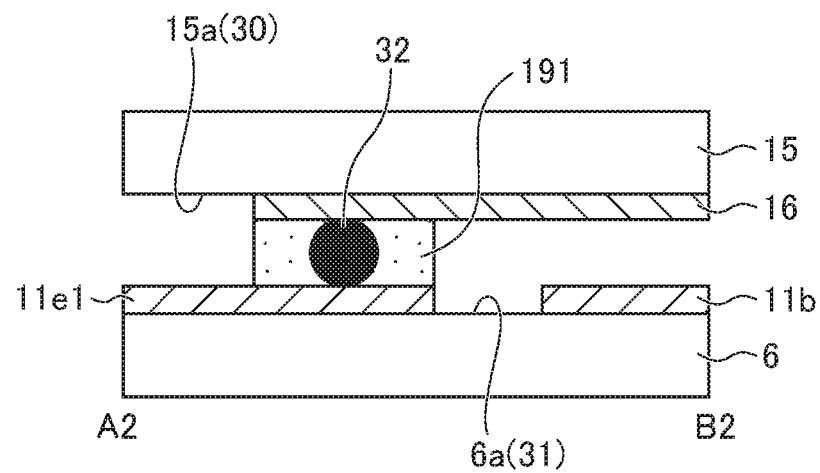

FIGS. 37A and 37B are each a diagram illustrating the patterning shape or the like of the upper and lower transparent electrodes at the connection point P1. FIG. 37A is an enlarged view of a region S2 surrounded by a dot-and-dash line illustrated in FIG. 36A, and FIG. 37B is a sectional view along line A2-B2 illustrated in FIG. 37A.

A bead seal portion 191 containing beads 32 having electrical conductivity is provided between the upper transparent electrode 16 and the upper connection electrode portion 11e1 in a region where the upper transparent electrode 16 overlaps with the upper connection electrode portion 11e1 provided on the lower base material 6 when the light control film 1E is observed from a normal direction with respect to an in-plane direction, as with the fourth embodiment described above. The upper transparent electrode 16 and the upper connection electrode portion 11e1 are electrically connected to each other through the beads 32.

Though it is not illustrated, the bead seal portion 191 containing the beads 32 is also arranged in a portion where the upper transparent electrode 16 provided on the upper base material 15 overlaps with the upper connection electrode portion 11e0 provided on the lower base material 6 and in a portion where the upper transparent electrode 16 provided on the upper base material 15 overlaps with the upper connection electrode portion 11e2 provided on the lower base material 6, when the light control film 1E is observed from the normal direction with respect to the in-plane direction. In this embodiment, the bead seal portion 191 is described as an example, but a conductive member electrically connecting each of the upper connection electrode portions and the upper transparent electrode 16 together is not limited to the bead seal portion 191 insofar as electrically connecting the upper and lower transparent electrodes.

In FIGS. 36A, 36B and the like, in the vicinity of the corner of the light control film 1E, in which an electricity supply point P0 (P0u and P0d) is provided, FPCs 21a and 21b extend in two directions along the lateral sides of the upper base material 15 and the lower base material 6 from the FPC 21 towards the adjacent corners.

Then, the FPC 21a is connected to the upper and lower transparent electrodes at the connection point P1 (P1u and P1d), and the FPC 21b is connected to the upper and lower transparent electrodes at the connection point P2 (P2u and P2d).

In this embodiment, it is described that the FPCs 21a and 21b are positioned outside the light control film 1E, but the FPCs 21a and 21b are not limited thereto, and FPCs 21a and 21b may be fixed onto the front surface of the light control film 1E by bonding with an adhesive or the like.

In addition, the FPCs 21a and 21b include respective lines 21au and 21bu for supplying electricity to the upper transparent electrode, and respective lines 21bu and 21bd for supplying electricity to the lower transparent electrode. In FIGS. 36A and 36B, in order to facilitate understanding, the lines are illustrated separately from each other. However, the line for supplying electricity to the upper transparent electrode and the line for supplying electricity to the lower transparent electrode are, in practical use, laminated through an insulating layer and configured as one flexible printed board.

A line 21d of the FPC 21 for supplying electricity to the lower transparent electrode is connected to the inside electrode portion 11b at the electricity supply point P0d.

In addition, lines 21ad and 21bd of the FPCs 21a and 21b for supplying electricity to the lower transparent electrode are respectively connected to the inside electrode portion 11b at the connection points P1d and P2d.

In this manner, the power for supplying electricity to the lower transparent electrode is supplied to the inside electrode portion 11b of the lower transparent electrode 11 from the FPC 21.

A line 21u of the FPC 21 for supplying electricity to the upper transparent electrode is connected to the upper connection electrode portion 11e0 at the electricity supply point P0u. The upper connection electrode portion 11e0 is connected to the upper transparent electrode 16 through the beads 32 in the bead seal portion 191, and the power for supplying electricity to the upper transparent electrode is supplied to the upper transparent electrode 16 from the FPC 21.

The line 21au of the FPC 21a for supplying electricity to the upper transparent electrode is connected to the upper connection electrode portion 11e1 at the connection point P1u. As described above, the upper connection electrode portion 11e1 is connected to the upper transparent electrode 16 through the beads 32 in the bead seal portion 191, and the power for supplying electricity to the upper transparent electrode is supplied to the upper transparent electrode 16 from the FPC 21a.

In addition, the line 21bu for supplying electricity to the upper transparent electrode is connected to the upper connection electrode portion 11e2 at the connection point P2u. The upper connection electrode portion 11e2 is connected to the upper transparent electrode 16 through the beads 32 in the bead seal portion 191, and the power for supplying electricity to the upper transparent electrode is supplied to the upper transparent electrode 16 from the FPC 21bu.

The light control film 1E of this embodiment is manufactured as with the fifth embodiment.

Though it is not illustrated in FIGS. 36A and 36B, in this embodiment, the seal material 19 is provided along the outer edge of a region in which the inside electrode portion 11b overlaps with the upper transparent electrode 16, with a predetermined width. In this embodiment, the seal material 19 is in contact with the exposed cohesion layer 6a in the second exposure region 31 of the lower base material 6, and is in contact with the exposed cohesion layer 15a in the first exposure region 30 of the upper base material 15. As described above, the adhesion strength between the cohesion layers 15a, 6a and the seal material 19 is higher than the adhesion strength between the lower and upper transparent electrodes 11, 16 and the seal material 19. Accordingly, the adhesion between seal material 19 and the lower and upper base materials 6, 15 is improved, and thus, the seal material 19 can be prevented from peeling off.

As described above, base materials in the same shape can be used as the upper base material 15 and the lower base material 6, and the production cost can be reduced. In addition, it is possible to prevent the seal material 19 from peeling off, and to improve the quality of the light control film 1E.

Other Modification Embodiments

In each of the embodiments and the like, it has been described that the light control film is bonded to the sunroof of a vehicle, but the light control film is not limited thereto. For example, the light control film may be bonded to windows of a vehicle (a rear window, front window and side window), or may be bonded to a window of a building or the like.

In addition, in each of the embodiments and the like, the light transmissive member to which the light control film is bonded is not limited to glass. The light control film may be bonded to a plate-like light transmissive member of a resin such as acryl or PC.

In addition, in each of the embodiments and the like, the electrical wire is not limited to the FPC. A member in which a copper foil is laminated on an insulating layer may be bonded onto the light control film.

In the third embodiment to the seventh embodiment, various driving modes such as a twisted nematic (TN) mode and an in plane switching (IPS) mode may be applied to the liquid crystal cell 4 instead of the VA mode.

In addition, in the third embodiment to the seventh embodiment, guest-host type liquid crystals may be used for the liquid crystal layer 8.

EXPLANATION OF REFERENCE NUMERALS 1, 1A, 1B, 1C, 1D, 1E LIGHT CONTROL FILM
2 LINEAR POLARIZATION PLATE
2A, 3A PHASE DIFFERENCE FILM
3 LINEAR POLARIZATION PLATE
4 LIQUID CRYSTAL CELL
4a LIQUID CRYSTAL MOLECULES
5D LOWER LAMINATE
5DL FIRST LOWER LATERAL SIDE
5DS SECOND LOWER LATERAL SIDE
5DS, 5DU LATERAL SIDE
5U UPPER LAMINATE
5UL FIRST UPPER LATERAL SIDE
5USC SECOND UPPER LATERAL SIDE
5d, 5u EXPOSURE SURFACE
6 BASE MATERIAL (UPPER BASE MATERIAL)
8 LIQUID CRYSTAL LAYER
11 TRANSPARENT ELECTRODE (UPPER TRANSPARENT ELECTRODE)
12 SPACER
13 ALIGNMENT LAYER (LOWER SIDE ALIGNMENT LAYER)
15 BASE MATERIAL (UPPER BASE MATERIAL)
16 TRANSPARENT ELECTRODE (UPPER TRANSPARENT ELECTRODE)
17 ALIGNMENT LAYER (UPPER ALIGNMENT LAYER)
19 SEAL MATERIAL
191 BEAD SEAL PORTION
130 VEHICLE
131 OPENING
132 SUNROOF

The invention claimed is:
1. A light control film, comprising:
a first base material;
a first planar transparent electrode having:
a first electricity supply point electrically connected to a driving power source,
a first connection point, and
a second connection point;

a liquid crystal layer containing liquid crystal molecules;
a second planar transparent electrode having:
- a second electricity supply point electrically connected to the driving power source,
- a third connection point, and
- a fourth connection point; and a second base material, wherein:
- each of the first electricity supply point, the first connection point and the second connection point is provided directly on the first planar transparent electrode at different positions from one another;
- each of the second electricity supply point, the third connection point and the fourth connection point is provided directly on the second planar transparent electrode at different positions from one another;
- the first electricity supply point and the first connection point are directly electrically connected by a first electrical wire which extends along an outer edge portion of the first base material;
- the second electricity supply point and the fourth connection point are directly electrically connected by a second electrical wire which extends along an outer edge portion of the second base material;
- the first connection point and the third connection point are directly electrically connected by a third electrical wire, and
- the second connection point and the fourth connection point are directly electrically connected by a fourth electrical wire.

2. The light control film according to claim 1, wherein
a first exposure surface not overlapping with the second base material is formed on a surface of the first base material on a second base material side,
a second exposure surface not overlapping with the first base material is formed on a surface of the second base material on a first base material side,
the first electrical wire is arranged on the first exposure surface, and
the second electrical wire is arranged on the second exposure surface.

3. The light control film according to claim 1, wherein
the first base material and the second base material are laminated such that a laminated region in which the first base material and the second base material overlap with each other is generated, and an exposure surface in which the first base material and the second base material do not overlap with each other is generated,
the liquid crystal molecules and a seal material arranged to surround the liquid crystal molecules are arranged in the laminated region,
a first exposure region not including the first planar transparent electrode exists in a portion of the first base material in which the seal material is arranged, and
a second exposure region not including the second planar transparent electrode exists in a portion of the second base material in which the seal material is arranged.

4. The light control film according to claim 3,
wherein one portion of the second planar transparent electrode is insulated from the other portion and the one portion is electrically connected to the first planar transparent electrode.

5. The light control film according to claim 1,
wherein each of the first, second, third and fourth electrical wires comprises a flexible printed board in which a thickness of a copper foil is greater than or equal to 9 micrometers.

6. The light control film according to claim 5,
wherein two layers of copper foils are laminated to each other with an insulating layer interposed therebetween in the flexible printed board.

7. The light control film according to claim 1,
wherein the first electrical wire and the second electrical wire extend in different directions.

8. The light control film according to claim 1, wherein the light control film has a transmittance frequency of 30 Hz or higher.

9. A method for supplying electricity to the light control film according to claim 1, the method comprising:
supplying electricity to the first planar transparent electrode from the first electricity supply point and the first and second connection points, and
supplying electricity to the second planar transparent electrode from the second electricity supply point and the third and fourth connection points.

10. A light control member, comprising:
a transparent member; and
the light control film according to claim 1 arranged on the transparent member.

11. A vehicle comprising:
the light control film according to claim 1 arranged in a portion on which external light is incident.

12. A vehicle comprising:
a sunroof; and
the light control film according to claim 1 attached to the sunroof,
wherein:
the liquid crystal layer is a vertically-aligned liquid crystal layer, and
the light control film is attached to the sunroof of the vehicle such that liquid crystal molecules fall to a rear of the vehicle when an electric field is applied to the liquid crystal layer.

13. The vehicle according to claim 12,
wherein an electricity supply position of the light control film is located at an edge portion of the light control film and rearward from a center of the light control film in a front-rear direction of the vehicle.

14. The vehicle according to claim 12,
wherein the light control film is attached to the sunroof of the vehicle such that the liquid crystal molecules fall diagonally rearward with respect to the vehicle when an electric field is applied to the liquid crystal layer.

15. The vehicle according to claim 12,
wherein a direction in which the liquid crystal molecules fall when an electric field is applied to the liquid crystal layer is configured to be in a direction of ±135° and in a vicinity thereof when a travelling direction of the vehicle is set to 0° in an in-plane direction of the light control film.

16. The vehicle according to claim 12,
wherein an electricity supply position of the light control film is an edge portion of the light control film and is a diagonal rear of the vehicle.

* * * * *